US011052494B1

(12) United States Patent
Bloch et al.

(10) Patent No.: US 11,052,494 B1
(45) Date of Patent: Jul. 6, 2021

(54) METHODS AND APPARATUS FOR SEMI-AUTOMATED TACK WELDING OF PLIES OF A THERMOPLASTIC COMPOSITE LAYUP

(71) Applicant: The Boeing Company, Chicago, IL (US)

(72) Inventors: Daniel D. Bloch, St. Peters, MO (US); Roger A. Burgess, Clayton, MO (US); Samuel J. Easley, St. Peters, MO (US); Eric E. Moyes, Desoto, MO (US); Randall D. Wilkerson, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/736,428

(22) Filed: Jan. 7, 2020

(51) Int. Cl.
*B23K 37/04* (2006.01)
*B29C 65/00* (2006.01)
(Continued)

(52) U.S. Cl.
CPC .......... *B23K 37/0408* (2013.01); *B29C 65/08* (2013.01); *B29C 66/73921* (2013.01);
(Continued)

(58) Field of Classification Search
CPC ... B29C 65/08; B29C 66/73921; B29C 37/04; B32B 37/10; B23K 37/0408
See application file for complete search history.

(56) References Cited

U.S. PATENT DOCUMENTS

| 3,238,087 A | 3/1966 | Norwalk et al. |
| 3,709,643 A | 1/1973 | Nasica |
| 4,545,275 A | 10/1985 | Pearl |
| 4,858,289 A | 8/1989 | Speller, Sr. |
| 4,917,353 A | 4/1990 | Riley |
| 5,265,508 A | 11/1993 | Bell et al. |
| 5,308,198 A | 5/1994 | Pumphrey |

(Continued)

FOREIGN PATENT DOCUMENTS

| CN | 201817137 | 5/2011 |
| EP | 2647463 | 10/2013 |

(Continued)

OTHER PUBLICATIONS

Porter Cable, "690 Series 1-3/4 Peak HP Routers Instruction Manual," dated May 2014, 7 pages.

(Continued)

*Primary Examiner* — Carson Gross
(74) *Attorney, Agent, or Firm* — Hanley, Flight & Zimmerman, LLC

(57) ABSTRACT

Methods and apparatus for semi-automated tack welding of plies of a thermoplastic composite layup are described. An example welding tool includes a stabilization foot, a housing, a compaction foot, and a welder. The stabilization foot has a stabilization surface. The housing has a central axis. The housing is movable relative to the stabilization surface along the central axis of the housing. The compaction foot has a central axis and a compaction surface. The compaction surface is movable relative to the stabilization surface and to the housing along the central axis of the compaction surface. The welder has a central axis and a welding surface. The welding surface is movable relative to the stabilization surface, to the housing, and to the compaction surface along the central axis of the welder.

29 Claims, 32 Drawing Sheets

(51) Int. Cl.
*B29C 65/08* (2006.01)
*B32B 37/04* (2006.01)
*B32B 37/10* (2006.01)
*B32B 37/16* (2006.01)
*B23K 103/00* (2006.01)
*B23K 103/16* (2006.01)

(52) U.S. Cl.
CPC .............. *B32B 37/04* (2013.01); *B32B 37/10* (2013.01); *B32B 37/16* (2013.01); *B23K 2103/16* (2018.08); *B23K 2103/42* (2018.08)

(56) References Cited

U.S. PATENT DOCUMENTS

| | | | |
|---|---|---|---|
| 5,317,943 | A | 6/1994 | Dowdle |
| 5,324,913 | A | 6/1994 | Oberg et al. |
| 5,733,081 | A | 3/1998 | Dowdle et al. |
| 8,256,480 | B1 | 9/2012 | Weber et al. |
| 8,714,431 | B2 * | 5/2014 | Roos .................. B23K 20/1265 228/2.1 |
| 9,216,540 | B2 | 12/2015 | Weiland et al. |
| 10,702,993 | B2 | 7/2020 | Bloch et al. |
| 10,800,110 | B2 | 10/2020 | Bloch et al. |
| 2002/0136612 | A1 | 9/2002 | Martinez et al. |
| 2004/0168559 | A1 | 9/2004 | Ide et al. |
| 2008/0023529 | A1 * | 1/2008 | Reatherford ........... B23K 20/10 228/110.1 |
| 2010/0075126 | A1 | 3/2010 | Ford et al. |
| 2012/0020756 | A1 | 1/2012 | Zagar |
| 2013/0059022 | A1 | 3/2013 | Kanemasu et al. |
| 2013/0263999 | A1 * | 10/2013 | Weiland ................ B29C 66/721 156/73.1 |
| 2015/0321760 | A1 | 11/2015 | Alford |
| 2018/0290393 | A1 | 10/2018 | Bloch et al. |
| 2019/0126505 | A1 | 5/2019 | Bloch et al. |
| 2019/0135039 | A1 | 5/2019 | Filiol et al. |

FOREIGN PATENT DOCUMENTS

| | | |
|---|---|---|
| EP | 2845701 | 3/2015 |
| EP | 3392024 | 10/2018 |
| GB | 2476870 | 1/2011 |
| JP | 2015217532 | 12/2015 |
| NL | 9301691 | 4/1995 |

OTHER PUBLICATIONS

European Patent Office, "Extended European Search Report," issued in connection with European Patent Application No. 18163928.7, dated Sep. 20, 2018, 9 pages.

United States Patent and Trademark Office, "Requirement for Restriction and/or Election," issued in connection with U.S. Appl. No. 15/484,721, dated Apr. 22, 2019, 6 pages.

United States Patent and Trademark Office, "Non-Final Office Action," issued in connection with U.S. Appl. No. 15/484,721, dated Jun. 27, 2019, 13 pages.

United States Patent and Trademark Office, "Final Office Action," issued in connection with U.S. Appl. No. 15/484,721, dated Oct. 4, 2019, 14 pages.

United States Patent and Trademark Office, "Non-Final Office Action," issued in connection with U.S. Appl. No. 15/484,721, dated Jan. 22, 2020, 17 pages.

United States Patent and Trademark Office, "Final Office Action," issued in connection with U.S. Appl. No. 151484,721, dated May 15, 2020, 16 pages.

United States Patent and Trademark Office, "Notice of Allowance and Fee(s) Due," issued in connection with U.S. Appl. No. 15/484,721, dated Aug. 19, 2020, 9 pages.

United States Patent and Trademark Office, "Non-Final Office Action," issued in connection with U.S. Appl. No. 15/797,725, dated Nov. 6, 2020, 15 pages.

United States Patent and Trademark Office, "Advisory Action," issued in connection with U.S. Appl. No. 15/797,725, dated Mar. 23, 2020, 2 pages.

United States Patent and Trademark Office, "Final Office Action," issued in connection with U.S. Appl. No. 15/797,725, dated Feb. 7, 2020, 15 pages.

United States Patent and Trademark Office, "Non-Final Office Action," issued in connection with U.S. Appl. No. 15/797,725, dated Sep. 9, 2019, 9 pages.

United States Patent and Trademark Office, "Requirement for Restriction and/or Election," issued in connection with U.S. Appl. No. 15/797,725, dated Jun. 3, 3019, 6 pages.

European Patent Office, "Extended European Search Report," issued in connection with European Patent Application No. 18193041.3 dated Mar. 20, 2019, 6 pages.

Intellectual Property Office, "Search and Examination Report," issued in connection with British Application No. GB1817449.0, dated Mar. 27, 2019, 8 pages.

Intellectual Property Office, "Examination Report," issued in connection with British Application No. GB1817449.0, dated May 22, 2020, 2 pages.

United States Patent and Trademark Office, "Requirement for Restriction and/or Election," issued in connection with U.S. Appl. No. 16/028,150, dated Dec. 23, 3019, 5 pages.

United States Patent and Trademark Office, "Non-Final Office Action," issued in connection with U.S. Appl. No. 16/028,150, dated Jan. 30, 2020, 5 pages.

United States Patent and Trademark Office, "Notice of Allowance and Fee(s) Due," issued in connection with U.S. Appl. No. 16/028,150, dated Mar. 17, 2020, 5 pages.

* cited by examiner

METHODS AND APPARATUS FOR SEMI-AUTOMATED TACK WELDING OF PLIES OF A THERMOPLASTIC COMPOSITE LAYUP

FIELD OF THE DISCLOSURE

This disclosure relates generally to methods and apparatus for tack welding and, more specifically, to methods and apparatus for semi-automated tack welding of plies of a thermoplastic composite layup.

BACKGROUND

Conventional methods of assembling thermoplastic composite layups require a substantial degree of manual labor and/or human involvement in conjunction with performing various operations, steps and/or stages of the assembly process. For example, such conventional methods commonly require that individual thermoplastic plies be tack welded to one another using a manually-operated welding device (e.g., an ultrasonic welder or a hot iron welder) in connection with forming the thermoplastic composite layup. Human involvement in the tack welding operation of such conventional methods limits the accuracy, efficiency, and repeatability of the assembly process and, in some instances, exposes the human operator of the manually-operated welding device to safety risks arising from the welding tip of the manually-operated welding device being unshrouded during the tack welding operation.

SUMMARY

Methods and apparatus for semi-automated tack welding of plies of a thermoplastic layup are disclosed. In some examples, a welding tool is disclosed. In some disclosed examples, the welding tool includes a stabilization foot, a housing, a compaction foot, and a welder. In some disclosed examples, the stabilization foot has a stabilization surface. In some disclosed examples, the housing has a central axis. In some disclosed examples, the housing is movable relative to the stabilization surface along the central axis of the housing. In some disclosed examples, the compaction foot has a central axis and a compaction surface. In some disclosed examples, the compaction surface is movable relative to the stabilization surface and to the housing along the central axis of the compaction foot. In some disclosed examples, the welder has a central axis and a welding surface. In some disclosed examples, the welding surface is movable relative to the stabilization surface, to the housing, and to the compaction surface along the central axis of the welder.

In some examples, a method for welding a first thermoplastic part to a second thermoplastic part via a welding tool is disclosed. In some disclosed examples, the method includes positioning a stabilization surface of a stabilization foot of the welding tool in contact with the first thermoplastic part. In some disclosed examples, the method includes stabilizing the first thermoplastic part relative to the second thermoplastic part by moving a housing of the welding tool toward the stabilization surface along a central axis of the housing. In some disclosed examples, the method includes compacting the first thermoplastic part relative to the second thermoplastic part by moving a compaction surface of a compaction foot of the welding tool into contact with the first thermoplastic part and relative to the stabilization foot and to the housing along a central axis of the compaction foot. In some disclosed examples, the method includes welding the first thermoplastic part to the second thermoplastic part by moving a welding surface of a welder of the welding into contact with the first thermoplastic part and relative to the stabilization surface, to the housing, and to the compaction surface along a central axis of the welder.

Figure 1:
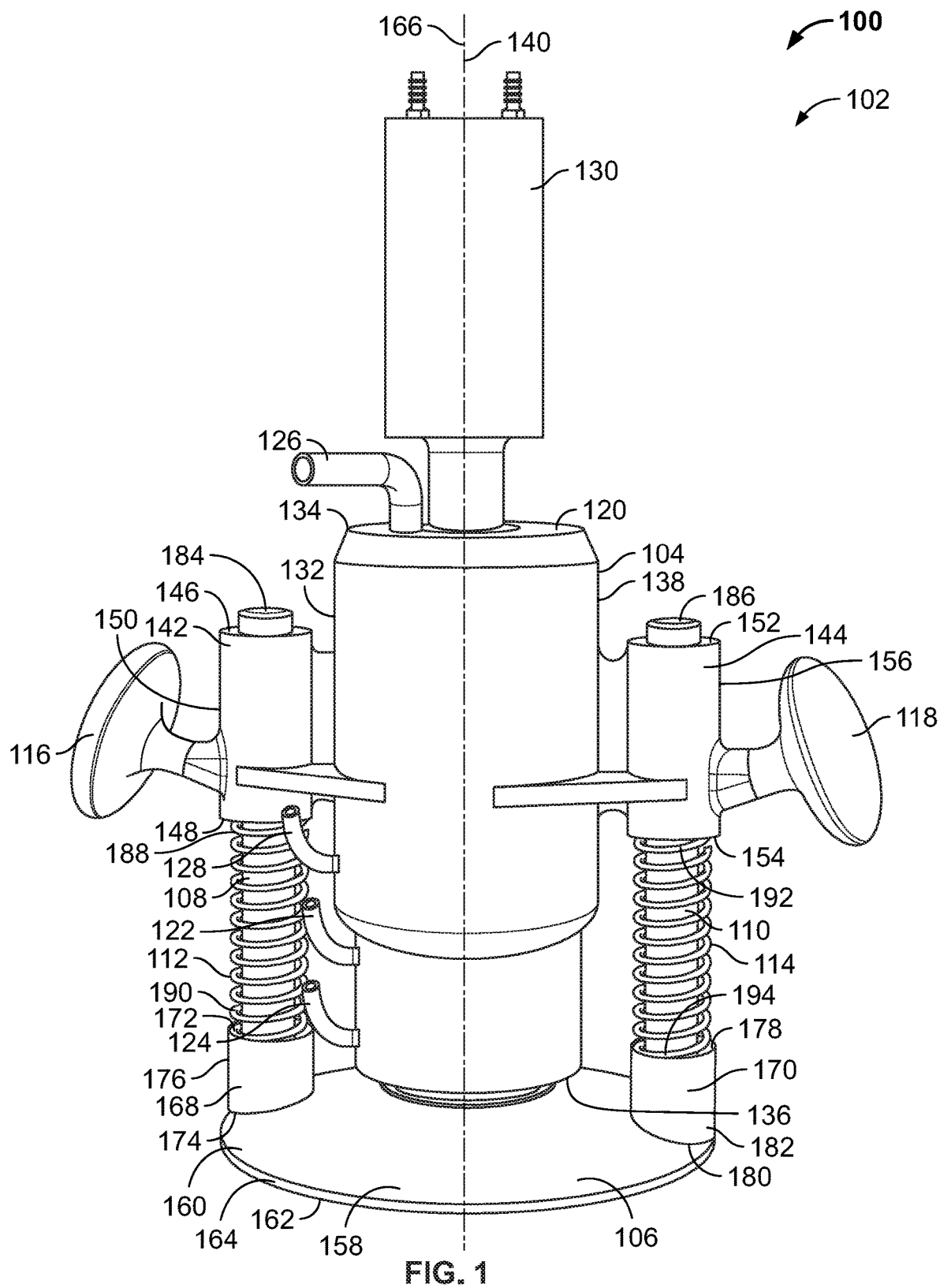
FIG. 1 is a perspective view of an example welding tool constructed in accordance with the teachings of this disclosure and shown in a first example configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

As discussed above, conventional methods of assembling thermoplastic composite layups commonly require that individual thermoplastic plies be tack welded to one another using a manually-operated welding device (e.g., an ultrasonic welder or a hot iron welder) in connection with forming the thermoplastic composite layup. The human operator of the manually-operated welding device typically places a first thermoplastic ply into position on top of (e.g., stacked relative to) a second thermoplastic ply of a composite thermoplastic layup, and then tack welds the first thermoplastic ply to the second thermoplastic ply and/or to the thermoplastic composite layup. To perform the tack welding operation, the human operator pushes the manually-operated welding device against the first thermoplastic ply with a subjective pressure, for a subjective time, until the human operator concludes that the tack weld is successful.

During the tack welding operation, the welding tip of the manually-operated welding device must be used to debulk the thermoplastic plies (e.g., the first thermoplastic ply and the second thermoplastic ply) of the thermoplastic composite layup. Such debulking becomes increasingly more difficult for the human operator to manage and/or control as the number of plies and/or the associated bulk (e.g., the squishiness or yield of the stacked plies to the touch) of the thermoplastic composite layup increases, and/or as the thermoplastic composite layup develops one or more significant taper(s) resulting from the formation of one or more ply drop(s) (e.g., progressively smaller thermoplastic plies stacked on each other) within the thermoplastic composite layup. As the number of plies and/or the associated bulk of the thermoplastic composite layup increases, so too does the tendency of the thermoplastic composite layup to push back (e.g., via a counter pressure) against the tack weld when the human operator releases the welding tip of the manually-operated welding device. In some instances, such push-back is substantial enough to cause the tack weld to fracture, break, and/or otherwise fail. The tack weld can also fracture, break, and/or otherwise fail when the human operator releases the welding tip of the manually-operated welding device while the tack welded area of the thermoplastic composite layup is still hot (e.g., before the thermoplastic plies being welded together have cooled to a temperature below their melting points). Additionally, the tack welding operation may expose the human operator of the manually-operated welding device to safety risks arising from the welding tip of the manually-operated welding device being unshrouded during the tack welding operation.

Example methods and apparatus for semi-automated tack welding of plies of a thermoplastic composite layup are disclosed herein. The disclosed methods and apparatus include and/or utilize a welding tool having a stabilization foot configured to stabilize a first thermoplastic ply relative to a second thermoplastic ply, a compaction foot configured to compact and/or debulk the first thermoplastic ply relative to the second thermoplastic ply, and a welder configured to tack weld the first thermoplastic ply to the second thermoplastic ply in connection with forming a thermoplastic composite layup. In some disclosed examples, the stabilization foot of the welding tool configured to stabilize the first thermoplastic ply relative to the second thermoplastic ply in response to a housing of the welding tool being manually moved (e.g., by a human operator of the welding tool) toward the stabilization foot. In some disclosed examples, the stabilization foot of the welding tool is configured to be manually operated and/or manually controlled by a human operator of the welding tool, and the compaction foot and the welder of the welding tool are configured to be automatically operated and/or automatically controlled. In other disclosed examples, the stabilization foot and the compaction foot of the welding tool are configured to be manually operated and/or manually controlled by a human operator of the welding tool, and the welder of the welding tool is configured to be automatically operated and/or automatically controlled.

The disclosed methods and apparatus provide numerous advantages relative to conventional manual tack welding operations. For example, the disclosed methods and apparatus advantageously enable a human operator to stabilize and debulk one or more thermoplastic plies of a thermoplastic composite layup in a controlled manner as the plies are tack welded, and/or to apply the correct amount of weld pressure, for the correct time period, to facilitate tack welding the plies of the thermoplastic composite layup. The disclosed method and apparatus accordingly reduce and/or eliminate much or all of the subjectivity that is inherent in conventional manual tack welding operations. Additionally, the disclosed methods and apparatus advantageously cause the welding tip of the welder of the welding tool to be shrouded (e.g., by the compaction foot of the welding tool and/or by the stabilization foot of the welding tool) while the tack weld is formed. The disclosed method and apparatus may accordingly provide a safety advantage to a human operator of the welding tool relative to the safety risks that the human operator may be inherently exposed to in connection with conventional manual tack welding operations.

As used herein, the term "thermoplastic part" refers to a thermoplastic material (e.g., one or more plies, sheets, or layers of thermoplastic material) to be incorporated into a thermoplastic composite layup. A thermoplastic part can be, for example, one or more plies of fiber pre-impregnated with thermoplastic resin (e.g., prepreg). The fiber can be formed, for example, from carbon, fiberglass, or Kevlar. The fiber can be unidirectional, or can alternatively be a multidirectional weave or fabric. As used herein, the term "thermoplastic composite layup" refers generally to any thermoplastic article including at least two thermoplastic parts that have been welded (e.g., tack welded) to one another to form the thermoplastic article. Further processing, for example through the application of heat and pressure, of a thermoplastic composite layup creates a thermoplastic composite structure. The end use of the thermoplastic composite structure determines the specific configuration (e.g., number of plies, size and shape of plies, or relative orientation of adjacent plies) of the thermoplastic parts in the thermoplastic composite layup.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

As used herein in the context of describing various positions of the housing, the stabilization foot, the compaction foot, and/or the welder of any of the example welding tools disclosed herein, the terms "uncompressed position," "compressed position," "retracted position," and "extended position" are relative in nature. For example, describing the housing as being in an uncompressed position relative to a surface and/or relative to another structure does not necessarily mean that the housing is in a fully-uncompressed position. Similarly, describing the housing as being in a compressed position relative to a surface and/or relative to another structure does not necessarily mean that the housing is in a fully-compressed position. In this same light, describing the compaction foot as being in an uncompressed position relative to a surface and/or relative to another structure does not necessarily mean that the compaction foot is in a fully-uncompressed position. And similarly, describing the compaction foot as being in a compressed position relative to a surface and/or relative to another structure does not necessarily mean that the compaction foot is in a fully-compressed position. In this same light, describing the compaction foot as being in a retracted position relative to a surface and/or relative to another structure does not necessarily mean that the compaction foot is in a fully-retracted position. And similarly, describing the compaction foot as being in an extended position relative to a surface and/or relative to another structure does not necessarily mean that the compaction foot is in a fully-extended position. In this same light, describing the welder as being in a retracted position relative to a surface and/or relative to another structure does not necessarily mean that the welder is in a fully-retracted position. And similarly, describing the welder as being in an extended position relative to a surface and/or relative to another structure does not necessarily mean that the welder is in a fully-extended position.

Figure 2:
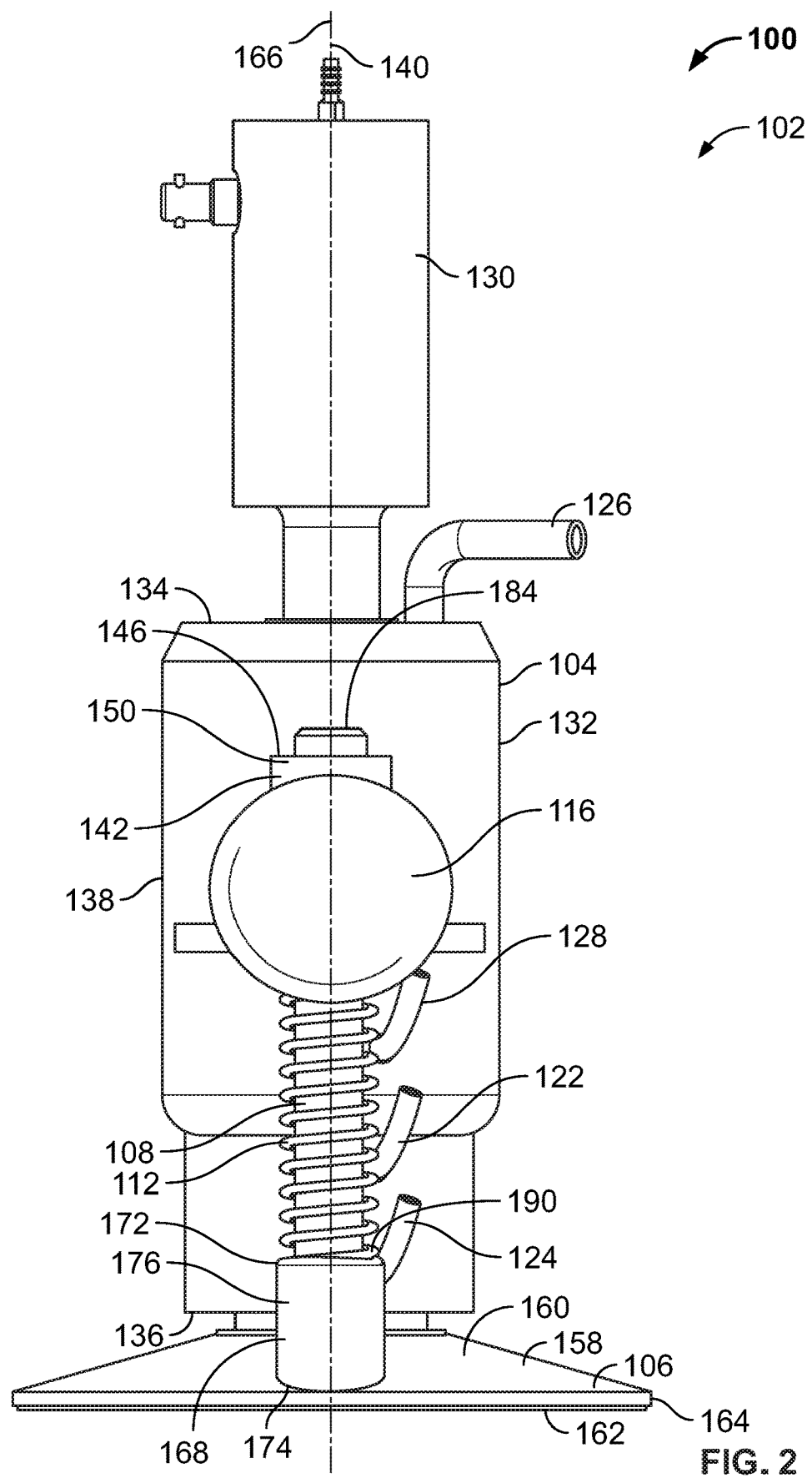
FIG. 2 is a side view of the welding tool of FIG. 1 shown in the first configuration of FIG. 1.
Figure 3:
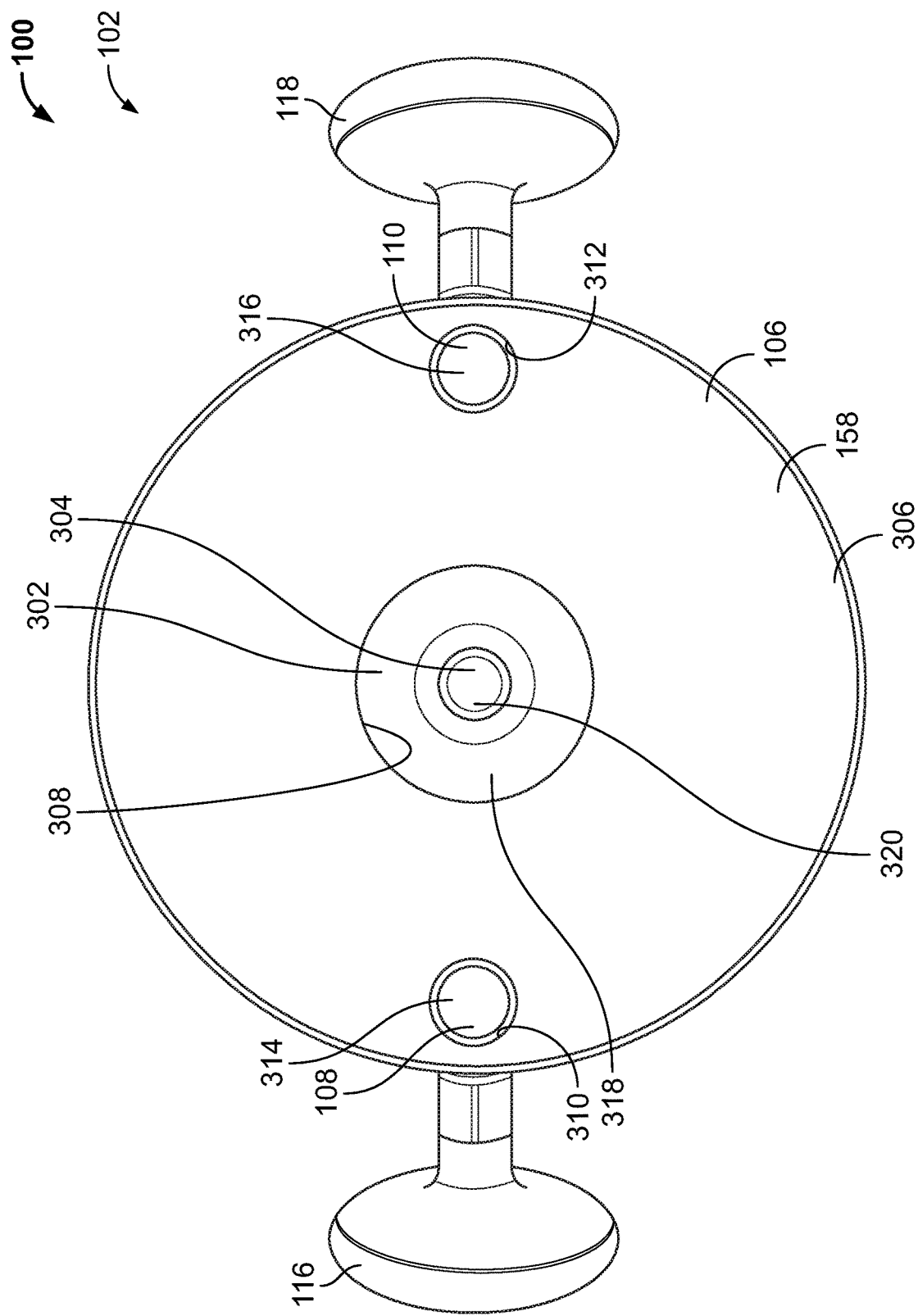
FIG. 3 is a bottom view of the welding tool of FIGS. 1 and 2 shown in the first configuration of FIGS. 1 and 2.
Figure 4:
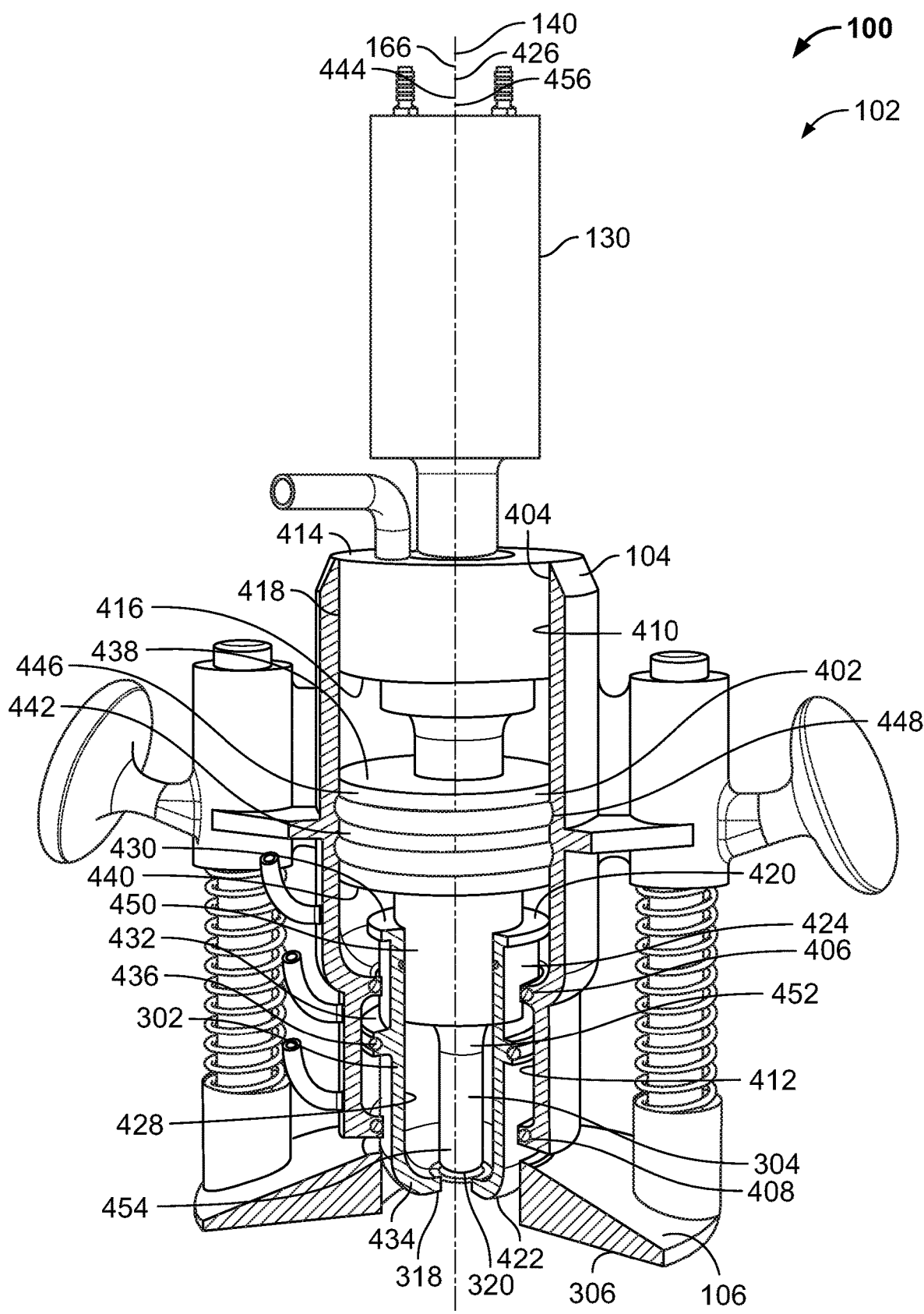
FIG. 4 is a partial cutaway view of the welding tool of FIGS. 1-3 shown in the first configuration of FIGS. 1-3.
Figure 5:
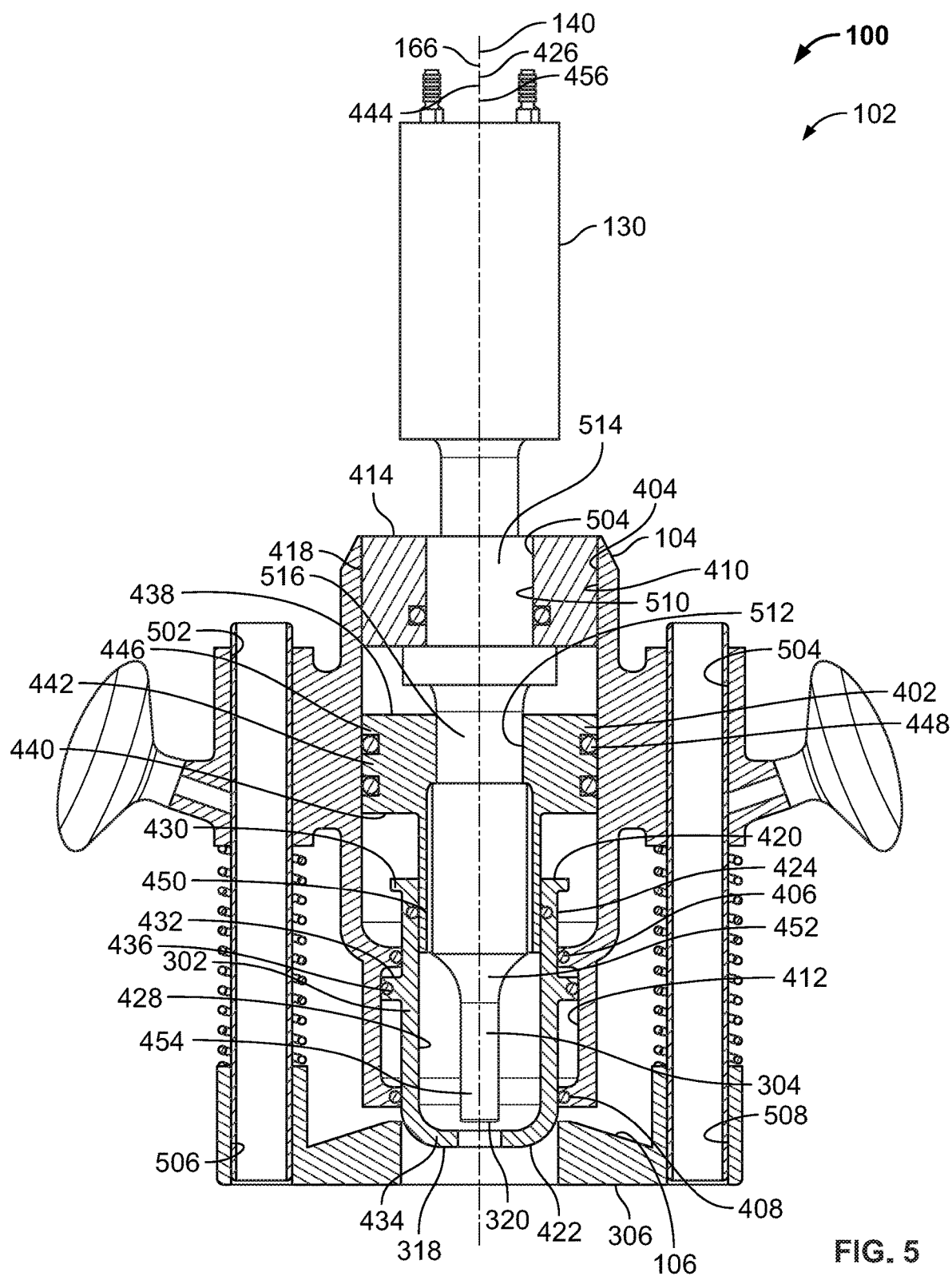
FIG. 5 is a cross-sectional view of the welding tool of FIGS. 1-4 shown in the first configuration of FIGS. 1-4.
Figure 6:
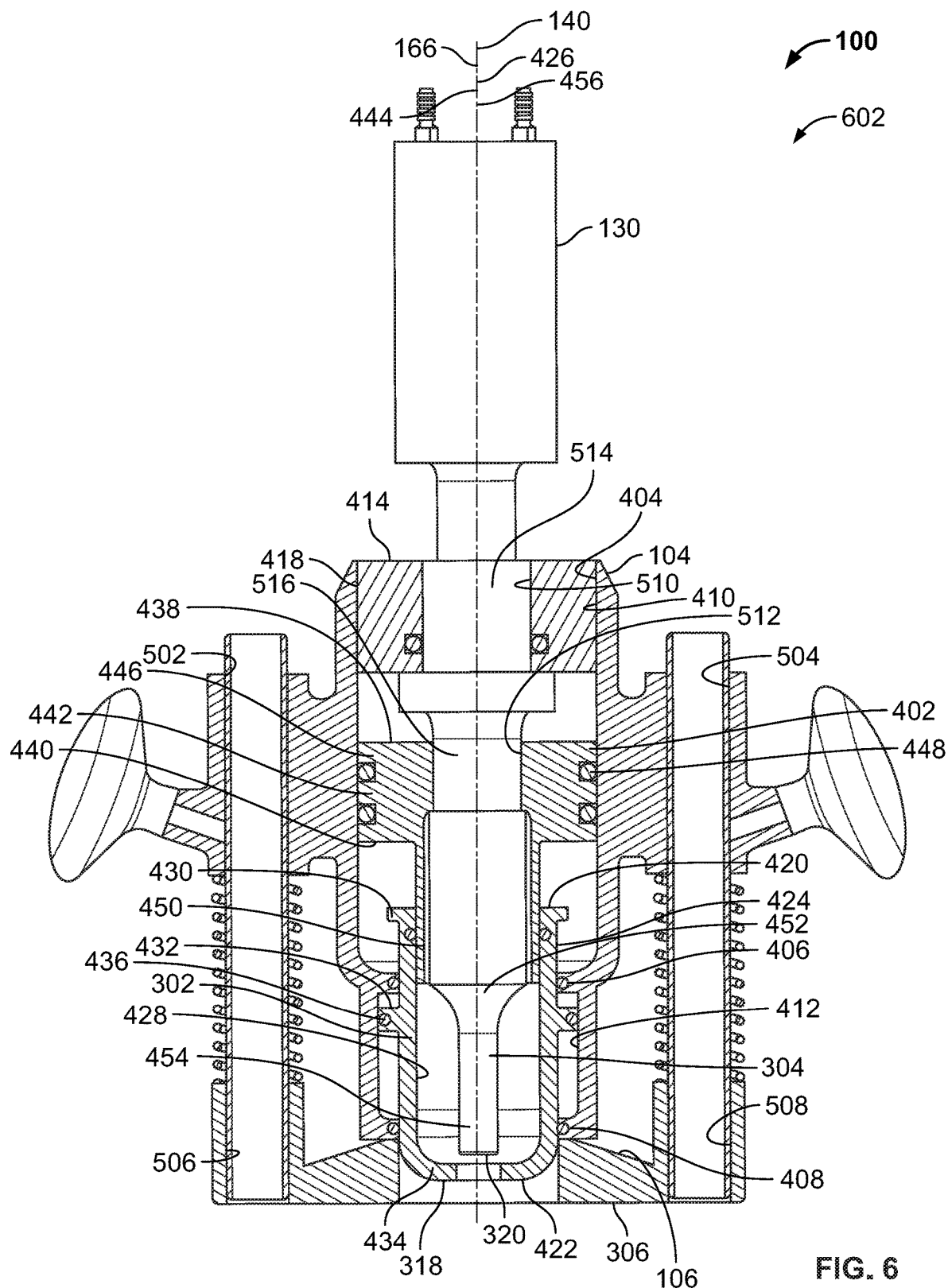
FIG. 6 is a cross-sectional view of the welding tool of FIGS. 1-5 shown in a second example configuration.
Figure 7:
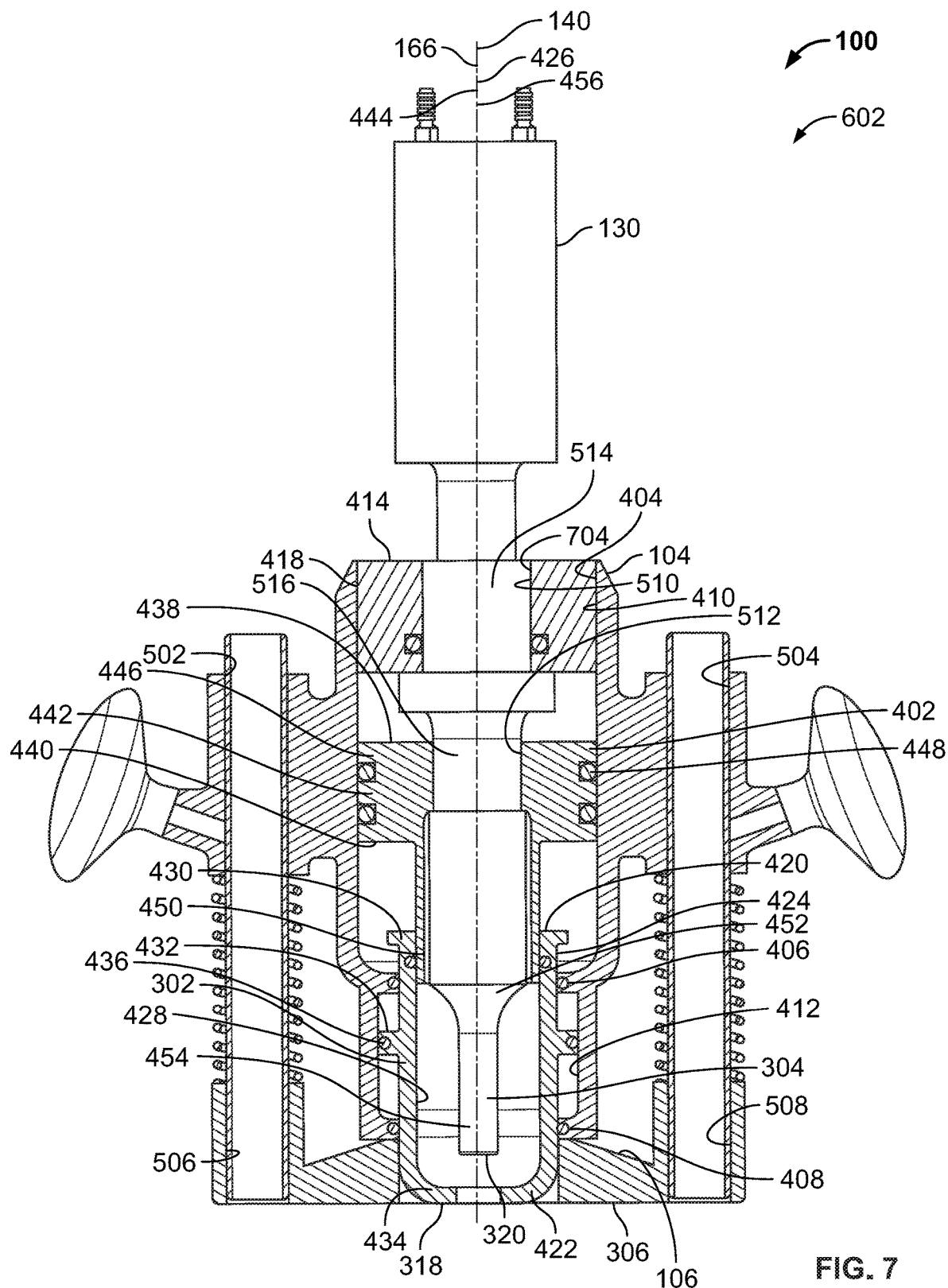
FIG. 7 is a cross-sectional view of the welding tool of FIGS. 1-6 shown in a third example configuration.
Figure 8:
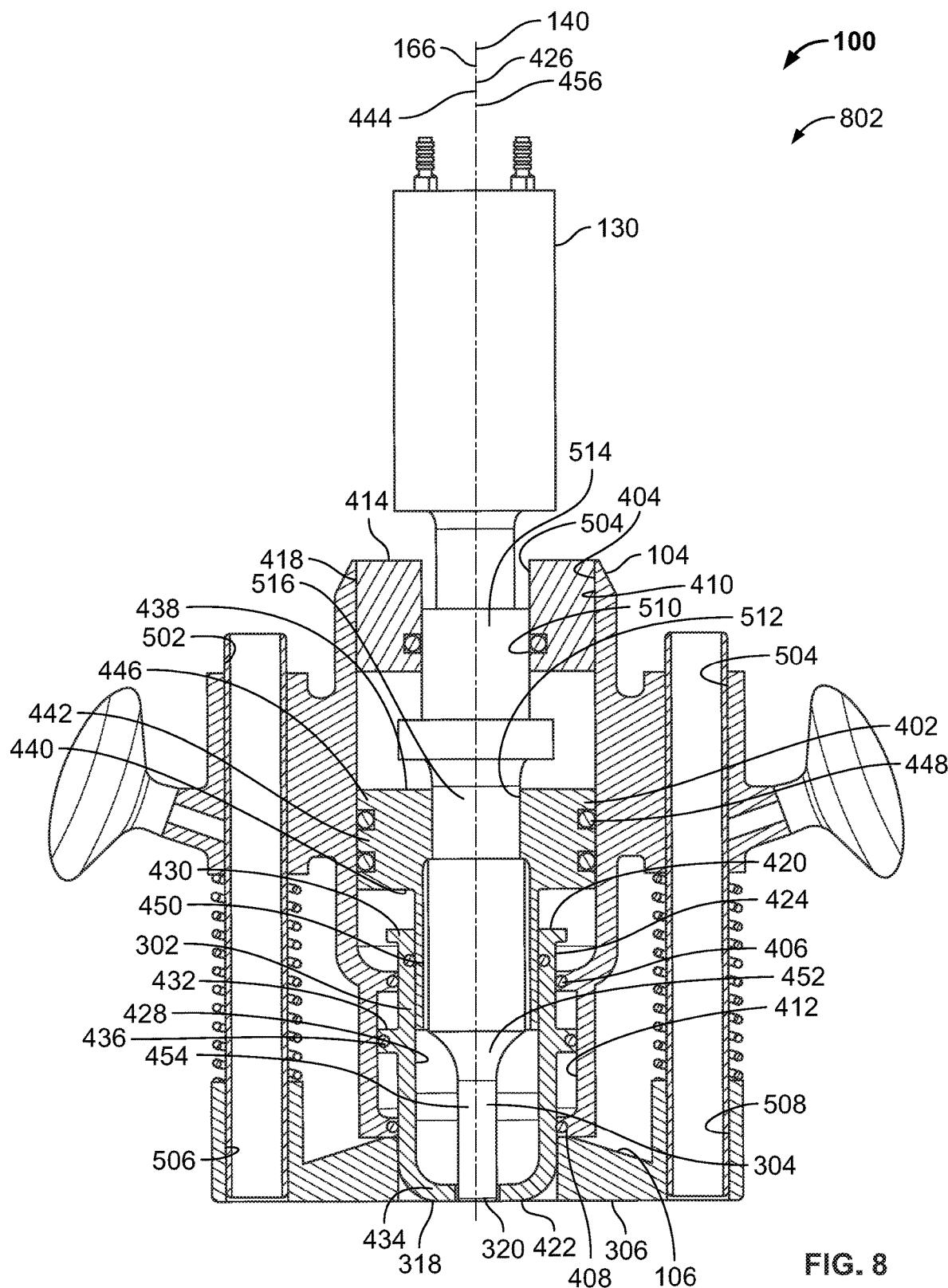
FIG. 8 is a cross-sectional view of the welding tool of FIGS. 1-7 shown in a fourth example configuration.

FIG. 1 is a perspective view of an example welding tool 100 constructed in accordance with the teachings of this disclosure and shown in a first example configuration 102. FIG. 2 is a side view of the welding tool 100 shown in the first configuration 102. FIG. 3 is a bottom view of the welding tool 100 shown in the first configuration 102. FIG. 4 is a partial cutaway view of the welding tool 100 shown in the first configuration 102. FIG. 5 is a cross-sectional view of the welding tool 100 shown in the first configuration 102. FIG. 6 is a cross-sectional view of the welding tool 100 shown in a second example configuration 602. FIG. 7 is a cross-sectional view of the welding tool 100 shown in a third example configuration 702. FIG. 8 is a cross-sectional view of the welding tool 100 shown in a fourth example configuration 802.

The welding tool 100 of FIGS. 1-8 includes an example housing 104, an example stabilization foot 106, a first example rod 108, a second example rod 110, a first example spring 112, a second example spring 114, a first example hand grip 116, a second example hand grip 118, an example cap 120, a first example air pressure conduit 122, a second example air pressure conduit 124, a third example air pressure conduit 126, a fourth example air pressure conduit 128, an example ultrasonic exciter 130, an example compaction foot 302, an example welder 304, and an example air cylinder 402.

The housing 104 of the welding tool 100 is configured to house, receive, contain, and/or carry one or more portion(s) of the first rod 108, the second rod 110, the first hand grip 116, the second hand grip 118, the cap 120, the first air pressure conduit 122, the second air pressure conduit 124, the third air pressure conduit 126, the fourth air pressure conduit 128, the ultrasonic exciter 130, the compaction foot 302, the welder 304, and/or the air cylinder 402 of the welding tool 100. In the illustrated example of FIGS. 1-8, the housing 104 includes an example central portion 132. The central portion 132 of the housing 104 includes an example upper (e.g., top) end 134, an example lower (e.g., bottom) end 136 located opposite the upper end 134, an example sidewall 138 extending between the upper end 134 and the lower end 136, and an example central axis 140. The upper end 134 of the central portion 132 is oriented away from the stabilization foot 106, and the lower end 136 of the central portion 132 is oriented toward the stabilization foot 106. In the illustrated example of FIGS. 1-8, the sidewall 138 of the central portion 132 has a circular cross-sectional shape and/or area. In other examples, the sidewall 138 of the central portion 132 can have a different cross-sectional shape and/or area (e.g., a non-circular cross-sectional shape and/or area, a differently sized cross-sectional shape and/or area, etc.).

Referring to FIG. 4, which is a cutaway view showing interior structure of the welding tool 100, the central portion 132 of the housing 104 can be seen to include an example opening 404 defined by the sidewall 138. The opening 404 of the central portion 132 extends from the upper end 134 of the central portion 132 through to the lower end 136 of the central portion 132 in a direction parallel to and coaxially aligned with the central axis 140. The opening 404 of the central portion 132 is configured to receive one or more portion(s) of the cap 120, the ultrasonic exciter 130, the compaction foot 302, the welder 304, and/or the air cylinder 402 of the welding tool 100, such that the received portion(s) of the cap 120, the ultrasonic exciter 130, the compaction foot 302, the welder 304, and/or the air cylinder 402 is/are circumscribed and/or otherwise bounded by the sidewall 138 of the central portion 132 of the housing 104, as further described below. In the illustrated example of FIGS. 1-8, the opening 404 of the central portion 132 has a circular cross-sectional shape and/or area. In other examples, the opening 404 of the central portion 132 can have a different cross-sectional shape and/or area (e.g., a non-circular cross-sectional shape and/or area, a differently sized cross-sectional shape and/or area, etc.).

As can be seen in FIG. 4, the central portion 132 of the housing 104 further includes a first example inwardly-extending flange 406 located between the upper end 134 and the lower end 136 of the central portion 132 and extending inwardly from the sidewall 138, and a second example inwardly-extending flange 408 located at and/or proximate to the lower end 136 of the central portion 132 and extending inwardly from the sidewall 138. The first inwardly-extending flange 406 of the central portion 132 separates the opening 404 of the central portion 132 into a first example cavity 410 and a second example cavity 412. The first cavity 410 of the opening 404 is bounded by the sidewall 138 of the central portion 132, and extends between the upper end 134 of the central portion 132 and the first inwardly-extending flange 406 of the central portion 132. The second cavity 412 is bounded by the sidewall 138 of the central portion 132, and extends between the first inwardly-extending flange 406 of the central portion 132 and the second inwardly-extending flange 408 of the central portion 132. In the illustrated example of FIGS. 1-8, the first and second inwardly-extending flanges 406, 408 of the central portion 132 and the first and second cavities 410, 412 of the opening 404 each have a circular cross-sectional shape and/or area. In other examples, one or more of the first and second inwardly-extending flanges 406, 408 of the central portion 132 and/or the first and second cavities 410, 412 of the opening 404 can have a different cross-sectional shape and/or area (e.g., a non-circular cross-sectional shape and/or area, a differently sized cross-sectional shape and/or area, etc.).

In addition to the central portion 132 described above, the housing 104 further includes a first example arm 142 coupled to and extending laterally (e.g., radially) away from the central portion 132 in a first direction, and a second example arm 144 coupled to and extending laterally (e.g., radially) away from the central portion 132 in a second direction that is generally opposite the first direction. Thus, the first arm 142 and the second arm 144 are generally located on opposite sides of the central portion 132 of the housing 104. In the illustrated example of FIGS. 1-8, the first arm 142 and the second arm 144 are integrally formed with the central portion 132 of the housing 104. In other examples, the first arm 142 and/or the second arm 144 can alternatively be coupled (e.g., rigidly and/or fixedly coupled) to the central portion 132 of the housing 104 via one or more mechanical fastener(s).

The first arm 142 of the housing 104 includes an example upper (e.g., top) end 146, an example lower (e.g., bottom) end 148 located opposite the upper end 146, and an example sidewall 150 extending between the upper end 146 and the lower end 148. The upper end 146 of the first arm 142 is oriented away from the stabilization foot 106, and the lower end 148 of the first arm 142 is oriented toward the stabilization foot 106. In the illustrated example of FIGS. 1-8, the sidewall 150 of the first arm 142 has a circular cross-sectional shape and/or area. In other examples, the sidewall 150 of the first arm 142 can have a different cross-sectional shape and/or area (e.g., a non-circular cross-sectional shape and/or area, a differently sized cross-sectional shape and/or area, etc.).

Referring to FIG. 5, which shows a cross-sectional view of the welding tool 100, the first arm 142 of the housing 104 can be seen to include an example opening 502 defined by the sidewall 150. The opening 502 of the first arm 142 extends from the upper end 146 of the first arm 142 through to the lower end 148 of the first arm 142 in a direction parallel to and laterally (e.g., radially) offset from the central axis 140 of the central portion 132 of the housing 104. The opening 502 of the first arm 142 is configured to receive a portion of the first rod 108 of the welding tool 100 such that the received portion of the first rod 108 is circumscribed and/or otherwise bounded by the sidewall 150 of the first arm 142 of the housing 104. The opening 502 of the first arm 142 slidably receives the first rod 108 of the welding tool 100 such that the first arm 142 and/or, more generally, the housing 104 of the welding tool 100 is slidable along the first rod 108 relative to (e.g., toward and/or away from) the stabilization foot 106 of the welding tool 100. In the illustrated example of FIGS. 1-8, the opening 502 of the first arm 142 has a circular cross-sectional shape and/or area. In other examples, the opening 502 of the first arm 142 can have a different cross-sectional shape and/or area (e.g., a non-circular cross-sectional shape and/or area, a differently sized cross-sectional shape and/or area, etc.).

The second arm 144 of the housing 104 includes an example upper (e.g., top) end 152, an example lower (e.g., bottom) end 154 located opposite the upper end 152, and an example sidewall 156 extending between the upper end 152 and the lower end 154. The upper end 152 of the second arm 144 is oriented away from the stabilization foot 106, and the lower end 154 of the second arm 144 is oriented toward the stabilization foot 106. In the illustrated example of FIGS. 1-8, the sidewall 156 of the second arm 144 has a circular cross-sectional shape and/or area. In other examples, the sidewall 156 of the second arm 144 can have a different cross-sectional shape and/or area (e.g., a non-circular cross-sectional shape and/or area, a differently sized cross-sectional shape and/or area, etc.).

Referring to FIG. 5, the second arm 144 of the housing 104 can be seen to include an example opening 504 defined by the sidewall 156. The opening 504 of the second arm 144 extends from the upper end 152 of the second arm 144 through to the lower end 154 of the second arm 144 in a direction parallel to and laterally (e.g. radially) offset from the central axis 140 of the central portion 132 of the housing 104. The opening 504 of the second arm 144 is configured to receive a portion of the second rod 110 of the welding tool 100 such that the received portion of the second rod 110 is circumscribed and/or otherwise bounded by the sidewall 156 of the second arm 144 of the housing 104. The opening 504 of the second arm 144 slidably receives the second rod 110 of the welding tool 100 such that the second arm 144 and/or, more generally, the housing 104 of the welding tool 100 is slidable along the second rod 110 relative to (e.g., toward and/or away from) the stabilization foot 106 of the welding tool 100. In the illustrated example of FIGS. 1-8, the opening 504 of the second arm 144 has a circular cross-sectional shape and/or area. In other examples, the opening 504 of the second arm 144 can have a different cross-sectional shape and/or area (e.g., a non-circular cross-sectional shape and/or area, a differently sized cross-sectional shape and/or area, etc.).

As discussed above, the first and second arms 142, 144 of the housing 104 are integrally formed with the central portion 132 of the housing 104. The central portion 132, the first arm 142, and the second arm 144 of the housing 104 are accordingly movable (e.g., slidable) in unison relative to (e.g., toward and/or away from) the stabilization foot 106. Movement of the housing 104 (e.g., including the central portion 132 and the first and second arms 142, 144) toward the stabilization foot 106 is manually performed and/or manually controlled by a user (e.g., a human operator) of the welding tool 100, and is facilitated via the first hand grip 116 and/or the second hand grip 118 of the welding tool 100. In the illustrated example of FIGS. 1-8, the first hand grip 116 is coupled to and extends away from the first arm 142 and/or the central portion 132 of the housing 104 in a first direction, and the second hand grip 118 is coupled to and extends away from the second arm 144 and/or the central portion 132 of the housing 104 in a second direction that is generally opposite the first direction. Thus, the first hand grip 116 and the second hand grip 118 are generally located on opposite sides of the central portion 132 of the housing 104. The first hand grip 116 and the second hand grip 118 are ergonomically configured (e.g., ergonomically, sized, shaped, oriented, and/or arranged) to be efficiently and/or comfortably gripped, grasped, and/or held by the hands of an average adult-sized user of the welding tool 100. In the illustrated example of FIGS. 1-8, the first hand grip 116 and the second hand grip 118 each have an ellipsoidal and/or bulb-like shape. In other examples, the first hand grip 116 and/or the second hand grip 118 can have a different shape (e.g., a non-ellipsoidal and/or non-bulb-like shape).

The stabilization foot 106 of the welding tool 100 is configured to engage and/or stabilize one or more thermoplastic part(s) of a thermoplastic composite layup prior to, during, and/or following a compaction operation to be performed using the welding tool 100, and/or prior to, during, and/or following a welding operation to be performed using the welding tool 100. In the illustrated example of FIGS. 1-8, the stabilization foot 106 includes an example base 158. The base 158 of the stabilization foot 106 includes an example upper surface 160, an example lower (e.g., bottom) surface 162 located opposite the upper surface 160, an example peripheral edge 164 extending between the upper surface 160 and the lower surface 162, and an example central axis 166. The upper surface 160 of the base 158 is oriented toward the central portion 132 of the housing 104, and the lower surface 162 of the base 158 is oriented away from the central portion 132 of the housing 104. Referring also to FIG. 3, which shows a bottom view of welding tool 100, the lower surface 162 of the base 158 can be seen to form an example stabilization surface 306 that is configured to engage and/or stabilize one or more thermoplastic part(s) of a thermoplastic composite layup. In the illustrated example of FIGS. 1-8, the stabilization surface 306 of the base 158 is substantially flat and/or planar. In other examples, the stabilization surface 306 of the base 158 can alternatively be curved (e.g., non-planar), contoured, or otherwise shaped to support and/or complement an associated geometry of one or more thermoplastic part(s) of a thermoplastic composite layup. The central axis 166 of the base 158 of the stabilization foot 106 is parallel to and coaxially aligned with the central axis 140 of the central portion 132 of the housing 104. In the illustrated example of FIGS. 1-8, the peripheral edge 164 and the stabilization surface 306 of the base 158 each have a circular cross-sectional shape and/or area. In other examples, the peripheral edge 164 and/or the stabilization surface 306 of the base 158 can have a different cross-sectional shape and/or area (e.g., a non-circular cross-sectional shape and/or area, a differently sized cross-sectional shape and/or area, etc.).

As can be seen in FIG. 3, the base 158 of the stabilization foot 106 includes an example central opening 308, a first example offset opening 310, and a second example offset opening 312. The central opening 308 of the base 158 extends from the upper surface 160 of the base 158 through to the lower surface 162 of the base 158 in a direction parallel to and coaxially aligned with central axis 166. In the illustrated example of FIGS. 1-8, the central opening 308 of the base 158 of the stabilization foot 106 is parallel to and coaxially aligned with the opening 404 of the central portion 132 of the housing 104. The central opening 308 of the base 158 is configured to receive (e.g., slidably receive) one or more portion(s) of the compaction foot 302 and/or the welder 304 such that the received portion(s) of the compaction foot 302 and/or the welder 304 is/are circumscribed and/or otherwise bounded by the base 158 of the stabilization foot 106, as further described below. In the illustrated example of FIGS. 1-8, the central opening 308 of the base 158 has a circular cross-sectional shape and/or area. In other examples, the central opening 308 of the base 158 can have a different cross-sectional shape and/or area (e.g., a non-circular cross-sectional shape and/or area, a differently sized cross-sectional shape and/or area, etc.).

The first offset opening 310 of the base 158 extends from the upper surface 160 of the base 158 through to the lower surface 162 of the base 158 in a direction parallel to and laterally (e.g., radially) offset from the central axis 166. In the illustrated example of FIGS. 1-8, the first offset opening 310 of the base 158 of the stabilization foot 106 is parallel to and coaxially aligned with the opening 502 of the first arm 142 of the housing 104. The first offset opening 310 of the base 158 is configured to receive a portion of the first rod 108 of the welding tool 100 such that the received portion of the first rod 108 is circumscribed and/or otherwise bounded by the base 158 of the stabilization foot 106, as further described below. In the illustrated example of FIGS. 1-8, the first offset opening 310 of the base 158 has a circular cross-sectional shape and/or area. In other examples, the first offset opening 310 of the base 158 can have a different cross-sectional shape and/or area (e.g., a non-circular cross-sectional shape and/or area, a differently sized cross-sectional shape and/or area, etc.).

The second offset opening 312 of the base 158 extends from the upper surface 160 of the base 158 through to the lower surface 162 of the base 158 in a direction parallel to and laterally (e.g., radially) offset from the central axis 166. In the illustrated example of FIGS. 1-8, the second offset opening 312 of the base 158 of the stabilization foot 106 is parallel to and coaxially aligned with the opening 504 of the second arm 144 of the housing 104. The second offset opening 312 of the base 158 is configured to receive a portion of the second rod 110 of the welding tool 100 such that the received portion of the second rod 110 is circumscribed and/or otherwise bounded by the base 158 of the stabilization foot 106, as further described below. In the illustrated example of FIGS. 1-8, the second offset opening 312 of the base 158 has a circular cross-sectional shape and/or area. In other examples, the second offset opening 312 of the base 158 can have a different cross-sectional shape and/or area (e.g., a non-circular cross-sectional shape and/or area, a differently sized cross-sectional shape and/or area, etc.).

While the base 158 of the stabilization foot 106 shown in FIGS. 1-8 includes the central opening 308, the first offset opening 310, and the second offset opening 312 as described above, in other examples the first offset opening 310 and/or the second offset opening 312 can be omitted from the base 158 of the stabilization foot 106. For example, the base 158 of the stabilization foot 106 can alternatively include the central opening 308, and can omit the first and second offset openings 310, 312.

In addition to the base 158 described above, the stabilization foot 106 further includes a first example leg 168 and a second example leg 170 respectively coupled to and extending upward from the base 158. The second leg 170 is located above the first offset opening 310 of the base 158 of the stabilization foot 106, and the second leg 170 is located above the second offset opening 312 of the base 158 of the stabilization foot 106. In the illustrated example of FIGS. 1-8, the first leg 168 and the second leg 170 are integrally formed with the base 158 of the stabilization foot 106. In other examples, the first leg 168 and/or the second leg 170 can alternatively be coupled (e.g., rigidly and/or fixedly coupled) to the base 158 of the stabilization foot 106 via one or more mechanical fastener(s).

The first leg 168 of the stabilization foot 106 includes an example upper (e.g., top) end 172, an example lower (e.g., bottom) end 174 located opposite the upper end 172, and an example sidewall 176 extending between the upper end 172 and the lower end 174. The upper end 172 of the first leg 168 is oriented toward the first arm 142 of the housing 104, and the lower end 174 of the first leg 168 is oriented away from the first arm 142 of the housing 104. In the illustrated example of FIGS. 1-8, the sidewall 176 of the first leg 168 has a circular cross-sectional shape and/or area. In other examples, the sidewall 176 of the first leg 168 can have a different cross-sectional shape and/or area (e.g., a non-circular cross-sectional shape and/or area, a differently sized cross-sectional shape and/or area, etc.).

Referring to FIG. 5, the first leg 168 of the stabilization foot 106 can be seen to include an example opening 506 defined by the sidewall 176. The opening 506 of the first leg 168 extends from the upper end 172 of the first leg 168 through to the lower end 174 of the first leg 168 in a direction parallel to and laterally (e.g. radially) offset from the central axis 166 of the base 158 of the stabilization foot 106. In the illustrated example of FIGS. 1-8, the opening 506 of the first leg 168 of the stabilization foot 106 is parallel to and coaxially aligned with the opening 502 of the first arm 142 of the housing 104, and/or parallel to and coaxially aligned with the first offset opening 310 of the base 158 of the stabilization foot 106. The opening 506 of the first leg 168 is configured to receive a portion of the first rod 108 of the welding tool 100 such that the received portion of the first rod 108 is circumscribed and/or otherwise bounded by the sidewall 176 of the first leg 168 of the stabilization foot 106. The opening 506 of the first leg 168 receives the first rod 108 such that the first rod 108 is rigidly, fixedly, and/or non-movably coupled (e.g., via a threaded engagement, an adhesive, etc.) to the first leg 168 and/or, more generally, to the stabilization foot 106. In the illustrated example of FIGS. 1-8, the opening 506 of the first leg 168 has a circular cross-sectional shape and/or area. In other examples, the opening 506 of the first leg 168 can have a different cross-sectional shape and/or area (e.g., a non-circular cross-sectional shape and/or area, a differently sized cross-sectional shape and/or area, etc.).

The second leg 170 of the stabilization foot 106 includes an example upper (e.g., top) end 178, an example lower (e.g., bottom) end 180 located opposite the upper end 178, and an example sidewall 182 extending between the upper end 178 and the lower end 180. The upper end 178 of the second leg 170 is oriented toward the second arm 144 of the housing 104, and the lower end 180 of the second leg 170 is oriented away from the second arm 144 of the housing 104. In the illustrated example of FIGS. 1-8, the sidewall 182 of the second leg 170 has a circular cross-sectional shape and/or area. In other examples, the sidewall 182 of the second leg 170 can have a different cross-sectional shape and/or area (e.g., a non-circular cross-sectional shape and/or area, a differently sized cross-sectional shape and/or area, etc.).

Referring to FIG. 5, the second leg 170 of the stabilization foot 106 can be seen to include an example opening 508 defined by the sidewall 182. The opening 508 of the second leg 170 extends from the upper end 178 of the second leg 170 through to the lower end 180 of the second leg 170 in a direction parallel to and laterally (e.g. radially) offset from the central axis 166 of the base 158 of the stabilization foot 106. In the illustrated example of FIGS. 1-8, the opening 508 of the second leg 170 of the stabilization foot 106 is parallel to and coaxially aligned with the opening 504 of the second arm 144 of the housing 104, and/or parallel to and coaxially aligned with the second offset opening 312 of the base 158 of the stabilization foot 106. The opening 508 of the second leg 170 is configured to receive a portion of the second rod 110 of the welding tool 100 such that the received portion of the second rod 110 is circumscribed and/or otherwise bounded by the sidewall 182 of the second leg 170 of the stabilization foot 106. The opening 508 of the second leg 170 receives the second rod 110 such that the second rod 110 is rigidly, fixedly, and/or non-movably coupled (e.g., via a threaded engagement, an adhesive, etc.) to the second leg 170 and/or, more generally, to the stabilization foot 106. In the illustrated example of FIGS. 1-8, the opening 508 of the second leg 170 has a circular cross-sectional shape and/or area. In other examples, the opening 508 of the second leg 170 can have a different cross-sectional shape and/or area (e.g., a non-circular cross-sectional shape and/or area, a differently sized cross-sectional shape and/or area, etc.).

The first rod 108 of the welding tool 100 is configured to guide movement of the housing 104 of the welding tool 100 relative to (e.g., toward or away from) the stabilization foot 106. In the illustrated example of FIGS. 1-8, the first rod 108 includes an example upper (e.g., top) end 184, and, as can be seen in FIG. 3, an example lower (e.g., bottom) end 314 located opposite the upper end 184. A portion of the first rod 108 proximate the upper end 184 of the first rod 108 is located and/or positioned within the opening 502 of the first arm 142 of the housing 104 such that the first arm 142 of the housing 104 is slidably coupled to the first rod 108. In some examples, a portion of the first rod 108 located proximate the upper end 184 of the first rod 108 can include a mechanical stop (e.g., an outwardly-extending flange) configured to prevent the first arm 142 of the housing 104 from sliding upwardly past and/or off of the upper end 184 of the first rod 108. A portion of the first rod 108 proximate the lower end 314 of the first rod 108 is located and/or positioned within the opening 506 of the first leg 168 of the stabilization foot 106 and/or within the first offset opening 310 of the base 158 of the stabilization foot 106 such that the first rod 108 is rigidly and/or fixedly coupled to the first leg 168 and/or the base 158 of the stabilization foot 106. In some examples, a portion of the first rod 108 proximate the lower end 314 of the first rod 108 can include threads configured to mate with a threaded portion of the opening 506 of the first leg 168 of the stabilization foot 106 and/or with a threaded portion of the first offset opening 310 of the base 158 of the stabilization foot 106 to rigidly and/or fixedly couple the first rod 108 to the first leg 168 and/or the base 158 of the stabilization foot 106. In the illustrated example of FIGS. 1-8, the first rod 108 has a circular cross-sectional shape and/or area. In other examples, the first rod 108 can have a different cross-sectional shape and/or area (e.g., a non-circular cross-sectional shape and/or area, a differently sized cross-sectional shape and/or area, etc.).

The second rod 110 of the welding tool 100 is also configured to guide movement of the housing 104 of the welding tool 100 relative to (e.g., toward or away from) the stabilization foot 106. In the illustrated example of FIGS. 1-8, the second rod 110 includes an example upper (e.g., top) end 186, and, as can be seen in FIG. 3, an example lower (e.g., bottom) end 316 located opposite the upper end 186. A portion of the second rod 110 proximate the upper end 186 of the second rod 110 is located and/or positioned within the opening 504 of the second arm 144 of the housing 104 such that the second arm 144 of the housing 104 is slidably coupled to the second rod 110. In some examples, a portion of the second rod 110 located proximate the upper end 186 of the second rod 110 can include a mechanical stop (e.g., an outwardly-extending flange) configured to prevent the second arm 144 of the housing 104 from sliding upwardly past and/or off of the upper end 186 of the second rod 110. A portion of the second rod 110 proximate the lower end 316 of the second rod 110 is located and/or positioned within the opening 508 of the second leg 170 of the stabilization foot 106 and/or within the second offset opening 312 of the base 158 of the stabilization foot 106 such that the second rod 110 is rigidly and/or fixedly coupled to the second leg 170 and/or the base 158 of the stabilization foot 106. In some examples, a portion of the second rod 110 proximate the lower end 316 of the second rod 110 can include threads configured to mate with a threaded portion of the opening 508 of the second leg 170 of the stabilization foot 106 and/or with a threaded portion of the second offset opening 312 of the base 158 of the stabilization foot 106 to rigidly and/or fixedly couple the second rod 110 to the second leg 170 and/or the base 158 of the stabilization foot 106. In the illustrated example of FIGS. 1-8, the second rod 110 has a circular cross-sectional shape and/or area. In other examples, the second rod 110 can have a different cross-sectional shape and/or area (e.g., a non-circular cross-sectional shape and/or area, a differently sized cross-sectional shape and/or area, etc.).

The first spring 112 of the welding tool 100 is configured to bias the housing 104 of the welding tool 100 away from the stabilization foot 106 of the welding tool 100. In the illustrated example of FIGS. 1-8, the first spring 112 circumscribes (e.g., is coiled about and/or around) the first rod 108, and is located and/or positioned on the first rod 108 between the first arm 142 of the housing 104 and the first leg 168 of the stabilization foot 106. The first spring 112 includes an example upper (e.g., top) end 188 in contact with the lower end 148 of the first arm 142 of the housing 104, and an example lower (e.g., bottom) end 190 located opposite the upper end 188 and in contact with the upper end 172 of the first leg 168 of the stabilization foot 106. The first spring 112 biases the first arm 142 of the housing 104 away from the first leg 168 of the stabilization foot 106 and/or, more generally, biases the housing 104 of the welding tool 100 away from the stabilization foot 106 of the welding tool 100. In the illustrated example of FIGS. 1-8, the first spring 112 is compressible in response to a downward force of sufficient magnitude (e.g., a magnitude greater than that of a spring force associated with the first spring 112) applied to the first arm 142 of the housing 104 (e.g., by a human operator of the welding tool 100 via the first hand grip 116). Compression of the first spring 112 by such an applied downward force enables the first arm 142 of the housing 104 to move and/or slide toward the first leg 168 of the stabilization foot 106 and/or, more generally, enables the housing 104 to move and/or slide toward the stabilization foot 106.

The second spring 114 of the welding tool 100 is also configured to bias the housing 104 of the welding tool 100 away from the stabilization foot 106 of the welding tool 100. In the illustrated example of FIGS. 1-8, the second spring 114 circumscribes (e.g., is coiled about and/or around) the second rod 110, and is located and/or positioned on the second rod 110 between the second arm 144 of the housing 104 and the second leg 170 of the stabilization foot 106. The second spring 114 includes an example upper (e.g., top) end 192 in contact with the lower end 154 of the second arm 144 of the housing 104, and an example lower (e.g., bottom) end 194 located opposite the upper end 192 and in contact with the upper end 178 of the second leg 170 of the stabilization foot 106. The second spring 114 biases the second arm 144 of the housing 104 away from the second leg 170 of the stabilization foot 106 and/or, more generally, biases the housing 104 of the welding tool 100 away from the stabilization foot 106 of the welding tool 100. In the illustrated example of FIGS. 1-8, the second spring 114 is compressible in response to a downward force of sufficient magnitude (e.g., a magnitude greater than that of a spring force associated with the second spring 114) applied to the second arm 144 of the housing 104 (e.g., by a human operator of the welding tool 100 via the second hand grip 118). Compression of the second spring 114 by such an applied downward force enables the second arm 144 of the housing 104 to move and/or slide toward the second leg 170 of the stabilization foot 106 and/or, more generally, enables the housing 104 to move and/or slide toward the stabilization foot 106.

The cap 120 of the welding tool 100 is located and/or positioned within the first cavity 410 of the central portion 132 of the housing 104, and is configured to close off the upper end of the first cavity 410. As can be seen in FIG. 4, the cap 120 includes an example upper (e.g., top) end 414, an example lower (e.g., bottom) end 416 located opposite the upper end 414, and an example sidewall 418 extending between the upper end 414 and the lower end 416. The upper end 414 of the cap 120 is oriented toward the upper end 134 of the central portion 132 of the housing 104, and the lower end 416 of the cap 120 is oriented toward the lower end 136 of the central portion 132 of the housing 104. In some examples, the sidewall 418 of the cap 120 can include threads configured to mate with a threaded portion of the first cavity 410 of the central portion 132 of the housing 104 to rigidly and/or fixedly couple the cap 120 to the central portion 132 of the housing 104. In the illustrated example of FIGS. 1-8, the sidewall 418 of the cap 120 has a circular cross-sectional shape and/or area. In other examples, the sidewall 418 of the cap 120 can have a different cross-sectional shape and/or area (e.g., a non-circular cross-sectional shape and/or area, a differently sized cross-sectional shape and/or area, etc.).

Referring to FIG. 5, the cap 120 can be seen to include an example opening 510. The opening 510 of the cap 120 extends from the upper end 414 of the cap 120 through to the lower end 416 of the cap 120 in a direction parallel to and coaxially aligned with central axis 140 of the central portion 132 of the housing 104. The opening 510 of the cap 120 is configured to receive a portion of the ultrasonic exciter 130 of the welding tool 100 such that the received portion of the ultrasonic exciter 130 is circumscribed and/or otherwise bounded by the cap 120, as further described below. In some examples, the opening 510 of the cap 120, and/or the portion of the ultrasonic exciter 130 received therein, is/are fitted with or carry one or more O-rings configured to create an air-tight seal between the opening 510 of the cap 120 and the portion of the ultrasonic exciter 130 received therein. In the illustrated example of FIGS. 1-8, the opening 510 of the cap 120 has a circular cross-sectional shape and/or area. In other examples, the opening 510 of the cap 120 can have a different cross-sectional shape and/or area (e.g., a non-circular cross-sectional shape and/or area, a differently sized cross-sectional shape and/or area, etc.).

The first air pressure conduit 122 and the second air pressure conduit 124 of the welding tool 100 respectively carry pressurized air that is selectively and/or controllably supplied to the first air pressure conduit 122 and/or the second air pressure conduit 124 to control movement and/or the position of the compaction foot 302 of the welding tool 100. In the illustrated example of FIGS. 1-8, the first air pressure conduit 122 and the second air pressure conduit 124 respectively extend through the sidewall 138 of the central portion 132 of the housing 104 into the second cavity 412 of the central portion 132 of the housing 104. As further described below, the first air pressure conduit 122 extends into an upper region of the second cavity 412 located and/or positioned above an outwardly-extending flange of the compaction foot 302, and the second air pressure conduit 124 extends into a lower region of the second cavity 412 located and/or positioned below the outwardly-extending flange of the compaction foot 302. Pressurized air supplied via the first air pressure conduit 122 causes the compaction foot 302 to move toward the stabilization foot 106. Pressurized air supplied via the second air pressure conduit 124 causes the compaction foot 302 to move away from the stabilization foot 106.

The third air pressure conduit 126 and the fourth air pressure conduit 128 of the welding tool 100 respectively carry pressurized air that is selectively and/or controllably supplied to the third air pressure conduit 126 and/or the fourth air pressure conduit 128 to control movement and/or the position of the air cylinder 402 and/or the welder 304 of the welding tool 100. In the illustrated example of FIGS. 1-8, the third air pressure conduit 126 extends through the cap 120 into the first cavity 410 of the central portion 132 of the housing 104, and the fourth air pressure conduit 128 extends through the sidewall 138 of the central portion 132 of the housing 104 into the first cavity 410 of the central portion 132 of the housing 104. As further described below, the third air pressure conduit 126 extends into an upper region of the first cavity 410 located and/or positioned above a head of the air cylinder 402, and the fourth air pressure conduit 128 extends into a lower region of the first cavity 410 located and/or positioned below the head of the air cylinder 402. Pressurized air supplied via the third air pressure conduit 126 causes the air cylinder 402 and/or the welder 304 to move toward the stabilization foot 106. Pressurized air supplied via the fourth air pressure conduit 128 causes the air cylinder 402 and/or the welder 304 to move away from the stabilization foot 106.

The compaction foot 302 of the welding tool 100 is configured to engage, compact, and/or debulk one or more thermoplastic part(s) of a thermoplastic composite layup prior to, during and/or following a welding operation to be performed using the welding tool 100. As can be seen in FIG. 4, the compaction foot 302 includes an example upper (e.g., top) end 420, an example lower (e.g., bottom) end 422 located opposite the upper end 420, an example sidewall 424 extending between the upper end 420 and the lower end 422, and an example central axis 426. The upper end 420 of the compaction foot 302 is oriented away from the stabilization foot 106, and the lower end 422 of the compaction foot 302 is oriented toward the stabilization foot 106. The central axis 426 of the compaction foot 302 is parallel to and coaxially aligned with the central axis 140 of the central portion 132 of the housing 104, and/or parallel to and coaxially aligned with the central axis 166 of the base 158 of the stabilization foot 106. In the illustrated example of FIGS. 1-8, the sidewall 424 of the compaction foot 302 has a circular cross-sectional shape and/or area. In other examples, the sidewall 424 of the compaction foot 302 can have a different cross-sectional shape and/or area (e.g., a non-circular cross-sectional shape and/or area, a differently sized cross-sectional shape and/or area, etc.).

In some examples, the sidewall 424 of the compaction foot 302 contacts and/or engages an O-ring carried by the first inwardly-extending flange 406 of the central portion 132 of the housing 104, with the O-ring creating an air-tight seal between the sidewall 424 of the compaction foot 302 and the first inwardly-extending flange 406 of the central portion 132 of the housing 104. In some examples, the sidewall 424 of the compaction foot 302 contacts and/or engages an O-ring carried by the second inwardly-extending flange 408 of the central portion 132 of the housing 104, with the O-ring creating an air-tight seal between the sidewall 424 of the compaction foot 302 and the second inwardly-extending flange 408 of the central portion 132 of the housing 104. In some examples, the sidewall 424 of the compaction foot 302 carries an O-ring that contacts and/or engages a neck of the air cylinder 402, with the O-ring creating an air-tight seal between the sidewall 424 of the compaction foot 302 and the neck of the air cylinder 402.

As can be seen in FIG. 4, the compaction foot 302 further includes an example opening 428 defined by the sidewall 424. The opening 428 of the compaction foot 302 extends from the upper end 420 of the compaction foot 302 through to the lower end 422 of the compaction foot 302 in a direction parallel to and coaxially aligned with the central axis 426. The opening 428 of the compaction foot 302 is configured to receive one or more portion(s) of the welder 304 and/or the air cylinder 402, such that the received portion(s) of the welder 304 and/or the air cylinder 402 is/are circumscribed and/or otherwise bounded by the sidewall 424 of the compaction foot 302, as further described below. In the illustrated example of FIGS. 1-8, the opening 428 of the compaction foot 302 has a circular cross-sectional shape and/or area. In other examples, the opening 428 of the compaction foot 302 can have a different cross-sectional shape and/or area (e.g., a non-circular cross-sectional shape and/or area, a differently sized cross-sectional shape and/or area, etc.).

As can be seen in FIG. 4, the compaction foot 302 further includes a first example outwardly-extending flange 430 located at and/or proximate to the upper end 420 of the compaction foot 302 and extending outwardly from the sidewall 424 of the compaction foot 302, a second example outwardly-extending flange 432 located between the upper end 420 and the lower end 422 of the compaction foot 302 and extending outwardly from the sidewall 424 of the compaction foot 302, and an example inwardly-extending flange 434 located at and/or proximate to the lower end 422 of the compaction foot 302 and extending inwardly from the sidewall 424 of the compaction foot 302.

The first outwardly-extending flange 430 of the compaction foot 302 is located within the first cavity 410 of the opening 404 of the central portion 132 of the housing 104. The first outwardly-extending flange 430 of the compaction foot 302 provides a downward mechanical stop that is engageable with the first inwardly-extending flange 406 of the sidewall 138 of the central portion 132 of the housing 104 to prevent the compaction foot 302 from moving downward (e.g., toward and/or past the stabilization foot 106) beyond a configured distance. In some examples, the first outwardly-extending flange 430 of the compaction foot 302 can be removably coupled (e.g., via a threaded connection) to the sidewall 424 of the compaction foot 302 to facilitate positioning and/or securing the compaction foot 302 within the central portion 132 of the housing 104 during assembly of the welding tool 100. In the illustrated example of FIGS. 1-8, the first outwardly-extending flange 430 of the compaction foot 302 has a circular cross-sectional shape and/or area. In other examples, the first outwardly-extending flange 430 of the compaction foot 302 can have a different cross-sectional shape and/or area (e.g., a non-circular cross-sectional shape and/or area, a differently sized cross-sectional shape and/or area, etc.).

The second outwardly-extending flange 432 of the compaction foot 302 is located and/or positioned within the second cavity 412 of the opening 404 of the central portion 132 of the housing 104, and/or between the first inwardly-extending flange 406 and the second inwardly-extending flange 408 of the central portion 132 of the housing 104. As can be seen in FIG. 4, the second outwardly-extending flange 432 of the compaction foot 302 carries an example O-ring 436 that creates an air-tight seal between the second outwardly-extending flange 432 of the compaction foot 302 and the sidewall 138 of the central portion 132 of the housing 104. In this regard, the second outwardly-extending flange 432 and the O-ring 436 is/are located and/or positioned between the first air pressure conduit 122 and the second air pressure conduit 124 of the welding tool 100. Pressurized air supplied via the first air pressure conduit 122 enters an upper region of the second cavity 412 of the central portion 132 of the housing 104 located and/or positioned above the second outwardly-extending flange 432 and/or above the O-ring 436 of the compaction foot 302, and causes the compaction foot 302 to move toward and/or past the stabilization foot 106. Pressurized air supplied via the second air pressure conduit 124 enters a lower region of the second cavity 412 of the central portion 132 of the housing 104 located and/or positioned below the second outwardly-extending flange 432 and/or below the O-ring 436 of the compaction foot 302, and causes the compaction foot 302 to move away from the stabilization foot 106. In the illustrated example of FIGS. 1-8, the second outwardly-extending flange 432 of the compaction foot 302 has a circular cross-sectional shape and/or area. In other examples, the second outwardly-extending flange 432 of the compaction foot 302 can have a different cross-sectional shape and/or area (e.g., a non-circular cross-sectional shape and/or area, a differently sized cross-sectional shape and/or area, etc.).

As can be seen in FIG. 3, the inwardly-extending flange 434 of the compaction foot 302 forms an example compaction surface 318 that is configured to engage, compact and/or debulk one or more thermoplastic part(s) of a thermoplastic composite layup. In the illustrated example of FIGS. 1-8, the compaction surface 318 of the compaction foot 302 is substantially flat and/or planar. In other examples, the compaction surface 318 of the compaction foot 302 can alternatively be curved (e.g., non-planar), contoured, or otherwise shaped to support and/or complement an associated geometry of one or more thermoplastic part(s) of a thermoplastic composite layup. In the illustrated example of FIGS. 1-8, the inwardly-extending flange 434 and the compaction surface 318 of the compaction foot 302 each have a circular cross-sectional shape and/or area. In other examples, the inwardly-extending flange 434 and/or the compaction surface 318 of the compaction foot 302 can have a different cross-sectional shape and/or area (e.g., a non-circular cross-sectional shape and/or area, a differently sized cross-sectional shape and/or area, etc.).

The air cylinder 402 of the welding tool 100 is configured to move the welder 304 of the welding tool 100 relative to the housing 104 of the welding tool 100, relative to the stabilization foot 106 of the welding tool 100, and/or relative to the compaction foot 302 of the welding tool 100, with any and/or all such movements being in conjunction with a welding operation and/or process to be performed using the welding tool 100. As can be seen in FIG. 4, the air cylinder 402 includes an example upper (e.g., top) end 438, an example lower (e.g., bottom) end 440 located opposite the upper end 438, an example sidewall 442 extending between the upper end 438 and the lower end 440, and an example central axis 444. The upper end 438 of the air cylinder 402 is oriented away from the stabilization foot 106, and the lower end 440 of the air cylinder 402 is oriented toward the stabilization foot 106. The central axis 444 of the air cylinder 402 is parallel to and coaxially aligned with the central axis 140 of the central portion 132 of the housing 104, parallel to and coaxially aligned with the central axis 166 of the base 158 of the stabilization foot 106, and/or parallel to and coaxially aligned with the central axis 426 of the compaction foot 302. In the illustrated example of FIGS. 1-8, the sidewall 442 of the air cylinder 402 has a circular cross-sectional shape and/or area. In other examples, the sidewall 442 of the air cylinder 402 can have a different cross-sectional shape and/or area (e.g., a non-circular cross-sectional shape and/or area, a differently sized cross-sectional shape and/or area, etc.).

Referring to FIG. 5, the air cylinder 402 can be seen to include an example opening 512 defined by the sidewall 442. The opening 512 of the air cylinder 402 extends from the upper end 438 of the air cylinder 402 through to the lower end 440 of the air cylinder 402 in a direction parallel to and coaxially aligned with the central axis 444. The opening 512 of the air cylinder 402 is configured to receive one or more portion(s) of the welder 304 and/or the ultrasonic exciter 130 of the welding tool 100, such that the received portion(s) of the welder 304 and/or the ultrasonic exciter 130 is/are circumscribed and/or otherwise bounded by the sidewall 442 of the air cylinder 402, as further described below. In the illustrated example of FIGS. 1-8, the opening 512 of the air cylinder 402 has a circular cross-sectional shape and/or area. In other examples, the opening 512 of the air cylinder 402 can have a different cross-sectional shape and/or area (e.g., a non-circular cross-sectional shape and/or area, a differently sized cross-sectional shape and/or area, etc.).

As can be seen in FIG. 4, the air cylinder 402 further includes an example head 446 located at and/or proximate to the upper end 438 of the air cylinder 402. The head 446 of the air cylinder 402 is located within the first cavity 410 of the opening 404 of the central portion 132 of the housing 104, and/or between the cap 120 of the welding tool 100 and the first inwardly-extending flange 406 of the central portion 132 of the housing 104 of the welding tool 100. As can be seen in FIG. 4, the head 446 of the air cylinder 402 carries one or more example O-ring(s) 448 that individually and/or collectively create an air-tight seal between the head 446 of the air cylinder 402 and the sidewall 138 of the central portion 132 of the housing 104. In this regard, the head 446 and the O-ring(s) 448 is/are located and/or positioned between the third air pressure conduit 126 and the fourth air pressure conduit 128 of the welding tool 100. Pressurized air supplied via the third air pressure conduit 126 enters an upper region of the first cavity 410 of the central portion 132 of the housing 104 located and/or positioned above the head 446 and/or above the O-ring(s) 448 of the air cylinder 402, and causes the air cylinder 402 to move toward the stabilization foot 106. Pressurized air supplied via the fourth air pressure conduit 128 enters a lower region of the first cavity 410 of the central portion 132 of the housing 104 located and/or positioned below the head 446 and/or below the O-ring(s) 448 of the air cylinder 402, and causes the air cylinder 402 to move away from the stabilization foot 106. In the illustrated example of FIGS. 1-8, the head 446 of the air cylinder 402 has a circular cross-sectional shape and/or area. In other examples, the head 446 of the air cylinder 402 can have a different cross-sectional shape and/or area (e.g., a non-circular cross-sectional shape and/or area, a differently sized cross-sectional shape and/or area, etc.).

As can be seen in FIG. 4, the air cylinder 402 further includes an example neck 450 located at and/or proximate to the lower end 440 of the air cylinder 402. The neck 450 of the air cylinder 402 is configured to be slidably received within the opening 428 of the compaction foot 302 such that the air cylinder 402 is movable relative to the stabilization foot 106 independently from the compaction foot 302 moving relative to the stabilization foot 106, and vice-versa. In the illustrated example of FIGS. 1-8, the neck 450 of the air cylinder 402 has a circular cross-sectional shape and/or area. In other examples, the neck 450 of the air cylinder 402 can have a different cross-sectional shape and/or area (e.g., a non-circular cross-sectional shape and/or area, a differently sized cross-sectional shape and/or area, etc.).

The welder 304 of the welding tool 100 is configured to weld (e.g., tack weld) a thermoplastic part to one or more other thermoplastic part(s) of a thermoplastic composite layup in conjunction with a welding operation to be performed using the welding tool 100, during a compaction operation to be performed using the welding tool 100, and/or during a stabilization operation to be performed using the welding tool 100. The welder 304 can be implemented as an ultrasonic welder that is powered, controlled and/or operated by the ultrasonic exciter 130 and/or by a power supply operatively coupled to the ultrasonic exciter 130. In some examples, a power supply configured to power the ultrasonic exciter 130 and/or the welder 304 can be mounted on the welding tool 100. In other examples, the power supply can alternatively be located remotely from the welding tool 100. In some examples, the power supply is adjustable such that the ultrasonic exciter 130 and/or the welder 304 can operate at different (e.g., adjustable) power settings depending upon material and/or specification requirements associated with the welding operation to be performed.

As can be seen in FIG. 4, the welder 304 includes an example horn 452, an example welding tip 454, and an example central axis 456. The central axis 456 of the welder 304 is parallel to and coaxially aligned with the central axis 140 of the central portion 132 of the housing 104, parallel to and coaxially aligned with the central axis 166 of the base 158 of the stabilization foot 106, parallel to and coaxially aligned with the central axis 426 of the compaction foot 302, and/or parallel to and coaxially aligned with the central axis 444 of the air cylinder 402. In the illustrated example of FIGS. 1-8, the welder 304 has a circular cross-sectional shape and/or area. In other examples, the welder 304 can have a different cross-sectional shape and/or area (e.g., a non-circular cross-sectional shape and/or area, a differently sized cross-sectional shape and/or area, etc.).

The horn 452 of the welder 304 is located and/or positioned within the opening 512 and/or the neck 450 of the air cylinder 402 such that the horn 452 and/or, more generally, the welder 304 is rigidly and/or fixedly coupled to the air cylinder 402. In some examples, the horn 452 can include threads configured to mate with a threaded portion of the opening 512 of the air cylinder 402 to rigidly and/or fixedly couple the horn 452 and/or, more generally, the welder 304 to the air cylinder 402. In other examples, the horn 452 can additionally or alternatively include threads configured to mate with a threaded portion of the ultrasonic exciter 130 to rigidly and/or fixedly couple the horn 452 and/or, more generally, the welder 304 to the ultrasonic exciter 130. In the illustrated example of FIGS. 1-8, the horn 452 has a circular cross-sectional shape and/or area. In other examples, the horn 452 can have a different cross-sectional shape and/or area (e.g., a non-circular cross-sectional shape and/or area, a differently sized cross-sectional shape and/or area, etc.).

As can be seen in FIG. 3, the welding tip 454 of the welder 304 forms an example welding surface 320 that is configured to weld a thermoplastic part to one or more other thermoplastic part(s) of a thermoplastic composite layup. In the illustrated example of FIGS. 1-8, the welding surface 320 of the welding tip 454 is substantially flat and/or planar. In other examples, the welding surface 320 of the welding tip 454 can alternatively be curved (e.g., non-planar), contoured, or otherwise shaped. In the illustrated example of FIGS. 1-8, the welding tip 454 and the welding surface 320 each have a circular cross-sectional shape and/or area. In other examples, the welding tip 454 and/or the welding surface 320 can have a different cross-sectional shape and/or area (e.g., a non-circular cross-sectional shape and/or area, a differently sized cross-sectional shape and/or area, etc.).

The ultrasonic exciter 130 of the welding tool 100 is configured to generate ultrasonic signals (e.g., via a generator and a transducer of the ultrasonic exciter 130), and to mechanically transfer the generated ultrasonic signals to the horn 452 of the welder 304. Referring to FIG. 5, the ultrasonic exciter 130 can be seen to include a first example portion 514 located and/or positioned within the opening 510 of the cap 120, and a second example portion 516 located and/or positioned within the opening 512 of the air cylinder 402. The ultrasonic exciter 130 is movable along the central axis 140 of the central portion 132 of the housing 104 in unison with movement of the air cylinder 402 and/or movement of the welder 304. In the illustrated example of FIGS. 1-8, the ultrasonic exciter 130 has a circular cross-sectional shape and/or area. In other examples, the ultrasonic exciter 130 can have a different cross-sectional shape and/or area (e.g., a non-circular cross-sectional shape and/or area, a differently sized cross-sectional shape and/or area, etc.).

In the illustrated example of FIGS. 1-8, the welding surface 320 of the welder 304, the compaction surface 318 of the compaction foot 302, and the stabilization surface 306 of the stabilization foot 106 are concentrically located and/or positioned relative to one another, with the compaction surface 318 circumscribing the welding surface 320, and the stabilization surface 306 circumscribing the compaction surface 318. When the welding tool 100 is placed on a first thermoplastic part of a thermoplastic composite layup, the stabilization surface 306 is configured to provide and/or impart a first pressure and/or a first force to the first thermoplastic part, over an area consistent with the geometry of the stabilization surface 306, to stabilize the first thermoplastic part relative to one or more other thermoplastic part(s) of the thermoplastic composite layup. The compaction surface 318 in turn is configured to provide and/or impart a second pressure and/or a second force to the first thermoplastic part, over an area consistent with the geometry of the compaction surface 318, to compact and/or debulk the first thermoplastic part and/or one or more other thermoplastic part(s) of the thermoplastic composite layup. The welding surface 320 in turn is configured to provide and/or impart a third pressure and/or a third force to the first thermoplastic part, over an area consistent with the geometry of the welding surface 320, to weld (e.g., tack weld) the first thermoplastic part to one or more other thermoplastic part(s) of the thermoplastic composite layup.

The housing 104 of the welding tool 100 is movable along the central axis 140 between a neutral (e.g., uncompressed) position of the housing 104 and a compressed position of the housing 104. Movement of the housing 104 occurs relative to the stabilization foot 106. For example, the housing 104 can be moved, along the central axis 140, from an example neutral position of the housing 104 (e.g., a position in which the housing 104 is separated from the stabilization foot 106 by a first distance) associated with the first configuration 102 of the welding tool 100 shown in FIGS. 1-5 to an example compressed position of the housing 104 (e.g., a position in which the housing 104 is separated from the stabilization foot 106 by a second distance less than the first distance associated with the neutral position of the housing 104) associated with the second configuration 602 of the welding tool 100 shown in FIG. 6, the third configuration 702 of the welding tool 100 shown in FIG. 7, and/or the fourth configuration 802 of the welding tool 100 shown in FIG. 8. The first spring 112 and/or the second spring 114 of the welding tool 100 has/have a first length when the housing 104 is in the neutral position, and a second length less than the first length when the housing 104 is in the compressed position. In some examples, the central portion 132 of the housing 104 contacts the base 158 of the stabilization foot 106 when the housing 104 is in the compressed position.

The housing 104 can be moved along the central axis 140 from and/or into a variety of different compressed positions. In other words, the housing 104 can have variable and/or adjustable compressed positions. For example, the compressed position of the housing 104 can vary based on the extent and/or degree of force that may be required of the stabilization surface 306 and/or the stabilization foot 106 to stabilize a first thermoplastic part relative to one or more other thermoplastic part(s) of a thermoplastic composite layup. In some examples, the stabilization surface 306 of the stabilization foot 106 can stabilize a first thermoplastic part relative to a second thermoplastic part while the compaction surface 318 of the compaction foot 302 compacts and/or debulks the first thermoplastic part, and/or while the welding surface 320 of the welder 304 welds the first thermoplastic part to the second thermoplastic part. In such examples, once the stabilization operation is complete, the housing 104 can retract back from the compressed position of the housing 104 associated with the second configuration 602 of the welding tool 100 shown in FIG. 6, the third configuration 702 of the welding tool 100 shown in FIG. 7, and/or the fourth configuration 802 of the welding tool 100 shown in FIG. 8, to the neutral position of the housing 104 associated with the first configuration 102 of the welding tool 100 shown in FIGS. 1-5.

In the illustrated example of FIGS. 1-8, the above-described movements of the housing 104 occur and/or are performed manually by a human operator of the welding tool 100, with the housing 104 being forced toward the stabilization foot 106 in response to the human operator gripping and/or grasping the first hand grip 116 and/or the second hand grip 118 of the welding tool 100 and applying a downward force thereto. In this regard, movement of the housing 104 toward the stabilization foot 106 occurs when the operator-applied downward force is sufficiently powerful to overcome the spring force(s) generated by the first spring 112 and/or the second spring 114 of the welding tool 100 that bias the housing 104 away from the stabilization foot 106. When the stabilization surface 306 of the stabilization foot 106 is placed in contact with a thermoplastic part of a thermoplastic composite layup, an increase to the operator-applied downward force produces a corresponding and/or associated increase to the force by which the stabilization surface 306 of the stabilization foot 106 stabilizes the thermoplastic part.

The compaction foot 302 of the welding tool 100 is movable (e.g., independent of movement of the welder 304) along the central axis 426 between a retracted position of the compaction foot 302 and an extended position of the compaction foot 302. In some examples, movement of the compaction foot 302 occurs relative to the housing 104, relative to the stabilization foot 106, and/or relative to the welder 304. For example, the compaction surface 318 and/or, more generally, the compaction foot 302 can be moved, along the central axis 426, from an example retracted position of the compaction foot 302 (e.g., a position in which the compaction surface 318 of the compaction foot 302 is located above the stabilization surface 306 of the stabilization foot 106) associated with the first configuration 102 of the welding tool 100 shown in FIGS. 1-5, and/or the second configuration 602 of the welding tool 100 shown in FIG. 6, to an example extended position of the compaction foot 302 (e.g., a position in which the compaction surface 318 of the compaction foot 302 is flush with or located below the stabilization surface 306 of the stabilization foot 106) associated with the third configuration 702 of the welding tool 100 shown in FIG. 7, and/or the fourth configuration 802 of the welding tool 100 shown in FIG. 8.

The compaction surface 318 and/or, more generally, the compaction foot 302 can be moved along the central axis 426 from and/or into a variety of different extended positions. In other words, the compaction surface 318 and/or the compaction foot 302 can have variable and/or adjustable extended positions. For example, the extended position of the compaction surface 318 and/or the compaction foot 302 can vary based on the extent and/or degree of extension that may be required of the compaction surface 318 and/or the compaction foot 302 to compact and/or debulk a first thermoplastic part relative to one or more other thermoplastic part(s) of a thermoplastic composite layup. In some examples, the compaction surface 318 of the compaction foot 302 can compact and/or debulk a first thermoplastic part relative to a second thermoplastic part while the stabilization surface 306 of the stabilization foot 106 stabilizes the first thermoplastic part, and/or while the welding surface 320 of the welder 304 welds the first thermoplastic part to the second thermoplastic part. In such examples, once the compaction operation is complete, the compaction surface 318 of the compaction foot 302 can retract back from the extended position of the compaction foot 302 associated with the third configuration 702 of the welding tool 100 shown in FIG. 7, and/or the fourth configuration 802 of the welding tool 100 shown in FIG. 8, to the retracted position of the compaction foot 302 associated with the first configuration 102 of the welding tool 100 shown in FIGS. 1-5, and/or the second configuration 602 of the welding tool 100 shown in FIG. 6.

In the illustrated example of FIGS. 1-8, the above-described movements of the compaction surface 318 and/or, more generally, the compaction foot 302 occur and/or are performed in an automated manner, with the compaction foot 302 being driven and/or controlled by pressurized air delivered in a regulated manner to the compaction foot 302 through the first air pressure conduit 122 and/or the second air pressure conduit 124. The pressure and/or the force at which the compaction foot 302 operates (e.g., the pressure and/or the force at which the compaction foot 302 compacts a first thermoplastic part) can accordingly be controlled and/or adjusted via the regulated supply of pressurized air delivered to the compaction foot 302. The period of time (e.g., the duration) for which the compaction surface 318 and/or, more generally, the compaction foot 302 remains in any particular position (e.g., any retracted position or any extended position) can also be controlled and/or adjusted via the regulated supply of pressurized air to compaction foot 302. In some examples, the pressure and/or the force at which the compaction foot 302 operates, and/or the period of time for which the compaction surface 318 and/or, more generally, the compaction foot 302 remains in any particular position can be automatically determined and/or implemented based on material and/or specification requirements associated with the compaction operation and/or a welding operation to be performed. In some examples, the automated delivery and/or regulated supply of pressurized air to the compaction foot 302 can be initiated in response to a human operator of the welding tool 100 actuating a user input device (e.g., a button, a switch, a foot pedal, etc.) that is operatively coupled to the welding tool 100 and/or operatively coupled to the supply source of the pressurized air. In other examples, the automated delivery and/or regulated supply of pressurized air to the compaction foot 302 can alternatively be initiated in response to a human operator of the welding tool 100 maintaining the housing 104 in a compressed position for a predetermined time period.

The welder 304 of the welding tool 100 is movable (e.g., independent of movement of the compaction foot 302) along the central axis 456 between a retracted position of the welder 304 and an extended position of the welder 304. In some examples, movement of the welder 304 occurs relative to the housing 104, relative to the stabilization foot 106, and/or relative of the compaction foot 302. For example, the welding surface 320 and/or, more generally, the welder 304 can be moved, along the central axis 456, from an example retracted position of the welder 304 (e.g., a position in which the welding surface 320 of the welder 304 is located above the stabilization surface 306 of the stabilization foot 106, and/or above the compaction surface 318 of the compaction foot 302) associated with the first configuration 102 of the welding tool 100 shown in FIGS. 1-5, the second configuration 602 of the welding tool 100 shown in FIG. 6, and/or the third configuration 702 of the welding tool 100 shown in FIG. 7, to an example extended position of the welder 304 (e.g., a position in which the welding surface 320 of the welder 304 is flush with or located below the stabilization surface 306 of the stabilization foot 106, and/or flush with or located below the compaction surface 318 of the compaction foot 302) associated with the fourth configuration 802 of the welding tool 100 shown in FIG. 8.

The welding surface 320 and/or, more generally, the welder 304 can be moved along the central axis 456 from and/or into a variety of different extended positions. In other words, the welding surface 320 and/or the welder 304 can have variable and/or adjustable extended positions. For example, the extended position of the welding surface 320 and/or the welder 304 can vary based on the extent and/or degree of extension that may be required of the welding surface 320 and/or the welder 304 to weld (e.g., tack weld) a first thermoplastic part to one or more other thermoplastic part(s) of a thermoplastic composite layup. In some examples, the welding surface 320 of the welder 304 can weld a first thermoplastic part to a second thermoplastic part while the stabilization surface 306 of the stabilization foot 106 stabilizes the first thermoplastic part, and/or while the compaction surface 318 of the compaction foot 302 compacts the first thermoplastic part. In such examples, once the welding operation is complete, the welding surface 320 of the welder 304 can retract back from the extended position of the welder 304 associated with the fourth configuration 802 of the welding tool 100 shown in FIG. 8 to the retracted position of the welder 304 associated with the first configuration 102 of the welding tool 100 shown in FIGS. 1-5, the second configuration 602 of the welding tool 100 shown in FIG. 6, and/or the third configuration 702 of the welding tool 100 shown in FIG. 7.

In the illustrated example of FIGS. 1-8, the above-described movements of the welding surface 320 and/or, more generally, the welder 304 occur and/or are performed in an automated manner, with the welder 304 being driven and/or controlled by pressurized air delivered in a regulated manner to the air cylinder 402 through the third air pressure conduit 126 and/or the fourth air pressure conduit 128. The pressure and/or the force at which the welder 304 operates (e.g., the pressure and/or the force at which the welder 304 welds a first thermoplastic part to a second thermoplastic part) can accordingly be controlled and/or adjusted via the regulated supply of pressurized air delivered to the air cylinder 402. The period of time (e.g., the duration) for which the welding surface 320 and/or, more generally, the welder 304 remains in any particular position (e.g., any retracted position or any extended position) can also be controlled and/or adjusted via the regulated supply of pressurized air to the air cylinder 402. In some examples, the pressure and/or the force at which the welder 304 operates, and/or the period of time for which the welding surface 320 and/or, more generally, the welder 304 remains in any particular position can be automatically determined and/or implemented based on material and/or specification requirements associated with the welding operation to be performed. In some examples, the automated delivery and/or regulated supply of pressurized air to the air cylinder 402 can be initiated in response to a human operator of the welding tool 100 actuating a user input device (e.g., a button, a switch, a foot pedal, etc.) that is operatively coupled to the welding tool 100 and/or operatively coupled to the supply source of the pressurized air. In other examples, the automated delivery and/or regulated supply of pressurized air to the air cylinder 402 can alternatively be initiated in response to a human operator of the welding tool 100 maintaining the housing 104 in a compressed position for a predetermined time period.

When the welding tool 100 of FIGS. 1-8 is in the first configuration 102 shown in FIGS. 1-5, the housing 104 is in a neutral (e.g., uncompressed) position, the compaction foot 302 is in a retracted position, and the welder 304 is in a retracted position. More specifically, when the welding tool 100 is in the first configuration 102 shown in FIGS. 1-5, the lower end 136 of the central portion 132 of the housing 104 is spaced apart from the upper surface 160 of the base 158 of the stabilization foot 106 by a first distance, the compaction surface 318 of the compaction foot 302 is located and/or positioned above the stabilization surface 306 of the stabilization foot 106, and the welding surface 320 of the welder 304 is located and/or positioned above the stabilization surface 306 of the stabilization foot 106 and/or above the compaction surface 318 of the compaction foot 302.

When the welding tool 100 of FIGS. 1-8 is in the second configuration 602 shown in FIG. 6, the housing 104 is in a compressed position, the compaction foot 302 is in a retracted position, and the welder 304 is in a retracted position. More specifically, when the welding tool 100 is in the second configuration 602 shown in FIG. 6, the lower end 136 of the central portion 132 of the housing 104 is spaced apart from the upper surface 160 of the base 158 of the stabilization foot 106 by a second distance that is less than the first distance described above in connection with the first configuration 102 of FIGS. 1-5. In the illustrated example of FIG. 6, the lower end 136 of the central portion 132 of the housing 104 contacts the upper surface 160 of the base 158 of the stabilization foot 106, thereby making the second distance effectively zero. In other examples, the second distance can be greater than zero, but less than the first distance associated with the first configuration 102 of FIGS. 1-5. When the welding tool 100 is in the second configuration 602 shown in FIG. 6, the compaction surface 318 of the compaction foot 302 is located and/or positioned above the stabilization surface 306 of the stabilization foot 106, and the welding surface 320 of the welder 304 is located and/or positioned above the stabilization surface 306 of the stabilization foot 106 and/or above the compaction surface 318 of the compaction foot 302.

When the welding tool 100 of FIGS. 1-8 is in the third configuration 702 shown in FIG. 7, the housing 104 is in a compressed position, the compaction foot 302 is in an extended position, and the welder 304 is in a retracted position. More specifically, when the welding tool 100 is in the third configuration 702 shown in FIG. 7, the lower end 136 of the central portion 132 of the housing 104 is spaced apart from the upper surface 160 of the base 158 of the stabilization foot 106 by the second distance described above in connection with the second configuration 602 of FIG. 6. When the welding tool 100 is in the third configuration 702 shown in FIG. 7, the compaction surface 318 of the compaction foot 302 is located and/or positioned flush with or below (e.g., slightly below) the stabilization surface 306 of the stabilization foot 106, and the welding surface 320 of the welder 304 is located and/or positioned above the stabilization surface 306 of the stabilization foot 106 and/or above the compaction surface 318 of the compaction foot 302.

When the welding tool 100 of FIGS. 1-8 is in the fourth configuration 802 shown in FIG. 8, the housing 104 is in a compressed position, the compaction foot 302 is in an extended position, and the welder 304 is in an extended position. More specifically, when the welding tool 100 is in the fourth configuration 802 shown in FIG. 8, the lower end 136 of the central portion 132 of the housing 104 is spaced apart from the upper surface 160 of the base 158 of the stabilization foot 106 by the second distance described above in connection with the second configuration 602 of FIG. 6. When the welding tool 100 is in the fourth configuration 802 shown in FIG. 8, the compaction surface 318 of the compaction foot 302 is located and/or positioned flush with or below (e.g., slightly below) the stabilization surface 306 of the stabilization foot 106, as described above in connection with the third configuration 702 of FIG. 7. When the welding tool 100 is in the fourth configuration 802 shown in FIG. 8, the welding surface 320 of the welder 304 is located and/or positioned flush with or below (e.g., slightly below) the stabilization surface 306 of the stabilization foot 106, and/or flush with or below (e.g., slightly below) the compaction surface 318 of the compaction foot 302.

FIGS. 9-15 illustrate example stages (e.g., a first example stage 902, a second example stage 1002, a third example stage 1102, a fourth example stage 1202, a fifth example stage 1302, a sixth example stage 1402, and a seventh example stage 1502) of an example process 900 to be implemented via the welding tool 100 of FIGS. 1-8 to weld a first example thermoplastic part 904 to a second example thermoplastic part 906. As further described below, the process 900 includes stabilizing the first thermoplastic part 904 relative to the second thermoplastic part 906, compacting and/or debulking the stabilized first and second thermoplastic parts 904, 906, and welding the compacted first and second thermoplastic parts 904, 906 to one another in the course of forming a thermoplastic composite layup including at least the first thermoplastic part 904 and the second thermoplastic part 906.

The first and second thermoplastic parts 904, 906 of FIGS. 9-15 can respectively be of any size, shape, and/or configuration (e.g., a substantially flat and/or planar shape, a tapered shape, a sloped shape, a curved shape, a contoured shape, etc.). In some examples, the first thermoplastic part, 904, the second thermoplastic part 906, and/or one or more other thermoplastic part(s) of an example thermoplastic composite layup 908 including the first thermoplastic part 904, the second thermoplastic part 906, and/or the one or more other thermoplastic part(s) can include one or more ply drop(s) and/or one or more area(s) of significant bulk. In some examples, the first thermoplastic part 904 and the second thermoplastic part 906 are respectively single-ply thermoplastic parts. In other examples, the first thermoplastic part 904 and/or the second thermoplastic part 906 can alternatively be a multi-ply thermoplastic part, with the multiple plies of the multi-ply thermoplastic part(s) either being welded together or not yet welded together. In some examples, the thermoplastic composite layup 908 may be located and/or positioned on an example layup table 910 while the process 900 of FIGS. 9-15 is being performed.

Figure 9:
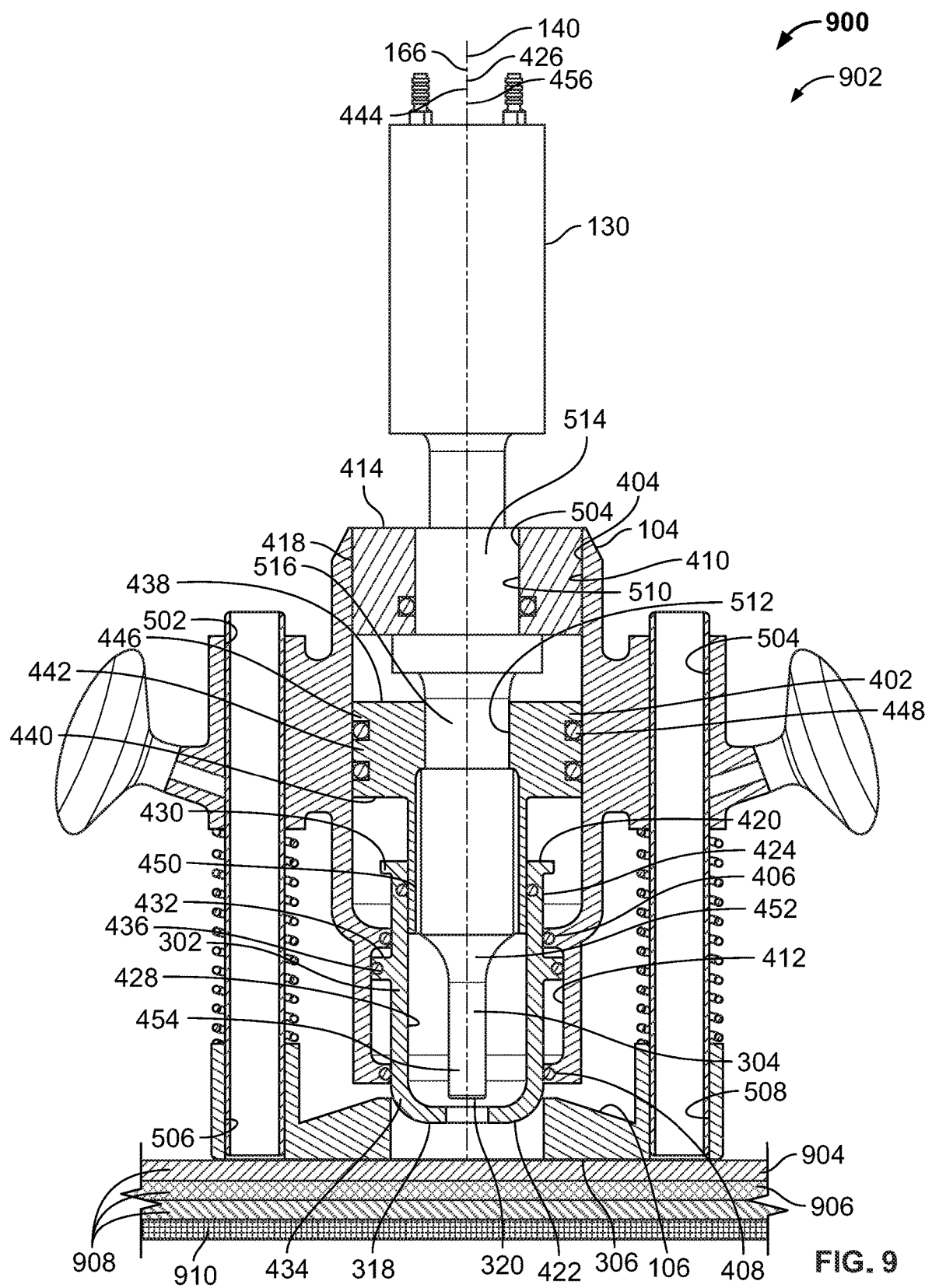
FIG. 9 illustrates a first example stage of an example process to be implemented via the welding tool of FIGS. 1-8 to weld a first example thermoplastic part to a second example thermoplastic part.

FIG. 9 illustrates the first stage 902 of the example process 900. During the first stage 902, the welding tool 100 is manually placed (e.g., by a human operator of the welding tool 100) onto the first thermoplastic part 904 such that the stabilization surface 306 of the stabilization foot 106 contacts at least a portion of the first thermoplastic part 904. The welding tool 100 is positioned and/or remains positioned in the first configuration 102 of FIGS. 1-5 described above while the first stage 902 is being performed.

Figure 10:
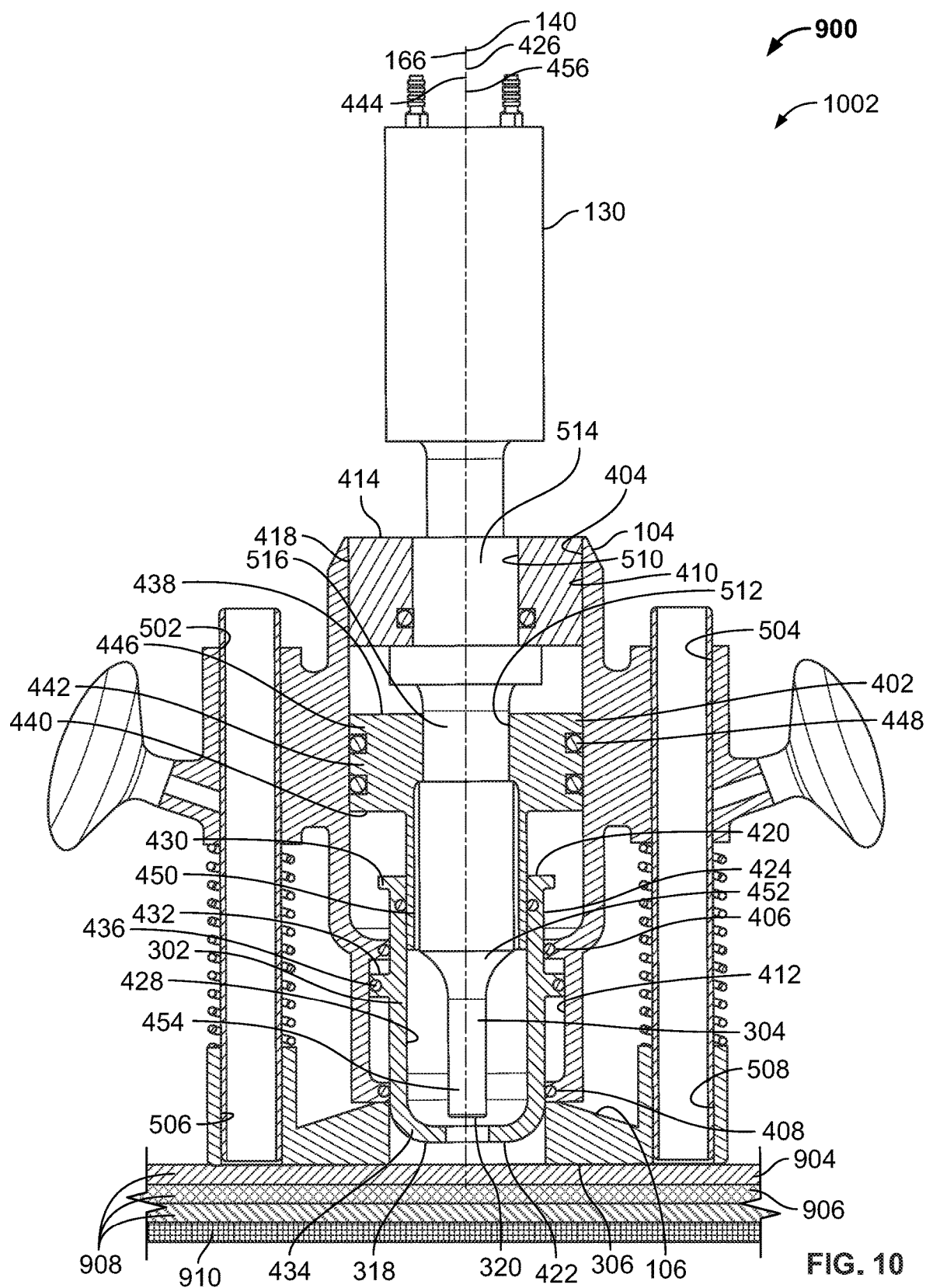
FIG. 10 illustrates a second example stage of the process of FIG. 9.

FIG. 10 illustrates the second stage 1002 of the example process 900. During the second stage 1002, the housing 104 is manually moved (e.g., by a human operator of the welding tool 100) toward the stabilization foot 106 such that the stabilization surface 306 of the stabilization foot 106 stabilizes the first thermoplastic part 904 relative to the second thermoplastic part 906. The housing 104 is accordingly moved from a neutral (e.g., uncompressed) position to a compressed position in connection with the second stage 1002 of the process 900. The welding tool 100 transitions from being positioned in the first configuration 102 of FIGS. 1-5 described above to being positioned in the second configuration 602 of FIG. 6 described above while the second stage 1002 is being performed.

Figure 11:
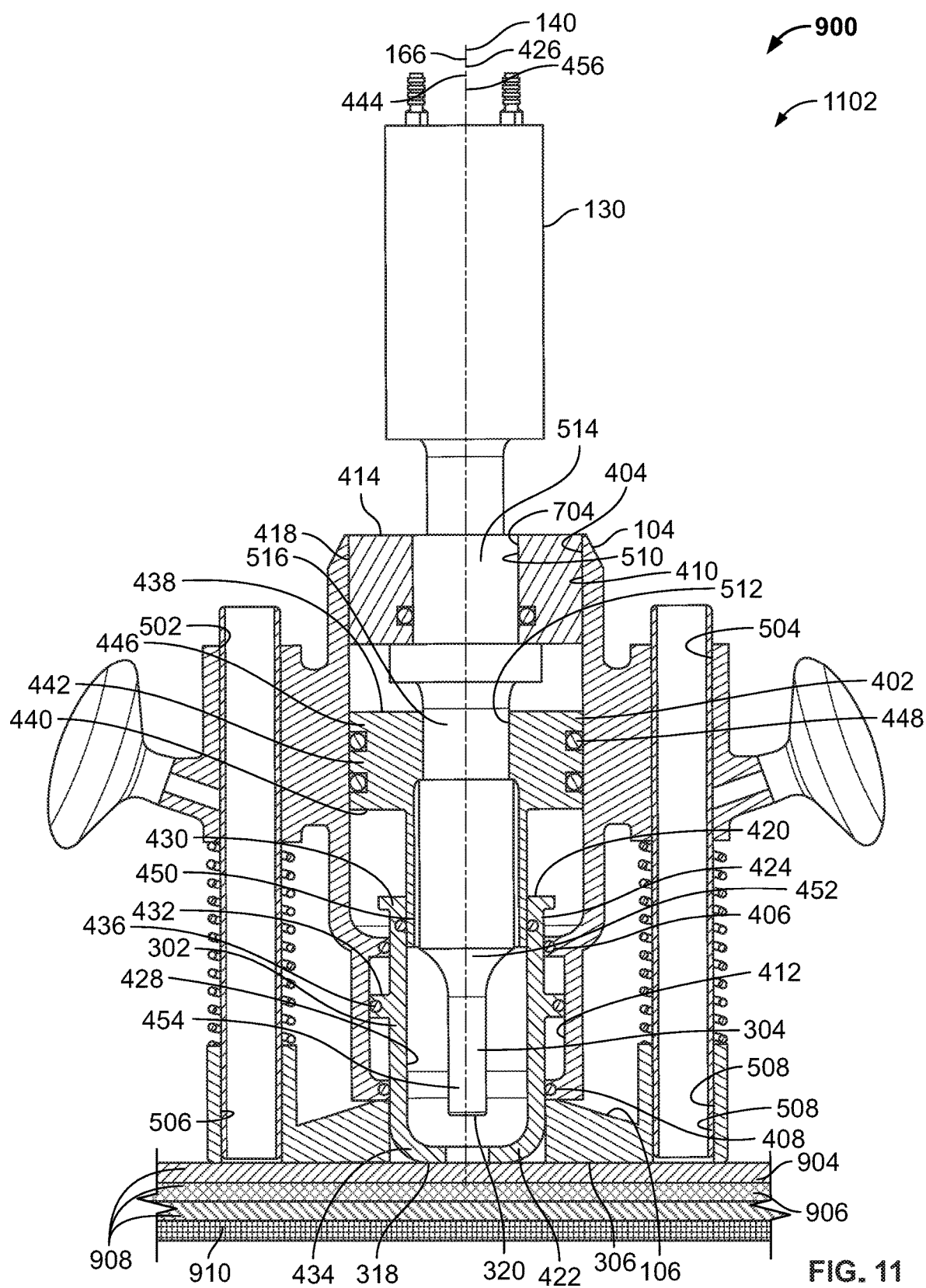
FIG. 11 illustrates a third example stage of the process of FIGS. 9 and 10.

FIG. 11 illustrates the third stage 1102 of the example process 900. During the third stage 1102, the compaction foot 302 is automatically moved (e.g., by a controlled and/or regulated supply of pressurized air delivered to the compaction foot 302 via the first air pressure conduit 122 of the welding tool 100) from a retracted position to an extended position in which the compaction surface 318 of the compaction foot 302 compacts and/or debulks the first thermoplastic part 904 and/or the second thermoplastic part 906. The welding tool 100 transitions from being positioned in the second configuration 602 of FIG. 6 described above to being positioned in the third configuration 702 of FIG. 7 described above while the third stage 1102 is being performed.

Figure 12:
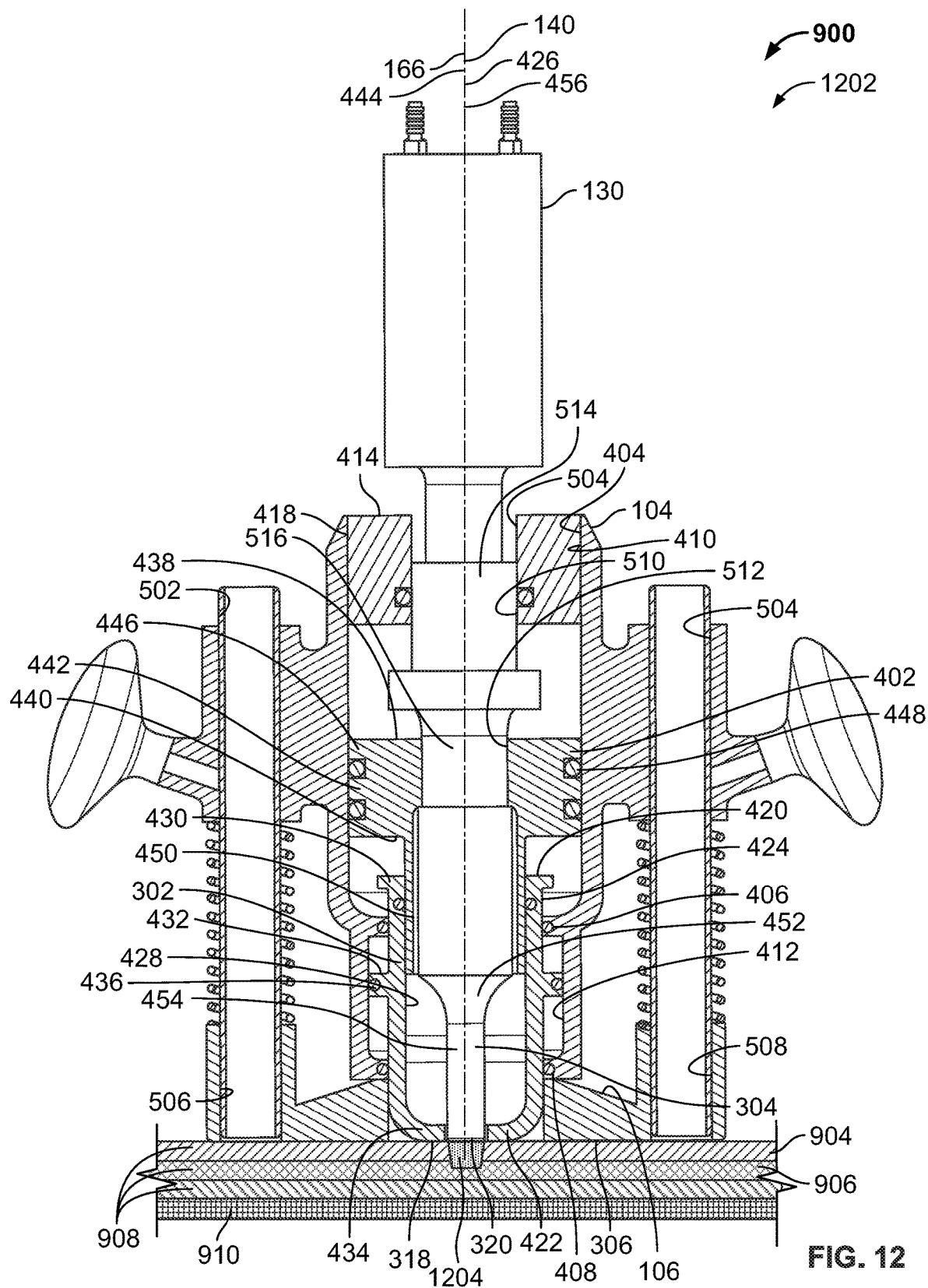
FIG. 12 illustrates a fourth example stage of the process of FIGS. 9-11.

FIG. 12 illustrates the fourth stage 1202 of the example process 900. During the fourth stage 1202, the welder 304 is automatically moved (e.g., by a controlled and/or regulated supply of pressurized air delivered to the air cylinder 402 via the third air pressure conduit 126 of the welding tool 100) from a retracted position to an extended position in which the welding surface 320 of the welder 304 forms an example weld 1204 that fixedly couples the first thermoplastic part 904 to the second thermoplastic part 906. The welding tool 100 transitions from being positioned in the third configuration 702 of FIG. 7 described above to being positioned in the fourth configuration 802 of FIG. 8 described above while the fourth stage 1202 is being performed.

Figure 13:
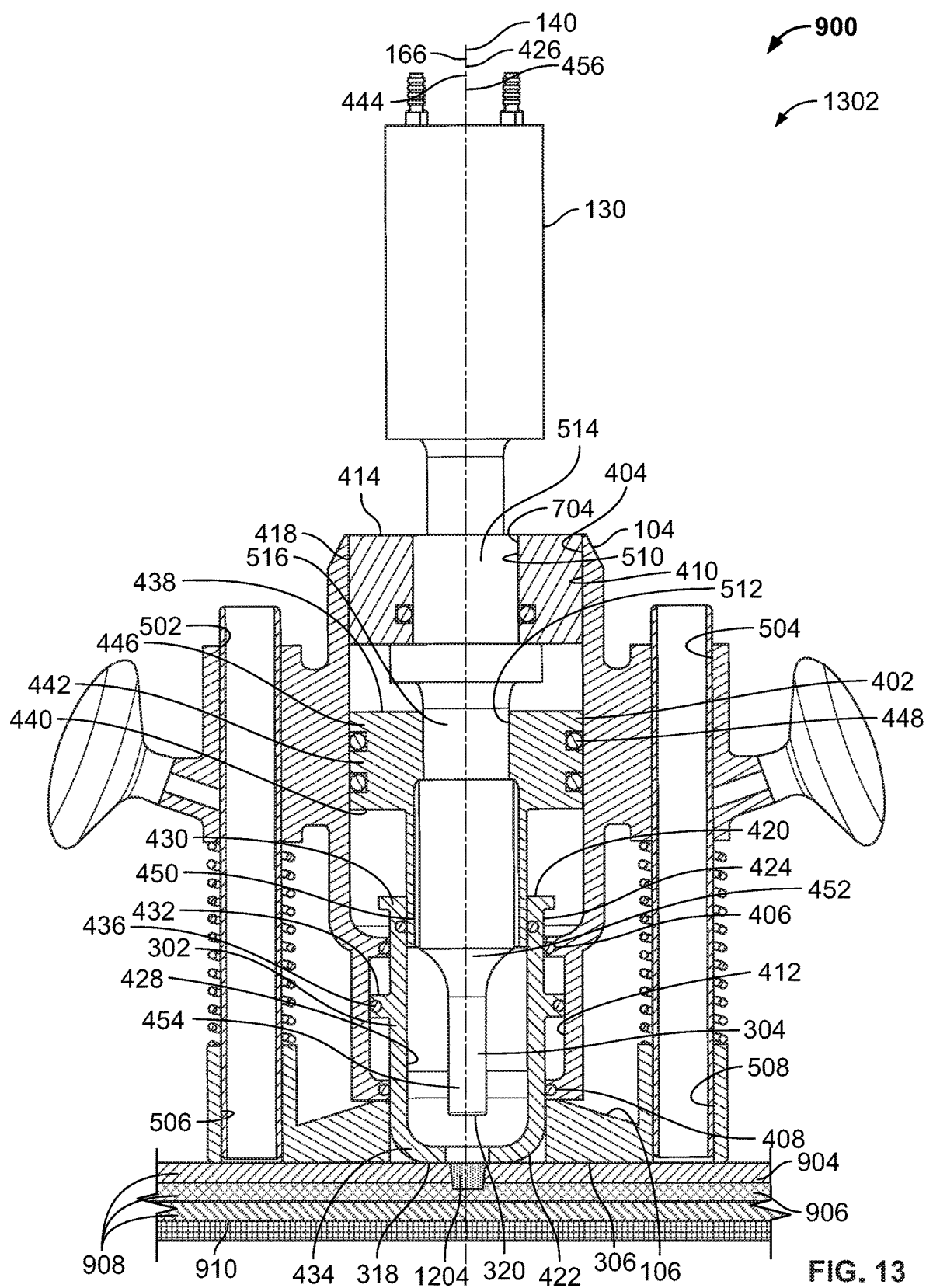
FIG. 13 illustrates a fifth example stage of the process of FIGS. 9-12.

FIG. 13 illustrates the fifth stage 1302 of the example process 900. During the fifth stage 1302, the welder 304 is automatically moved (e.g., by a controlled and/or regulated supply of pressurized air delivered to the air cylinder 402 via the fourth air pressure conduit 128 of the welding tool 100) from its extended position back to its retracted position subsequent to (e.g., immediately following) the welder 304 forming the weld 1204. The welding tool 100 transitions from being positioned in the fourth configuration 802 of FIG. 8 described above to being positioned in the third configuration 702 of FIG. 7 described above while the fifth stage 1302 is being performed.

Figure 14:
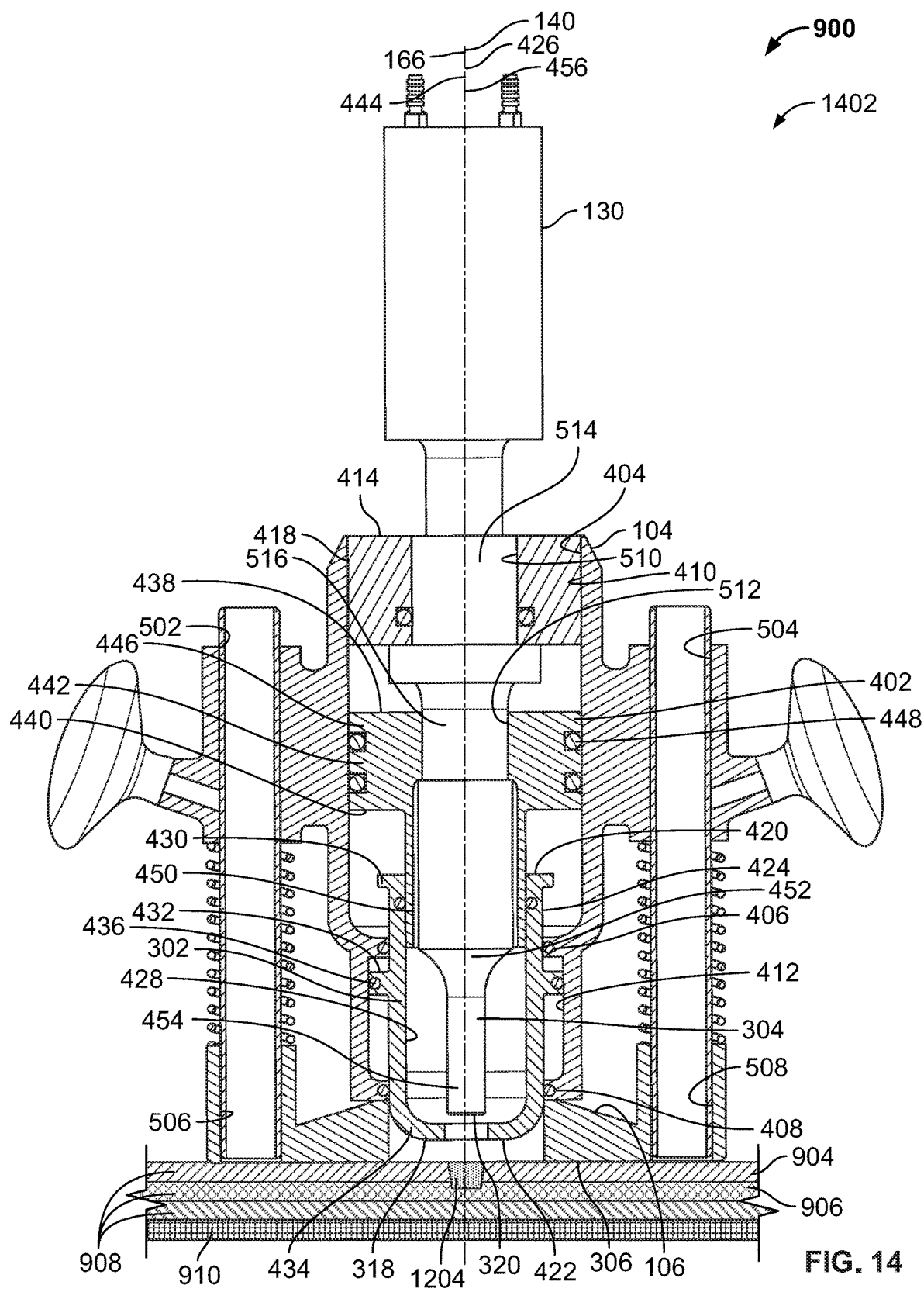
FIG. 14 illustrates a sixth example stage of the process of FIGS. 9-13.

FIG. 14 illustrates the sixth stage 1402 of the example process 900. During the sixth stage 1402, the compaction foot 302 is automatically moved (e.g., by a controlled and/or regulated supply of pressurized air delivered to the compaction foot 302 via the second air pressure conduit 124 of the welding tool 100) from its extended position back to its retracted position subsequent to (e.g., following expiration of a predetermined time period after) the welder 304 returning from its extended position to its retracted position in connection with the fifth stage 1302 of the process 900, and/or subsequent to the weld 1204 cooling. The welding tool 100 transitions from being positioned in the third configuration 702 of FIG. 7 described above to being positioned in the second configuration 602 of FIG. 6 described above while the sixth stage 1402 is being performed.

Figure 15:
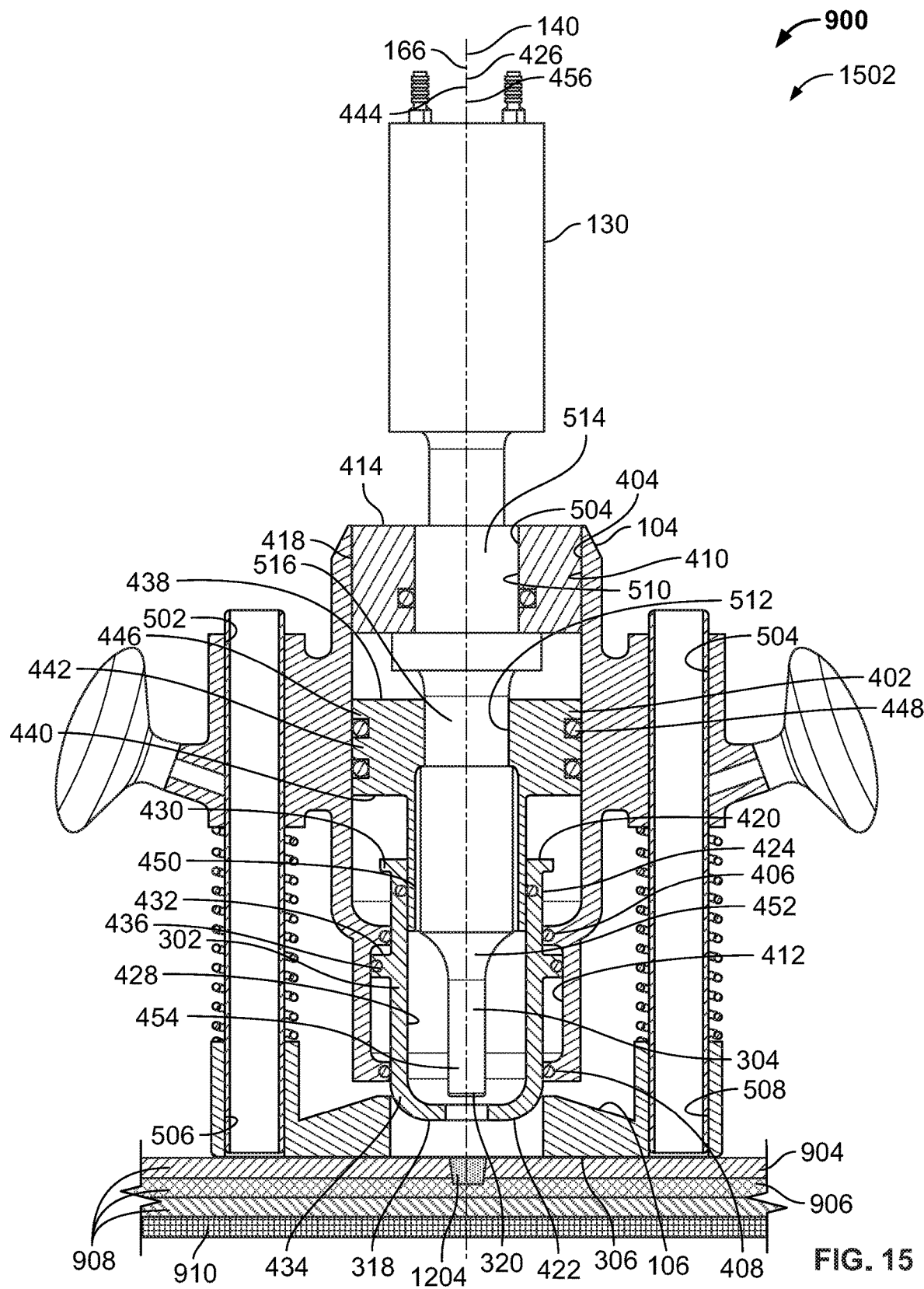
FIG. 15 illustrates a seventh example stage of the process of FIGS. 9-14.

FIG. 15 illustrates the seventh stage 1502 of the example process 900. During the seventh stage 1502, the housing 104 is moved (e.g., by a spring force associated with the first spring 112 and/or the second spring 114 of the welding tool 100 in response to the human operator of the welding tool 100 releasing a manually-applied force) away from the stabilization foot 106, from its compressed position to its neutral position. The welding tool 100 transitions from being positioned in the second configuration 602 of FIG. 6 described above to being positioned in the first configuration 102 of FIGS. 1-5 described above while the seventh stage 1502 is being performed.

Figure 16:
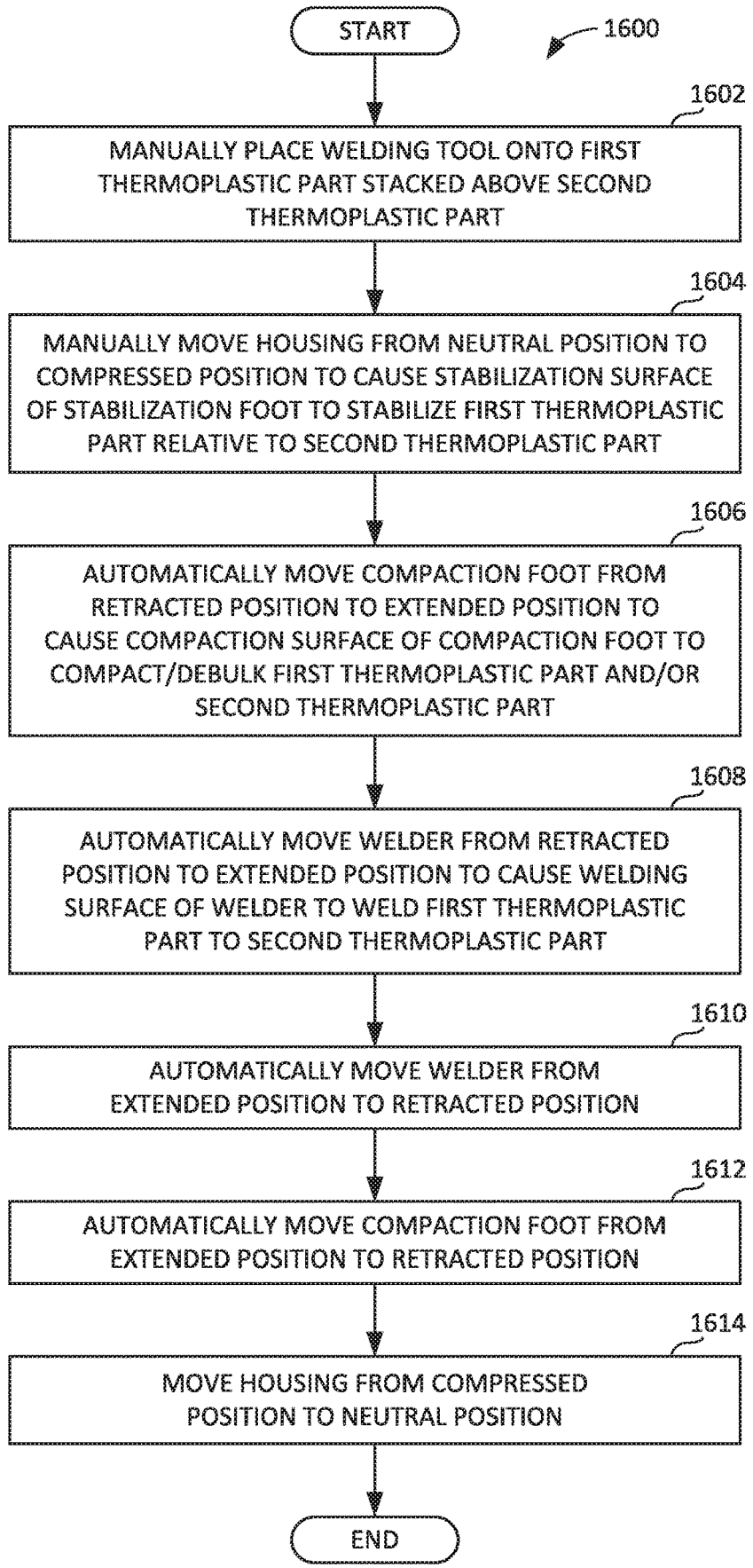
FIG. 16 is a flowchart representative of an example method for implementing the example welding tool of FIGS. 1-8 to weld a first example thermoplastic part to a second example thermoplastic part.

FIG. 16 is a flowchart representative of an example method 1600 for implementing the example welding tool 100 of FIGS. 1-8 to weld a first example thermoplastic part to a second example thermoplastic part. In some examples, the method 1600 can be implemented in connection with the welding tool 100 being utilized to perform the example process 900 of FIGS. 9-15 described above. The method 1600 includes manually placing (e.g., by a human operator) the welding tool 100 onto a first thermoplastic part (e.g., the first thermoplastic part 904 of FIGS. 9-15) stacked above a second thermoplastic part (e.g., the second thermoplastic part 906 of FIGS. 9-15) (block 1602). For example, the welding tool 100 can be placed on the first thermoplastic part such that the stabilization surface 306 of the stabilization foot 106 contacts at least a portion of the first thermoplastic part. The welding tool 100 is positioned and/or remains positioned in the first configuration 102 of FIGS. 1-5 described above while block 1602 of the method 1600 is being performed. Following block 1602, the method 1600 proceeds to block 1604.

At block 1604, the method 1600 includes manually moving (e.g., by a human operator) the housing 104 of the welding tool 100 toward the stabilization foot 106 of the welding tool 100 (e.g., from a neutral position to a compressed position) to cause the stabilization surface 306 of the stabilization foot 106 to stabilize the first thermoplastic part 904 relative to the second thermoplastic part. The welding tool 100 transitions from being positioned in the first configuration 102 of FIGS. 1-5 described above to being positioned in the second configuration 602 of FIG. 6 described above while block 1604 of the method 1600 is being performed. Following block 1604, the method 1600 proceeds to block 1606.

At block 1606, the method 1600 includes automatically moving (e.g., by a controlled and/or regulated supply of pressurized air delivered to the compaction foot 302 via the first air pressure conduit 122 of the welding tool 100) the compaction foot 302 of the welding tool 100 from a retracted position to an extended position to cause the compaction surface 318 of the compaction foot 302 to compact and/or debulk the first thermoplastic part and/or the second thermoplastic part. The welding tool 100 transitions from being positioned in the second configuration 602 of FIG. 6 described above to being positioned in the third configuration 702 of FIG. 7 described above while block 1606 of the method 1600 is being performed. Following block 1606, the method 1600 proceeds to block 1608.

At block 1608, the method 1600 includes automatically moving (e.g., by a controlled and/or regulated supply of pressurized air delivered to the air cylinder 402 via the third air pressure conduit 126 of the welding tool 100) the welder 304 of the welding tool 100 from a retracted position to an extended position to cause the welding surface 320 of the welder 304 to form a weld (e.g., the weld 1204 of FIGS. 12-15) that fixedly couples the first thermoplastic part to the second thermoplastic part. The welding tool 100 transitions from being positioned in the third configuration 702 of FIG. 7 described above to being positioned in the fourth configuration 802 of FIG. 8 described above while block 1608 of the method 1600 is being performed. Following block 1608, the method 1600 proceeds to block 1610.

At block 1610, the method 1600 includes automatically moving (e.g., by a controlled and/or regulated supply of pressurized air delivered to the air cylinder 402 via the fourth air pressure conduit 128 of the welding tool 100) the welder 304 of the welding tool 100 from its extended position back to its retracted position subsequent to (e.g., immediately following) the welder 304 of the welding tool 100 forming the weld. The welding tool 100 transitions from being positioned in the fourth configuration 802 of FIG. 8 described above to being positioned in the third configuration 702 of FIG. 7 described above while block 1610 of the method 1600 is being performed. Following block 1610, the method 1600 proceeds to block 1612.

At block 1612, the method 1600 includes automatically moving (e.g., by a controlled and/or regulated supply of pressurized air delivered to the compaction foot 302 via the second air pressure conduit 124 of the welding tool 100) the compaction foot 302 from its extended position back to its retracted position subsequent to (e.g., following expiration of a predetermined time period after) the welder 304 returning from its extended position to its retracted position in connection with the fifth stage 1302 of the process 900, and/or subsequent to the weld cooling. The welding tool 100 transitions from being positioned in the third configuration 702 of FIG. 7 described above to being positioned in the second configuration 602 of FIG. 6 described above while block 1612 of the method 1600 is being performed. Following block 1612, the method 1600 proceeds to block 1614.

At block 1614, the method 1600 of FIG. 16 includes moving (e.g., by a spring force associated with the first spring 112 and/or the second spring 114 of the welding tool 100 in response to the human operator of the welding tool 100 releasing a manually-applied force) the housing 104 of the welding tool 100 away from the stabilization foot 106 of the welding tool 100, from its compressed position to its neutral position. The welding tool 100 transitions from being positioned in the second configuration 602 of FIG. 6 described above to being positioned in the first configuration 102 of FIGS. 1-5 described above while block 1614 of the method 1600 is being performed. Following block 1614, the method 1600 ends.

FIGS. 17-24 are directed to an alternate example welding tool 1700 constructed in accordance with the teachings of this disclosure. As described in greater detail below, the welding tool 1700 of FIGS. 17-24 is generally structured, and generally operates, in a manner having similarities to the structure and operation of the welding tool 100 of FIGS. 1-8 described above. In this regard, the welding tool 1700 of FIGS. 17-24, much like the welding tool 100 of FIGS. 1-8, includes a stabilization foot, a housing that is configured to be manually moved relative to the stabilization foot, a compaction foot that is configured to be moved relative to the stabilization foot, and a welder that is configured to be automatically moved relative to the stabilization foot. The welding tool 1700 of FIGS. 17-24 differs from the welding tool 100 of FIGS. 1-8 primarily in that the compaction foot of the welding tool 1700 is configured to be manually moved (via manual movement of the housing) relative to the stabilization foot, whereas the compaction foot of the welding tool 100 is instead configured to be automatically moved relative to the stabilization foot.

Figure 17:
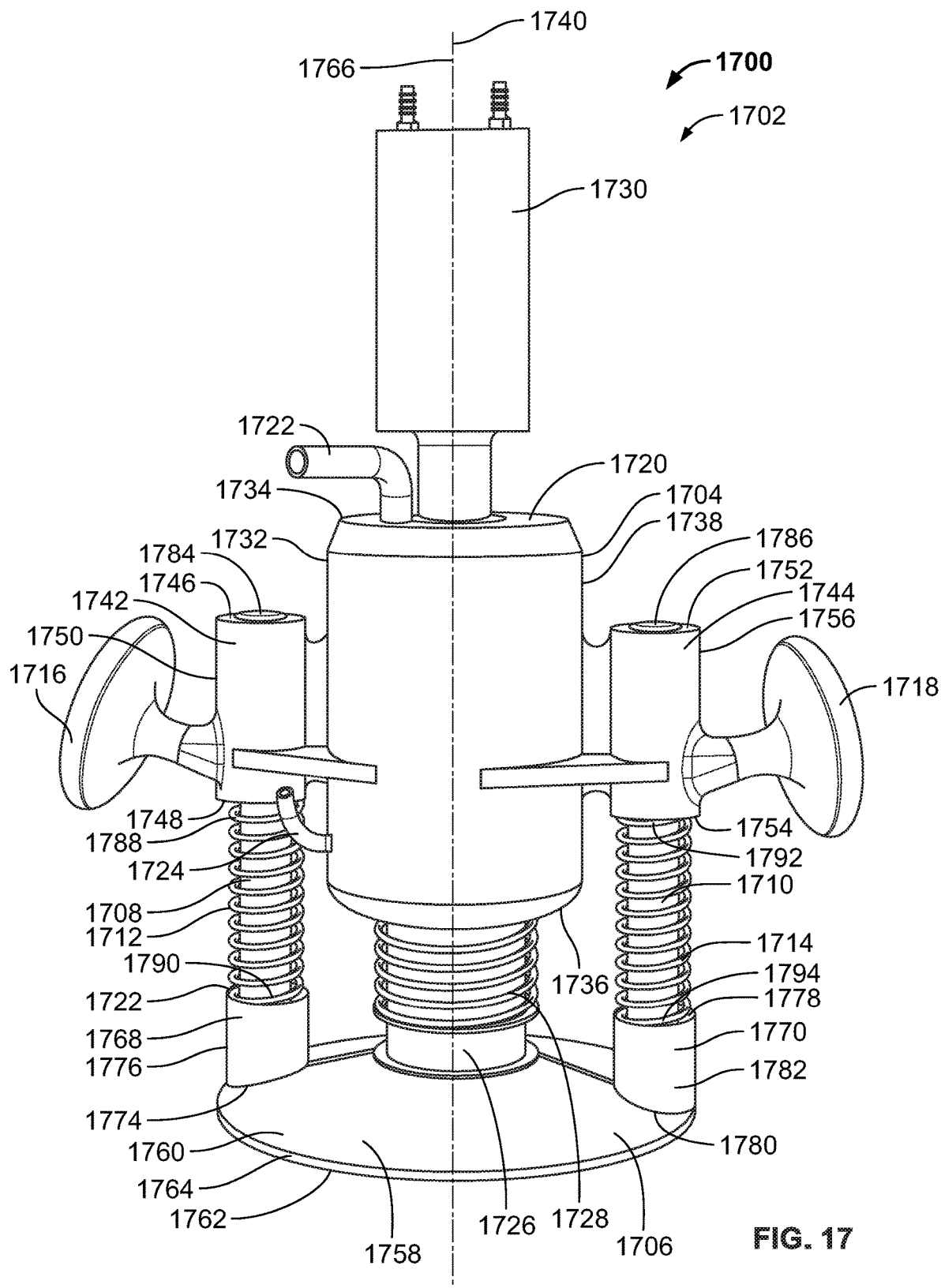
FIG. 17 is a perspective view of another example welding tool constructed in accordance with the teachings of this disclosure and shown in a first example configuration.
Figure 18:
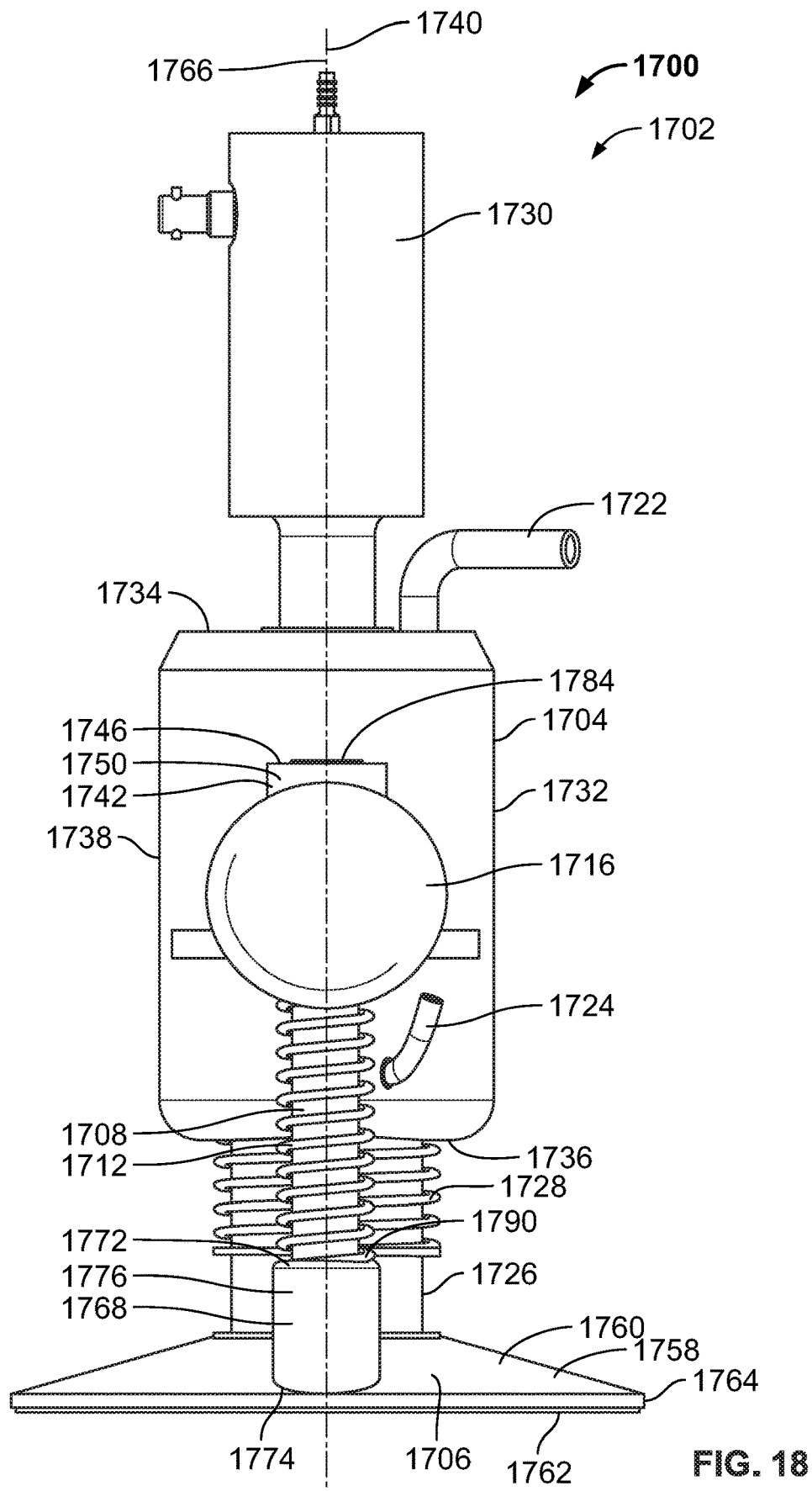
FIG. 18 is a side view of the welding tool of FIG. 17 shown in the first configuration of FIG. 17.
Figure 19:
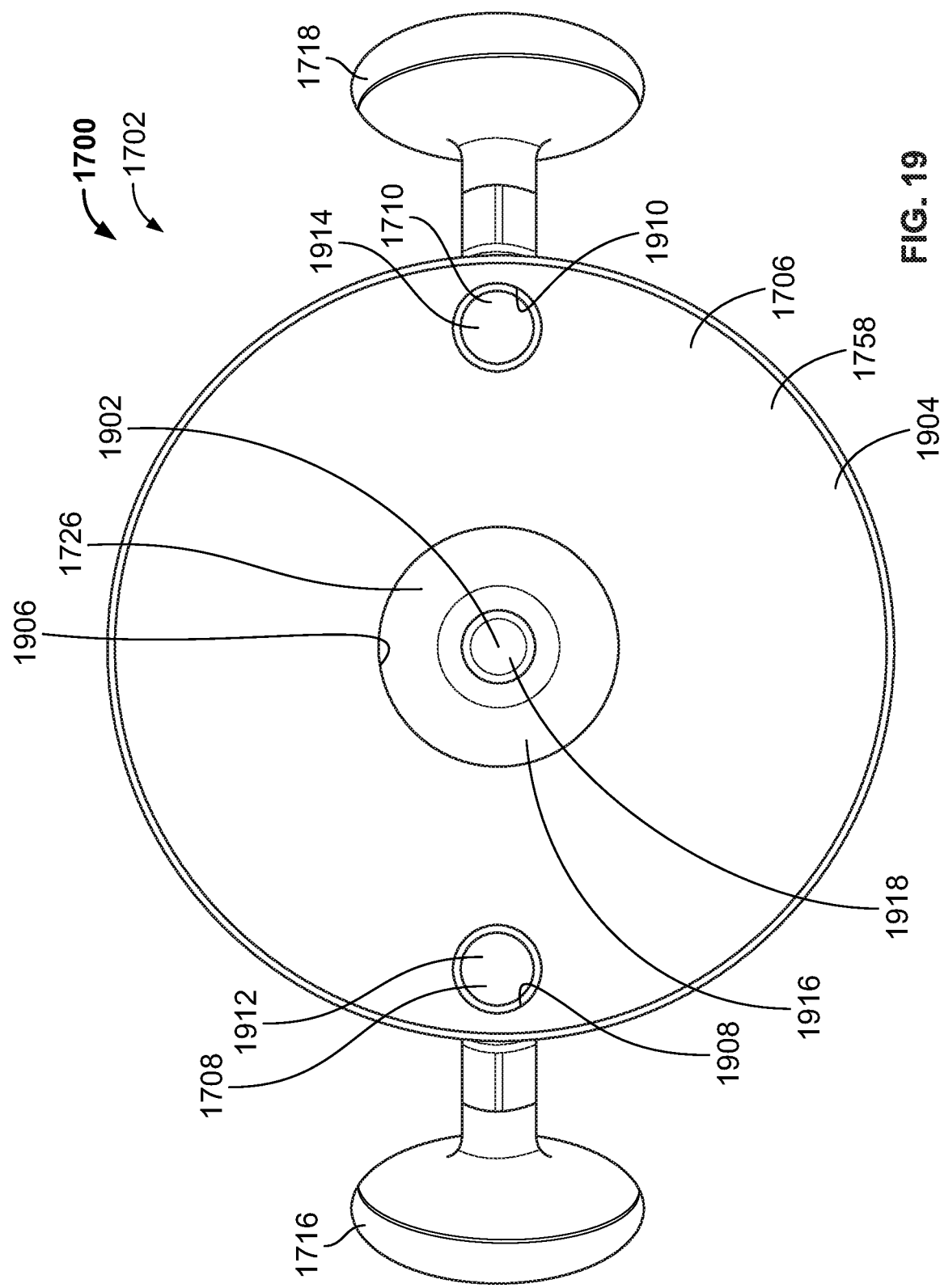
FIG. 19 is a bottom view of the welding tool of FIGS. 17 and 18 shown in the first configuration of FIGS. 17 and 18.
Figure 20:
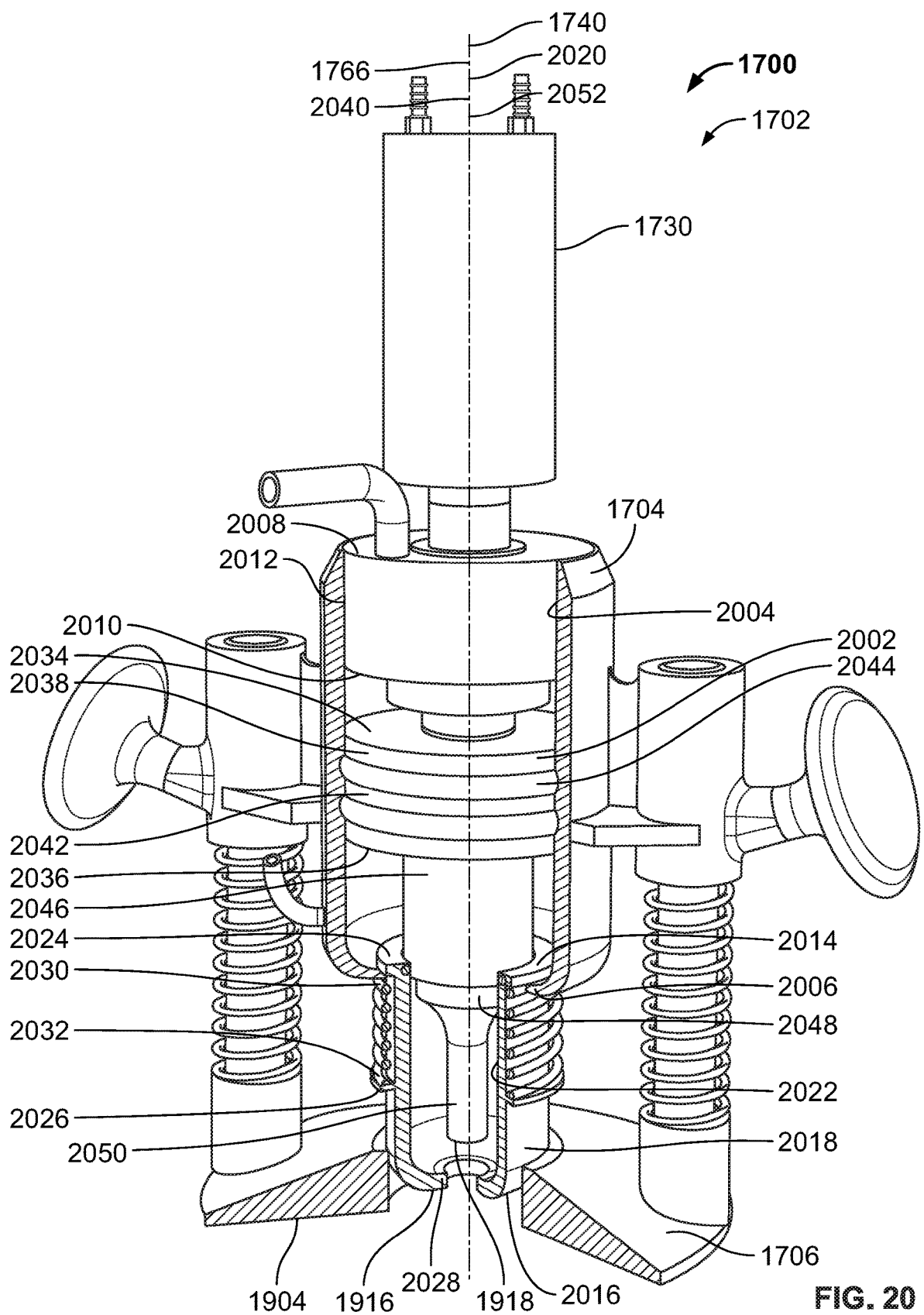
FIG. 20 is a partial cutaway view of the welding tool of FIGS. 17-19 shown in the first configuration of FIGS. 17-19.
Figure 21:
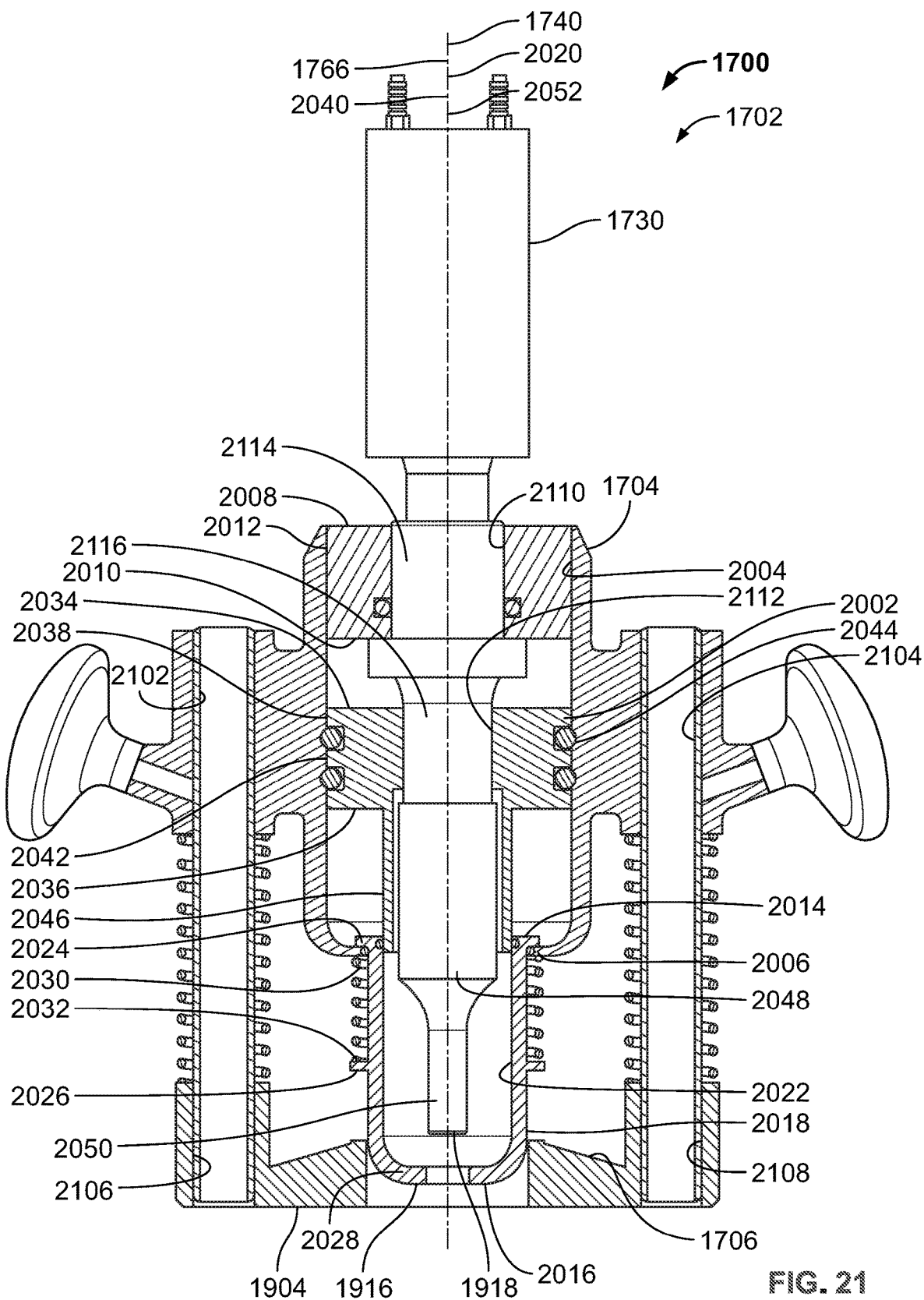
FIG. 21 is a cross-sectional view of the welding tool of FIGS. 17-20 shown in the first configuration of FIGS. 17-20.
Figure 22:
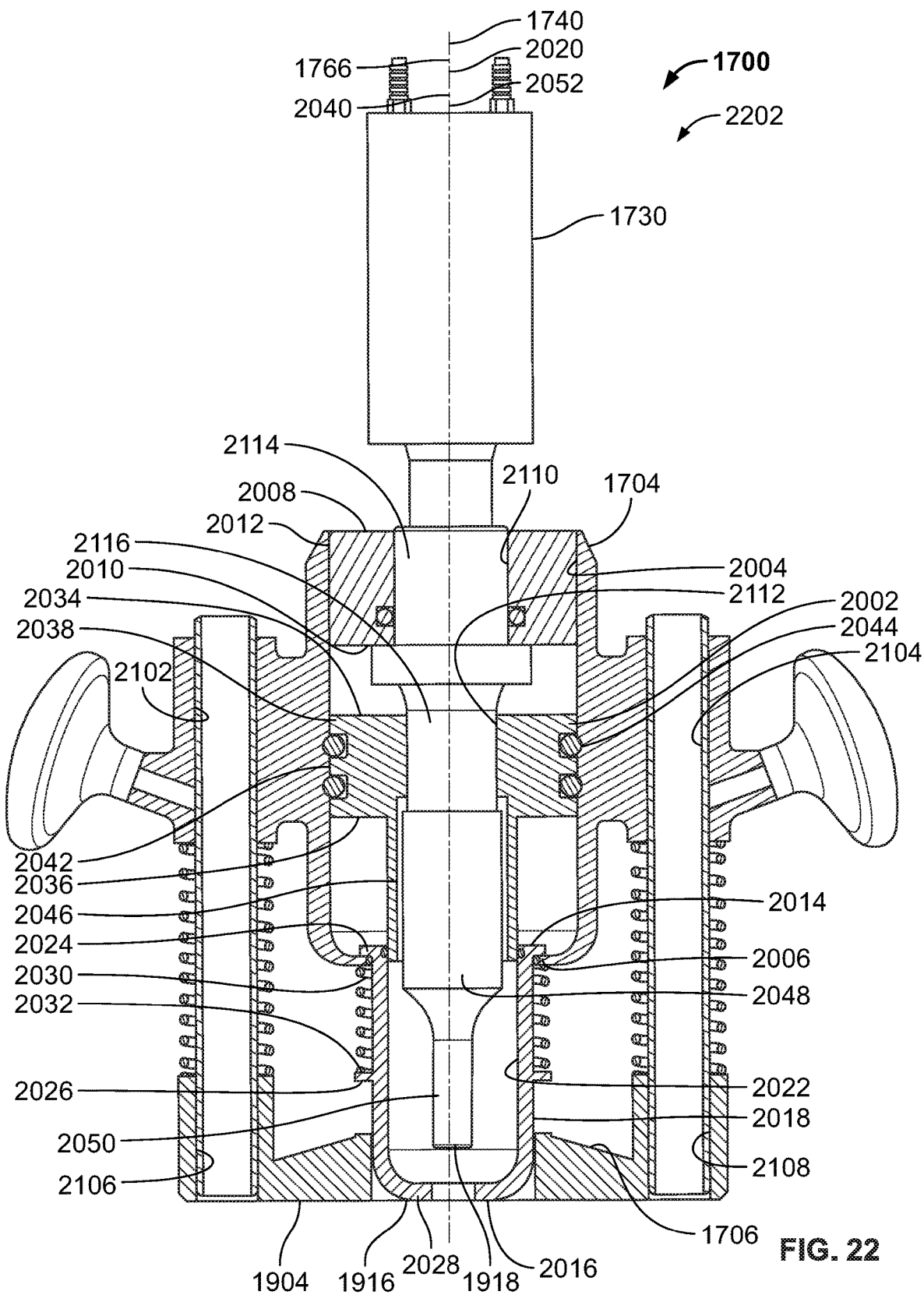
FIG. 22 is a cross-sectional view of the welding tool of FIGS. 17-21 shown in a second example configuration.
Figure 23:
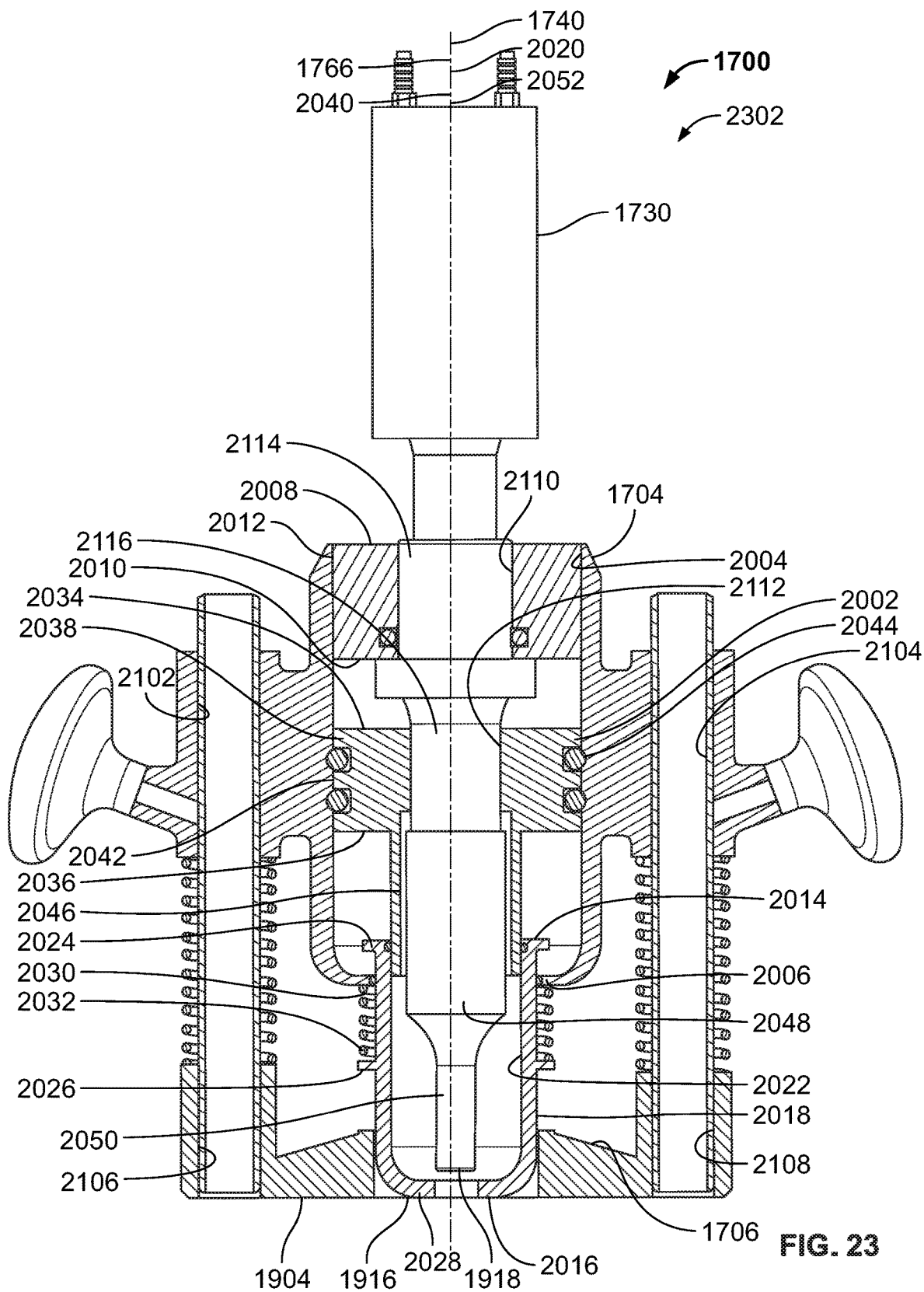
FIG. 23 is a cross-sectional view of the welding tool of FIGS. 17-22 shown in a third example configuration.
Figure 24:
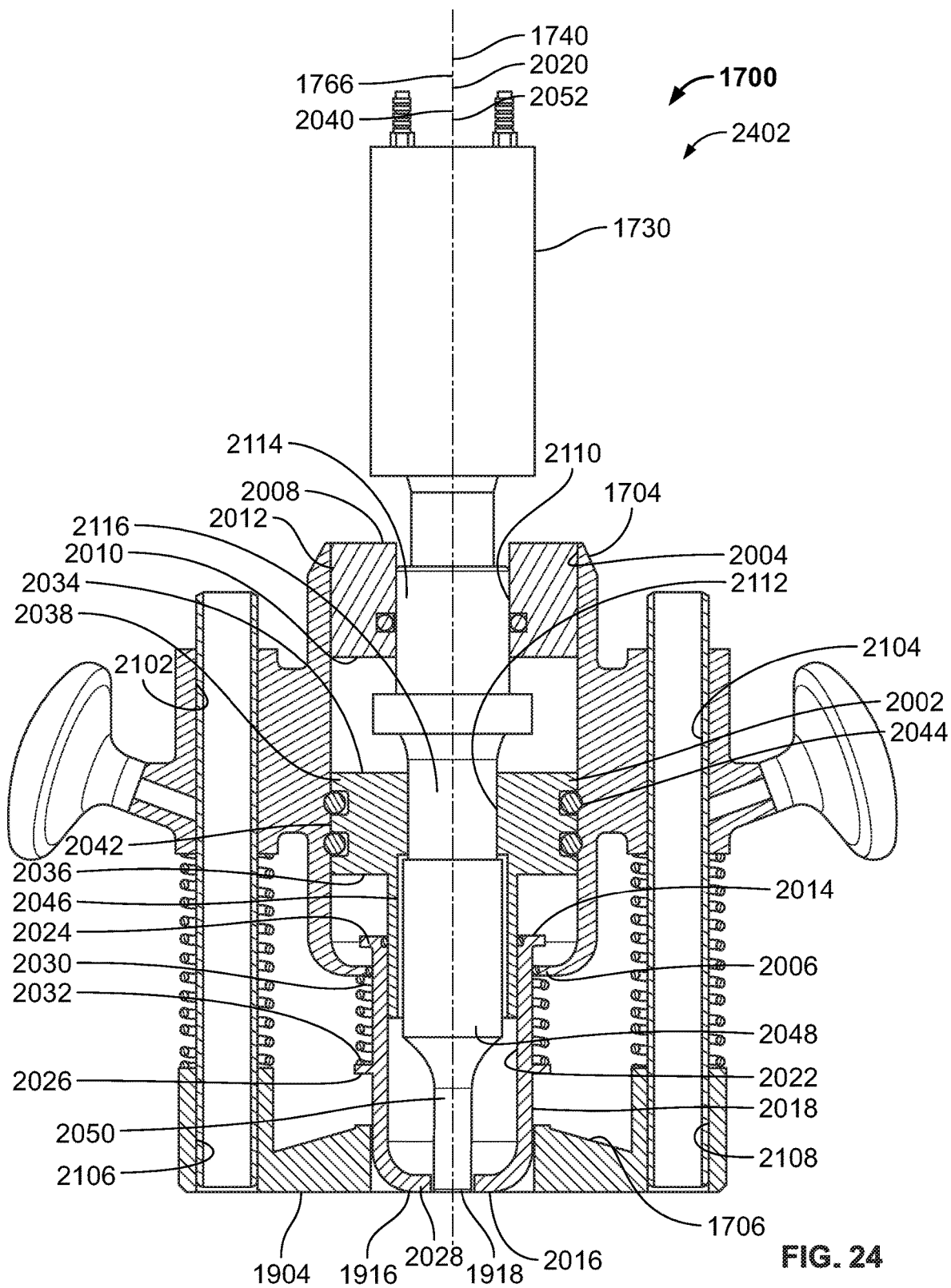
FIG. 24 is a cross-sectional view of the welding tool of FIGS. 17-23 shown in a fourth example configuration.

FIG. 17 is a perspective view of an example welding tool 1700 shown in a first example configuration 1702. FIG. 18 is a side view of the welding tool 1700 shown in the first configuration 1702. FIG. 19 is a bottom view of the welding tool 1700 shown in the first configuration 1702. FIG. 20 is a partial cutaway view of the welding tool 1700 shown in the first configuration. FIG. 21 is a cross-sectional view of the welding tool 1700 shown in the first configuration 1702. FIG. 22 is a cross-sectional view of the welding tool 1700 shown in a second example configuration 2202. FIG. 23 is a cross-sectional view of the welding tool 1700 shown in a third example configuration 2302. FIG. 24 is a cross-sectional view of the welding tool 1700 shown in a fourth example configuration 2402.

The welding tool 1700 of FIGS. 17-24 includes an example housing 1704, an example stabilization foot 1706, a first example rod 1708, a second example rod 1710, a first example spring 1712, a second example spring 1714, a first example hand grip 1716, a second example hand grip 1718, an example cap 1720, a first example air pressure conduit 1722, a second example air pressure conduit 1724, an example compaction foot 1726, a third example spring 1728, an example ultrasonic exciter 1730, an example welder 1902, and an example air cylinder 2002.

The housing 1704 of the welding tool 1700 is configured to house, receive, contain, and/or carry one or more portion(s) of the first rod 1708, the second rod 1710, the first hand grip 1716, the second hand grip 1718, the cap 1720, the first air pressure conduit 1722, the second air pressure conduit 1724, the compaction foot 1726, the ultrasonic exciter 1730, the welder 1902, and/or the air cylinder 2002 of the welding tool 1700. In the illustrated example of FIGS. 17-24, the housing 1704 includes an example central portion 1732. The central portion 1732 of the housing 1704 includes an example upper (e.g., top) end 1734, an example lower (e.g., bottom) end 1736 located opposite the upper end 1734, an example sidewall 1738 extending between the upper end 1734 and the lower end 1736, and an example central axis 1740. The upper end 1734 of the central portion 1732 is oriented away from the stabilization foot 1706, and the lower end 1736 of the central portion 1732 is oriented toward the stabilization foot 1706. In the illustrated example of FIGS. 17-24, the sidewall 1738 of the central portion 1732 has a circular cross-sectional shape and/or area. In other examples, the sidewall 1738 of the central portion 1732 can have a different cross-sectional shape and/or area (e.g., a non-circular cross-sectional shape and/or area, a differently sized cross-sectional shape and/or area, etc.).

Referring to FIG. 20, which is a cutaway view showing interior structure of the welding tool 1700, the central portion 1732 of the housing 1704 can be seen to include an example opening 2004 defined by the sidewall 1738. The opening 2004 of the central portion 1732 extends from the upper end 1734 of the central portion 1732 through to the lower end 1736 of the central portion 1732 in a direction parallel to and coaxially aligned with the central axis 1740. The opening 2004 of the central portion 1732 is configured to receive one or more portion(s) of the cap 1720, the compaction foot 1726, the ultrasonic exciter 1730, the welder 1902, and/or the air cylinder 2002 of the welding tool 1700, such that the received portion(s) of the cap 1720, the compaction foot 1726, the ultrasonic exciter 1730, the welder 1902, and/or the air cylinder 2002 is/are circumscribed and/or otherwise bounded by the sidewall 1738 of the central portion 1732 of the housing 1704, as further described below. In the illustrated example of FIGS. 17-24, the opening 2004 of the central portion 1732 has a circular cross-sectional shape and/or area. In other examples, the opening 2004 of the central portion 1732 can have a different cross-sectional shape and/or area (e.g., a non-circular cross-sectional shape and/or area, a differently sized cross-sectional shape and/or area, etc.).

As can be seen in FIG. 20, the central portion 1732 of the housing 1704 further includes an example inwardly-extending flange 2006 located at and/or proximate to the lower end 1736 of the central portion 1732 and extending inwardly from the sidewall 1738. In the illustrated example of FIGS. 17-24, the inwardly-extending flange 2006 of the central portion 1732 has a circular cross-sectional shape and/or area. In other examples, the inwardly-extending flange 2006 of the central portion 1732 can have a different cross-sectional shape and/or area (e.g., a non-circular cross-sectional shape and/or area, a differently sized cross-sectional shape and/or area, etc.).

In addition to the central portion 1732 described above, the housing 1704 further includes a first example arm 1742 coupled to and extending laterally (e.g., radially) away from the central portion 1732 in a first direction, and a second example arm 1744 coupled to and extending laterally (e.g., radially) away from the central portion 1732 in a second direction that is generally opposite the first direction. Thus, the first arm 1742 and the second arm 1744 are generally located on opposite sides of the central portion 1732 of the housing 1704. In the illustrated example of FIGS. 17-24, the first arm 1742 and the second arm 1744 are integrally formed with the central portion 1732 of the housing 1704. In other examples, the first arm 1742 and/or the second arm 1744 can alternatively be coupled (e.g., rigidly and/or fixedly coupled) to the central portion 1732 of the housing 1704 via one or more mechanical fastener(s).

The first arm 1742 of the housing 1704 includes an example upper (e.g., top) end 1746, an example lower (e.g., bottom) end 1748 located opposite the upper end 1746, and an example sidewall 1750 extending between the upper end 1746 and the lower end 1748. The upper end 1746 of the first arm 1742 is oriented away from the stabilization foot 1706, and the lower end 1748 of the first arm 1742 is oriented toward the stabilization foot 1706. In the illustrated example of FIGS. 17-24, the sidewall 1750 of the first arm 1742 has a circular cross-sectional shape and/or area. In other examples, the sidewall 1750 of the first arm 1742 can have a different cross-sectional shape and/or area (e.g., a non-circular cross-sectional shape and/or area, a differently sized cross-sectional shape and/or area, etc.).

Referring to FIG. 21, which shows a cross-sectional view of the welding tool 1700, the first arm 1742 of the housing 1704 can be seen to include an example opening 2102 defined by the sidewall 1750. The opening 2102 of the first arm 1742 extends from the upper end 1746 of the first arm 1742 through to the lower end 1748 of the first arm 1742 in a direction parallel to and laterally (e.g., radially) offset from the central axis 1740 of the central portion 1732 of the housing 1704. The opening 2102 of the first arm 1742 is configured to receive a portion of the first rod 1708 of the welding tool 1700 such that the received portion of the first rod 1708 is circumscribed and/or otherwise bounded by the sidewall 1750 of the first arm 1742 of the housing 1704. The opening 2102 of the first arm 1742 slidably receives the first rod 1708 such that the first arm 1742 and/or, more generally, the housing 1074 is slidable along the first rod 1708 relative to (e.g., toward and/or away from) the stabilization foot 1706. In the illustrated example of FIGS. 17-24, the opening 2102 of the first arm 1742 has a circular cross-sectional shape and/or area. In other examples, the opening 2102 of the first arm 1742 can have a different cross-sectional shape and/or area (e.g., a non-circular cross-sectional shape and/or area, a differently sized cross-sectional shape and/or area, etc.).

The second arm 1744 of the housing 1704 similarly includes an example upper (e.g., top) end 1752, an example lower (e.g., bottom) end 1754 located opposite the upper end 1752, and an example sidewall 1756 extending between the upper end 1752 and the lower end 1754. The upper end 1752 of the second arm 1744 is oriented away from the stabilization foot 1076, and the lower end 1754 of the second arm 1744 is oriented toward the stabilization foot 1706. In the illustrated example of FIGS. 17-24, the sidewall 1756 of the second arm 1744 has a circular cross-sectional shape and/or area. In other examples, the sidewall 1756 of the second arm 1744 can have a different cross-sectional shape and/or area (e.g., a non-circular cross-sectional shape and/or area, a differently sized cross-sectional shape and/or area, etc.).

Referring to FIG. 21, the second arm 1744 of the housing 1704 can be seen to similarly include an example opening 2104 defined by the sidewall 1756. The opening 2104 of the second arm 1744 extends from the upper end 1752 of the second arm 1744 through to the lower end 1754 of the second arm 1744 in a direction parallel to and laterally (e.g. radially) offset from the central axis 1740 of the central portion 1732 of the housing 1704. The opening 2104 of the second arm 1744 is configured to receive a portion of the second rod 1710 of the welding tool 1700 such that the received portion of the second rod 1710 is circumscribed and/or otherwise bounded by the sidewall 1756 of the second arm 1744 of the housing 1704. The opening 2104 of the second arm 1744 slidably receives the second rod 1710 such that the second arm 1744 and/or, more generally, the housing 1704 is slidable along the second rod 1710 relative to (e.g., toward and/or away from) the stabilization foot 1706. In the illustrated example of FIGS. 17-24, the opening 2104 of the second arm 1744 has a circular cross-sectional shape and/or area. In other examples, the opening 2104 of the second arm 1744 can have a different cross-sectional shape and/or area (e.g., a non-circular cross-sectional shape and/or area, a differently sized cross-sectional shape and/or area, etc.).

As discussed above, the first and second arms 1742, 1744 of the housing 1704 are integrally formed with the central portion 1732 of the housing 1704. The central portion 1732, the first arm 1742, and the second arm 1744 of the housing 1704 are accordingly movable (e.g., slidable) in unison relative to (e.g., toward and/or away from) the stabilization foot 1706. Movement of the housing 1704 (e.g., including the central portion 1732 and the first and second arms 1742, 1744) toward the stabilization foot 1706 is manually performed and/or manually controlled by a user (e.g., a human operator) of the welding tool 1700, and is facilitated via the first hand grip 1716 and/or the second hand grip 1718 of the welding tool 1700. In the illustrated example of FIGS. 17-24, the first hand grip 1716 is coupled to and extends away from the first arm 1742 and/or the central portion 1732 of the housing 1704 in a first direction, and the second hand grip 1718 is coupled to and extends away from the second arm 1744 and/or the central portion 1732 of the housing 1704 in a second direction that is generally opposite the first direction. Thus, the first hand grip 1716 and the second hand grip 1718 are generally located on opposite sides of the central portion 1732 of the housing 1704. The first hand grip 1716 and the second hand grip 1718 are ergonomically configured (e.g., ergonomically, sized, shaped, oriented, and/or arranged) to be efficiently and/or comfortably gripped, grasped, and/or held by the hands of an average adult-sized user of the welding tool 1700. In the illustrated example of FIGS. 17-24, the first hand grip 1716 and the second hand grip 1718 each have an ellipsoidal and/or bulb-like shape. In other examples, the first hand grip 1716 and/or the second hand grip 1718 can have a different shape (e.g., a non-ellipsoidal and/or non-bulb-like shape).

The stabilization foot 1706 of the welding tool 1700 is configured to engage and/or stabilize one or more thermoplastic part(s) of a thermoplastic composite layup prior to, during, and/or following a compaction operation to be performed using the welding tool 1700, and/or prior to, during, and/or following a welding operation to be performed using the welding tool 1700. In the illustrated example of FIGS. 17-24, the stabilization foot 1706 includes an example base 1758. The base 1758 of the stabilization foot 1706 includes an example upper surface 1760, an example lower (e.g., bottom) surface 1762 located opposite the upper surface 1760, an example peripheral edge 1764 extending between the upper surface 1760 and the lower surface 1762, and an example central axis 1766. The upper surface 1760 of the base 1758 is oriented toward the central portion 1732 of the housing 1704, and the lower surface 1762 of the base 1758 is oriented away from the central portion 1732 of the housing 1704. Referring also to FIG. 19, which shows a bottom view of welding tool 1700, the lower surface 1762 of the base 1758 can be seen to form an example stabilization surface 1904 that is configured to engage and/or stabilize one or more thermoplastic part(s) of a thermoplastic composite layup. In the illustrated example of FIGS. 17-24, the stabilization surface 1904 of the base 1758 is substantially flat and/or planar. In other examples, the stabilization surface 1904 of the base 1758 can alternatively be curved (e.g., non-planar), contoured, or otherwise shaped to support and/or complement an associated geometry of one or more thermoplastic part(s) of a thermoplastic composite layup. The central axis 1766 of the base 1758 of the stabilization foot 1706 is parallel to and coaxially aligned with the central axis 1740 of the central portion 1732 of the housing 1704. In the illustrated example of FIGS. 17-24, the peripheral edge 1764 and the stabilization surface 1904 of the base 1758 each have a circular cross-sectional shape and/or area. In other examples, the peripheral edge 1764 and/or the stabilization surface 1904 of the base 1758 can have a different cross-sectional shape and/or area (e.g., a non-circular cross-sectional shape and/or area, a differently sized cross-sectional shape and/or area, etc.).

As can be seen in FIG. 19, the base 1758 of the stabilization foot 1706 further includes an example central opening 1906, a first example offset opening 1908, and a second example offset opening 1910. The central opening 1906 of the base 1758 extends from the upper surface 1760 of the base 1758 through to the lower surface 1762 of the base 1758 in a direction parallel to and coaxially aligned with central axis 1766. In the illustrated example of FIGS. 17-24, the central opening 1906 of the base 1758 of the stabilization foot 1706 is parallel to and coaxially aligned with the opening 2004 of the central portion 1732 of the housing 1704. The central opening 1906 of the base 1758 is configured to receive (e.g., slidably receive) one or more portion(s) of the compaction foot 1726 and/or the welder 1902 such that the received portion(s) of the compaction foot 1726 and/or the welder 1902 is/are circumscribed and/or otherwise bounded by the base 1758 of the stabilization foot 1706, as further described below. In the illustrated example of FIGS. 17-24, the central opening 1906 of the base 1758 has a circular cross-sectional shape and/or area. In other examples, the central opening 1906 of the base 1758 can have a different cross-sectional shape and/or area (e.g., a non-circular cross-sectional shape and/or area, a differently sized cross-sectional shape and/or area, etc.).

The first offset opening 1908 of the base 1758 extends from the upper surface 1760 of the base 1758 through to the lower surface 1762 of the base 1758 in a direction parallel to and laterally (e.g., radially) offset from the central axis 1766. In the illustrated example of FIGS. 17-24, the first offset opening 1908 of the base 1758 of the stabilization foot 1706 is parallel to and coaxially aligned with the opening 2102 of the first arm 1742 of the housing 1704. The first offset opening 1908 of the base 1758 is configured to receive a portion of the first rod 1708 of the welding tool 1700 such that the received portion of the first rod 1708 is circumscribed and/or otherwise bounded by the base 1758 of the stabilization foot 1706, as further described below. In the illustrated example of FIGS. 17-24, the first offset opening 1908 of the base 1758 has a circular cross-sectional shape and/or area. In other examples, the first offset opening 1908 of the base 1758 can have a different cross-sectional shape and/or area (e.g., a non-circular cross-sectional shape and/or area, a differently sized cross-sectional shape and/or area, etc.).

The second offset opening 1910 of the base 1758 extends from the upper surface 1760 of the base 1758 through to the lower surface 1762 of the base 1758 in a direction parallel to and laterally (e.g., radially) offset from the central axis 1766. In the illustrated example of FIGS. 17-24, the second offset opening 1910 of the base 1758 of the stabilization foot 1706 is parallel to and coaxially aligned with the opening 2104 of the second arm 1744 of the housing 1704. The second offset opening 1910 of the base 1758 is configured to receive a portion of the second rod 1710 of the welding tool 1700 such that the received portion of the second rod 1710 is circumscribed and/or otherwise bounded by the base 1758 of the stabilization foot 1706, as further described below. In the illustrated example of FIGS. 17-24, the second offset opening 1910 of the base 1758 has a circular cross-sectional shape and/or area. In other examples, the second offset opening 1910 of the base 1758 can have a different cross-sectional shape and/or area (e.g., a non-circular cross-sectional shape and/or area, a differently sized cross-sectional shape and/or area, etc.).

While the base 1758 of the stabilization foot 1706 shown in FIGS. 17-24 includes the central opening 1906, the first offset opening 1908, and the second offset opening 1910 as described above, in other examples the first offset opening 1908 and/or the second offset opening 1910 can be omitted from the base 1758 of the stabilization foot 1706. For example, the base 1758 of the stabilization foot 1706 can alternatively include the central opening 1906, and can omit the first and second offset openings 1908, 1910.

In addition to the base 1758 described above, the stabilization foot 1706 further includes a first example leg 1768 and a second example leg 1770 respectively coupled to and extending upward from the base 1758. The second leg 1770 is located above the first offset opening 1908 of the base 1758 of the stabilization foot 1706, and the second leg 1770 is located above the second offset opening 1910 of the base 1758 of the stabilization foot 1706. In the illustrated example of FIGS. 17-24, the first leg 1768 and the second leg 1770 are integrally formed with the base 1758 of the stabilization foot 1706. In other examples, the first leg 1768 and/or the second leg 1770 can alternatively be coupled (e.g., rigidly and/or fixedly coupled) to the base 1758 of the stabilization foot 1706 via one or more mechanical fastener(s).

The first leg 1768 of the stabilization foot 1706 includes an example upper (e.g., top) end 1772, an example lower (e.g., bottom) end 1774 located opposite the upper end 1772, and an example sidewall 1776 extending between the upper end 1772 and the lower end 1774. The upper end 1772 of the first leg 1768 is oriented toward the first arm 1742 of the housing 1704, and the lower end 1774 of the first leg 1768 is oriented away from the first arm 1742 of the housing 1704. In the illustrated example of FIGS. 17-24, the sidewall 1776 of the first leg 1768 has a circular cross-sectional shape and/or area. In other examples, the sidewall 1776 of the first leg 1768 can have a different cross-sectional shape and/or area (e.g., a non-circular cross-sectional shape and/or area, a differently sized cross-sectional shape and/or area, etc.).

Referring to FIG. 21, the first leg 1768 of the stabilization foot 1706 can be seen to include an example opening 2106 defined by the sidewall 1776. The opening 2106 of the first leg 1768 extends from the upper end 1772 of the first leg 1768 through to the lower end 1774 of the first leg 1768 in a direction parallel to and laterally (e.g. radially) offset from the central axis 1766 of the base 1758 of the stabilization foot 1706. In the illustrated example of FIGS. 17-24, the opening 2106 of the first leg 1768 of the stabilization foot 1706 is parallel to and coaxially aligned with the opening 2102 of the first arm 1742 of the housing 1704, and/or parallel to and coaxially aligned with the first offset opening 1908 of the base 1758 of the stabilization foot 1706. The opening 2106 of the first leg 1768 is configured to receive a portion of the first rod 1708 of the welding tool 1700 such that the received portion of the first rod 1708 is circumscribed and/or otherwise bounded by the sidewall 1776 of the first leg 1768 of the stabilization foot 1706. The opening 2106 of the first leg 1768 receives the first rod 1708 such that the first rod 1708 is rigidly, fixedly, and/or non-movably coupled (e.g., via a threaded engagement, an adhesive, etc.) to the first leg 1768 and/or, more generally, to the stabilization foot 1706. In the illustrated example of FIGS. 17-24, the opening 2106 of the first leg 1768 has a circular cross-sectional shape and/or area. In other examples, the opening 2106 of the first leg 1768 can have a different cross-sectional shape and/or area (e.g., a non-circular cross-sectional shape and/or area, a differently sized cross-sectional shape and/or area, etc.).

The second leg 1770 of the stabilization foot 1706 includes an example upper (e.g., top) end 1778, an example lower (e.g., bottom) end 1780 located opposite the upper end 1778, and an example sidewall 1782 extending between the upper end 1778 and the lower end 1780. The upper end 1778 of the second leg 1770 is oriented toward the second arm 1744 of the housing 1704, and the lower end 1780 of the second leg 1770 is oriented away from the second arm 1744 of the housing 1704. In the illustrated example of FIGS. 17-24, the sidewall 1782 of the second leg 1770 has a circular cross-sectional shape and/or area. In other examples, the sidewall 1782 of the second leg 1770 can have a different cross-sectional shape and/or area (e.g., a non-circular cross-sectional shape and/or area, a differently sized cross-sectional shape and/or area, etc.).

Referring to FIG. 21, the second leg 1770 of the stabilization foot 1706 can be seen to include an example opening 2108 defined by the sidewall 1782. The opening 2108 of the second leg 1770 extends from the upper end 1778 of the second leg 1770 through to the lower end 1780 of the second leg 1770 in a direction parallel to and laterally (e.g. radially) offset from the central axis 1766 of the base 1758 of the stabilization foot 1706. In the illustrated example of FIGS. 17-24, the opening 2108 of the second leg 1770 of the stabilization foot 1706 is parallel to and coaxially aligned with the opening 2104 of the second arm 1744 of the housing 1704, and/or parallel to and coaxially aligned with the second offset opening 1910 of the base 1758 of the stabilization foot 1706. The opening 2108 of the second leg 1770 is configured to receive a portion of the second rod 1710 of the welding tool 1700 such that the received portion of the second rod 1710 is circumscribed and/or otherwise bounded by the sidewall 1782 of the second leg 1770 of the stabilization foot 1706. The opening 2108 of the second leg 1770 receives the second rod 1710 such that the second rod 1710 is rigidly, fixedly, and/or non-movably coupled (e.g., via a threaded engagement, an adhesive, etc.) to the second leg 1770 and/or, more generally, to the stabilization foot 1706. In the illustrated example of FIGS. 17-24, the opening 2108 of the second leg 1770 has a circular cross-sectional shape and/or area. In other examples, the opening 2108 of the second leg 1770 can have a different cross-sectional shape and/or area (e.g., a non-circular cross-sectional shape and/or area, a differently sized cross-sectional shape and/or area, etc.).

The first rod 1708 of the welding tool 1700 is configured to guide movement of the housing 1704 of the welding tool 1700 relative to (e.g., toward or away from) the stabilization foot 1706 of the welding tool 1700. In the illustrated example of FIGS. 17-24, the first rod 1708 includes an example upper (e.g., top) end 1784, and, as can be seen in FIG. 19, an example lower (e.g., bottom) end 1912 located opposite the upper end 1784. A portion of the first rod 1708 proximate the upper end 1784 of the first rod 1708 is located and/or positioned within the opening 2102 of the first arm 1742 of the housing 1704 such that the first arm 1742 of the housing 1704 is slidably coupled to the first rod 1708. In some examples, a portion of the first rod 1708 located proximate the upper end 1784 of the first rod 1708 can include a mechanical stop (e.g., an outwardly-extending flange) configured to prevent the first arm 1742 of the housing 1704 from sliding upwardly past and/or off of the upper end 1784 of the first rod 1708. A portion of the first rod 1708 proximate the lower end 1912 of the first rod 1708 is located and/or positioned within the opening 2106 of the first leg 1768 of the stabilization foot 1706 and/or within the first offset opening 1908 of the base 1758 of the stabilization foot 1706 such that the first rod 1708 is rigidly and/or fixedly coupled to the first leg 1768 and/or the base 1758 of the stabilization foot 1706. In some examples, a portion of the first rod 1708 proximate the lower end 1912 of the first rod 1708 can include threads configured to mate with a threaded portion of the opening 2106 of the first leg 1768 of the stabilization foot 1706 and/or with a threaded portion of the first offset opening 1908 of the base 1758 of the stabilization foot 1706 to rigidly and/or fixedly couple the first rod 1708 to the first leg 1768 and/or the base 1758 of the stabilization foot 1706. In the illustrated example of FIGS. 17-24, the first rod 1708 has a circular cross-sectional shape and/or area. In other examples, the first rod 1708 can have a different cross-sectional shape and/or area (e.g., a non-circular cross-sectional shape and/or area, a differently sized cross-sectional shape and/or area, etc.).

The second rod 1710 of the welding tool 1700 is configured to guide movement of the housing 1704 of the welding tool 1700 relative to (e.g., toward or away from) the stabilization foot 1706 of the welding tool 1700. In the illustrated example of FIGS. 17-24, the second rod 1710 includes an example upper (e.g., top) end 1786, and, as can be seen in FIG. 19, an example lower (e.g., bottom) end 1914 located opposite the upper end 1786. A portion of the second rod 1710 proximate the upper end 1786 of the second rod 1710 is located and/or positioned within the opening 2104 of the second arm 1744 of the housing 1704 such that the second arm 1744 of the housing 1704 is slidably coupled to the second rod 1710. In some examples, a portion of the second rod 1710 located proximate the upper end 1786 of the second rod 1710 can include a mechanical stop (e.g., an outwardly-extending flange) configured to prevent the second arm 1744 of the housing 1704 from sliding upwardly past and/or off of the upper end 1786 of the second rod 1710. A portion of the second rod 1710 proximate the lower end 1914 of the second rod 1710 is located and/or positioned within the opening 2108 of the second leg 1770 of the stabilization foot 1706 and/or within the second offset opening 1910 of the base 1758 of the stabilization foot 1706 such that the second rod 1710 is rigidly and/or fixedly coupled to the second leg 1770 and/or the base 1758 of the stabilization foot 1706. In some examples, a portion of the second rod 1710 proximate the lower end 1914 of the second rod 1710 can include threads configured to mate with a threaded portion of the opening 2108 of the second leg 1770 of the stabilization foot 1706 and/or with a threaded portion of the second offset opening 1910 of the base 1758 of the stabilization foot 1706 to rigidly and/or fixedly couple the second rod 1710 to the second leg 1770 and/or the base 1758 of the stabilization foot 1706. In the illustrated example of FIGS. 17-24, the second rod 1710 has a circular cross-sectional shape and/or area. In other examples, the second rod 1710 can have a different cross-sectional shape and/or area (e.g., a non-circular cross-sectional shape and/or area, a differently sized cross-sectional shape and/or area, etc.).

The first spring 1712 of the welding tool 1700 is configured to bias the housing 1704 of the welding tool 1700 away from the stabilization foot 1706 of the welding tool 1700. In the illustrated example of FIGS. 17-24, the first spring 1712 circumscribes (e.g., is coiled about and/or around) the first rod 1708, and is located and/or positioned on the first rod 1708 between the first arm 1742 of the housing 1704 and the first leg 1768 of the stabilization foot 1706. The first spring 1712 includes an example upper (e.g., top) end 1788 in contact with the lower end 1748 of the first arm 1742 of the housing 1704, and an example lower (e.g., bottom) end 1790 located opposite the upper end 1788 and in contact with the upper end 1772 of the first leg 1768 of the stabilization foot 1706. The first spring 1712 biases the first arm 1742 of the housing 1704 away from the first leg 1768 of the stabilization foot 1706 and/or, more generally, biases the housing 1704 of the welding tool 1700 away from the stabilization foot 1706 of the welding tool 1700. In the illustrated example of FIGS. 17-24, the first spring 1712 is compressible in response to a downward force of sufficient magnitude (e.g., a magnitude greater than that of a spring force associated with the first spring 1712) applied to the first arm 1742 of the housing 1704 (e.g., by a human operator of the ultrasonic welding tool 1700 via the first hand grip 1716). Compression of the first spring 1712 by such an applied downward force enables the first arm 1742 of the housing 1704 to move and/or slide toward the first leg 1768 of the stabilization foot 1706 and/or, more generally, enables the housing 1704 to move and/or slide toward the stabilization foot 1706.

The second spring 1714 of the welding tool 1700 is configured to bias the housing 1704 of the welding tool 1700 away from the stabilization foot 1706 of the welding tool 1700. In the illustrated example of FIGS. 17-24, the second spring 1714 circumscribes (e.g., is coiled about and/or around) the second rod 1710, and is located and/or positioned on the second rod 1710 between the second arm 1744 of the housing 1704 and the second leg 1770 of the stabilization foot 1706. The second spring 1714 includes an example upper (e.g., top) end 1792 in contact with the lower end 1754 of the second arm 1744 of the housing 1704, and an example lower (e.g., bottom) end 1794 located opposite the upper end 1792 and in contact with the upper end 1778 of the second leg 1770 of the stabilization foot 1706. The second spring 1714 biases the second arm 1744 of the housing 1704 away from the second leg 1770 of the stabilization foot 1706 and/or, more generally, biases the housing 1704 of the welding tool 1700 away from the stabilization foot 1706 of the welding tool 1700. In the illustrated example of FIGS. 17-24, the second spring 1714 is compressible in response to a downward force of sufficient magnitude (e.g., a magnitude greater than that of a spring force associated with the second spring 1714) applied to the second arm 1744 of the housing 1704 (e.g., by a human operator of the welding tool 1700 via the second hand grip 1718). Compression of the second spring 1714 by such an applied downward force enables the second arm 1744 of the housing 1704 to move and/or slide toward the second leg 1770 of the stabilization foot 1706 and/or, more generally, enables the housing 1704 to move and/or slide toward the stabilization foot 1706.

The cap 1720 of the welding tool 1700 is located and/or positioned within the opening 2004 of the central portion 1732 of the housing 1704, and is configured to close off the upper end of the opening 2004. As can be seen in FIG. 20, the cap 1720 includes an example upper (e.g., top) end 2008, an example lower (e.g., bottom) end 2010 located opposite the upper end 2008, and an example sidewall 2012 extending between the upper end 2008 and the lower end 2010. The upper end 2008 of the cap 1720 is oriented toward the upper end 1734 of the central portion 1732 of the housing 1704, and the lower end 2010 of the cap 1720 is oriented toward the lower end 1736 of the central portion 1732 of the housing 1704. In some examples, the sidewall 2012 of the cap 1720 can include threads configured to mate with a threaded portion of the opening 2004 of the central portion 1732 of the housing 1704 to rigidly and/or fixedly couple the cap 1720 to the central portion 1732 of the housing 1704. In the illustrated example of FIGS. 17-24, the sidewall 2012 of the cap 1720 has a circular cross-sectional shape and/or area. In other examples, the sidewall 2012 of the cap 1720 can have a different cross-sectional shape and/or area (e.g., a non-circular cross-sectional shape and/or area, a differently sized cross-sectional shape and/or area, etc.).

Referring to FIG. 21, the cap 1720 can be seen to include an example opening 2110. The opening 2110 of the cap 1720 extends from the upper end 2008 of the cap 1720 through to the lower end 2010 of the cap 1720 in a direction parallel to and coaxially aligned with central axis 1740 of the central portion 1732 of the housing 1704. The opening 2110 of the cap 1720 is configured to receive a portion of the ultrasonic exciter 1730 of the welding tool 1700 such that the received portion of the ultrasonic exciter 1730 is circumscribed and/or otherwise bounded by the cap 1720, as further described below. In some examples, the opening 2110 of the cap 1720, and/or the portion of the ultrasonic exciter 1730 received therein, is/are fitted with or carry one or more O-rings configured to create an air-tight seal between the opening 2110 of the cap 1720 and the portion of the ultrasonic exciter 1730 received therein. In the illustrated example of FIGS. 17-24, the opening 2110 of the cap 1720 has a circular cross-sectional shape and/or area. In other examples, the opening 2110 of the cap 1720 can have a different cross-sectional shape and/or area (e.g., a non-circular cross-sectional shape and/or area, a differently sized cross-sectional shape and/or area, etc.).

The first air pressure conduit 1722 and the second air pressure conduit 1724 of the welding tool 1700 respectively carry pressurized air that is selectively and/or controllably supplied to the first air pressure conduit 1722 and/or the second air pressure conduit 1724 to control movement and/or the position of the air cylinder 2002 and/or the welder 1902. In the illustrated example of FIGS. 17-24, the first air pressure conduit 1722 extends through the cap 1720 into the opening 2004 of the central portion 1732 of the housing 1704, and the second air pressure conduit 1724 extends through the sidewall 1378 of the central portion 1732 of the housing 1704 into the opening 2004 of the central portion 1732 of the housing 1704. As further described below, the first air pressure conduit 1722 extends into an upper region of the opening 2004 located and/or positioned above a head of the air cylinder 2002, and the second air pressure conduit 1724 extends into a lower region of the opening 2004 located and/or positioned below the head of the air cylinder 2002. Pressurized air supplied via the first air pressure conduit 1722 causes the air cylinder 2002 and/or the welder 1902 to move toward the stabilization foot 1706. Pressurized air supplied via the second air pressure conduit 1724 causes the air cylinder 2002 and/or the welder 1902 to move away from the stabilization foot 1706.

The compaction foot 1726 of the welding tool 1700 is configured to engage, compact, and/or debulk one or more thermoplastic part(s) of a thermoplastic composite layup prior to, during and/or following a welding operation to be performed using the welding tool 1700. As can be seen in FIG. 20, the compaction foot 1726 includes an example upper (e.g., top) end 2014, an example lower (e.g., bottom) end 2016 located opposite the upper end 2014, an example sidewall 2018 extending between the upper end 2014 and the lower end 2016, and an example central axis 2020. The upper end 2014 of the compaction foot 1726 is oriented away from the stabilization foot 1706, and the lower end 2016 of the compaction foot 1726 is oriented toward the stabilization foot 1706. The central axis 2020 of the compaction foot 1726 is parallel to and coaxially aligned with the central axis 1740 of the central portion 1732 of the housing 1704, and/or parallel to and coaxially aligned with the central axis 1766 of the base 1758 of the stabilization foot 1706. In the illustrated example of FIGS. 17-24, the sidewall 2018 of the compaction foot 1726 has a circular cross-sectional shape and/or area. In other examples, the sidewall 2018 of the compaction foot 1726 can have a different cross-sectional shape and/or area (e.g., a non-circular cross-sectional shape and/or area, a differently sized cross-sectional shape and/or area, etc.).

In some examples, the sidewall 2018 of the compaction foot 1726 contacts and/or engages an O-ring carried by the inwardly-extending flange 2006 of the central portion 1732 of the housing 1704, with the O-ring creating an air-tight seal between the sidewall 2018 of the compaction foot 1726 and the inwardly-extending flange 2006 of the central portion 1732 of the housing 1704. In some examples, the sidewall 2018 of the compaction foot 1726 carries an O-ring that contacts and/or engages a neck of the air cylinder 2002, with the O-ring creating an air-tight seal between the sidewall 2018 of the compaction foot 1726 and the neck of the air cylinder 2002.

As can be seen in FIG. 20, the compaction foot 1726 further includes an example opening 2022 defined by the sidewall 2018. The opening 2022 of the compaction foot 1726 extends from the upper end 2014 of the compaction foot 1726 through to the lower end 2016 of the compaction foot 1726 in a direction parallel to and coaxially aligned with the central axis 2020. The opening 2022 of the compaction foot 1726 is configured to receive one or more portion(s) of the welder 1902 and/or the air cylinder 2002, such that the received portion(s) of the welder 1902 and/or the air cylinder 2002 is/are circumscribed and/or otherwise bounded by the sidewall 2018 of the compaction foot 1726, as further described below. In the illustrated example of FIGS. 17-24, the opening 2022 of the compaction foot 1726 has a circular cross-sectional shape and/or area. In other examples, the opening 2022 of the compaction foot 1726 can have a different cross-sectional shape and/or area (e.g., a non-circular cross-sectional shape and/or area, a differently sized cross-sectional shape and/or area, etc.).

As can be seen in FIG. 20, the compaction foot 1726 further includes a first example outwardly-extending flange 2024 located at and/or proximate to the upper end 2014 of the compaction foot 1726 and extending outwardly from the sidewall 2018 of the compaction foot 1726, a second example outwardly-extending flange 2026 located between the upper end 2014 and the lower end 2016 of the compaction foot 1726 and extending outwardly from the sidewall 2018 of the compaction foot 1726, and an example inwardly-extending flange 2028 located at and/or proximate to the lower end 2016 of the compaction foot 1726 and extending inwardly from the sidewall 2018 of the compaction foot 1726.

The first outwardly-extending flange 2024 of the compaction foot 1726 is located within the opening 2004 of the central portion 1732 of the housing 1704. The first outwardly-extending flange 2024 of the compaction foot 1726 provides a downward mechanical stop that is engageable with the inwardly-extending flange 2006 of the sidewall 1738 of the central portion 1732 of the housing 1704 to prevent the compaction foot 1726 from moving downward (e.g., toward and/or past the stabilization foot 1706) beyond a configured distance. In some examples, the first outwardly-extending flange 2024 of the compaction foot 1726 can be removably coupled (e.g., via a threaded connection) to the sidewall 2018 of the compaction foot 1726 to facilitate positioning and/or securing the compaction foot 1726 within the central portion 1732 of the housing 1704 during assembly of the welding tool 1700. In the illustrated example of FIGS. 17-24, the first outwardly-extending flange 2024 of the compaction foot 1726 has a circular cross-sectional shape and/or area. In other examples, the first outwardly-extending flange 2024 of the compaction foot 1726 can have a different cross-sectional shape and/or area (e.g., a non-circular cross-sectional shape and/or area, a differently sized cross-sectional shape and/or area, etc.).

The second outwardly-extending flange 2026 of the compaction foot 1726 is located and/or positioned between the inwardly-extending flange 2006 of the sidewall 1738 of the central portion 1732 of the housing 1704 and the upper surface 1760 of the base 1758 of the stabilization foot 1706. The second outwardly-extending flange 2026 of the compaction foot 1726 supports the third spring 1728 of the welding tool 1700, as further described below. In the illustrated example of FIGS. 17-28, the second outwardly-extending flange 2026 of the compaction foot 1726 has a circular cross-sectional shape and/or area. In other examples, the second outwardly-extending flange 2026 of the compaction foot 1726 can have a different cross-sectional shape and/or area (e.g., a non-circular cross-sectional shape and/or area, a differently sized cross-sectional shape and/or area, etc.).

As can be seen in FIG. 19, the inwardly-extending flange 2028 of the compaction foot 1726 forms an example compaction surface 1916 that is configured to engage, compact and/or debulk one or more thermoplastic part(s) of a thermoplastic composite layup. In the illustrated example of FIGS. 17-24, the compaction surface 1916 of the compaction foot 1726 is substantially flat and/or planar. In other examples, the compaction surface 1916 of the compaction foot 1726 can alternatively be curved (e.g., non-planar), contoured, or otherwise shaped to support and/or complement an associated geometry of one or more thermoplastic part(s) of a thermoplastic composite layup. In the illustrated example of FIGS. 17-24, the inwardly-extending flange 2028 and the compaction surface 1916 of the compaction foot 1726 each have a circular cross-sectional shape and/or area. In other examples, the inwardly-extending flange 2028 and/or the compaction surface 1916 of the compaction foot 1726 can have a different cross-sectional shape and/or area (e.g., a non-circular cross-sectional shape and/or area, a differently sized cross-sectional shape and/or area, etc.).

The third spring 1728 of the welding tool 1700 is configured to bias the compaction foot 1726 of the welding tool 1700 away from the housing 1704 of the welding tool 1700. In the illustrated example of FIGS. 17-24, the third spring 1728 circumscribes (e.g., is coiled about and/or around) the sidewall 2018 of the compaction foot 1726, and is located and/or positioned on the compaction foot 1726 between the inwardly-extending flange 2006 of the central portion 1732 of the housing 1704 and the second outwardly-extending flange 2026 of the compaction foot 1726. As can be seen in FIG. 20, the third spring 1728 includes an example upper (e.g., top) end 2030 in contact with the inwardly-extending flange 2006 of the central portion 1732 of the housing 1704, and an example lower (e.g., bottom) end 2032 located opposite the upper end 2030 and in contact with the second outwardly-extending flange 2026 of the compaction foot 1726. The third spring 1728 biases the second outwardly-extending flange 2026 of the compaction foot 1726 of the welding tool 1700 away from the inwardly-extending flange 2006 of the central portion 1732 of the housing 1704 and/or, more generally, biases the compaction foot 1726 of the welding tool 1700 away from the housing 1704 of the welding tool 1700. In the illustrated example of FIGS. 17-24, the third spring 1728 is compressible in response to a downward force of sufficient magnitude (e.g., a magnitude greater than that of a spring force associated with the third spring 1728) applied to the housing 1704 (e.g., by a human operator of the welding tool 1700 via the first hand grip 1716 and/or the second hand grip 1718). Compression of the third spring 1728 by such an applied downward force enables the second outwardly-extending flange 2026 of the compaction foot 1726 to move and/or slide toward the inwardly-extending flange 2006 of the central portion 1732 of the housing 1704 and/or, more generally, enables the compaction foot 1726 to move and/or slide toward the housing 1704.

The air cylinder 2002 of the welding tool 1700 is configured to move the welder 1902 of the welding tool 1700 relative to the housing 1704 of the welding tool 1700, relative to the stabilization foot 1706 of the welding tool 1700, and/or relative to the compaction foot 1726 of the welding tool 1700, with any and/or all such movements being in conjunction with a welding operation and/or process to be performed using the welding tool 1700. As can be seen in FIG. 20, the air cylinder 2002 includes an example upper (e.g., top) end 2034, an example lower (e.g., bottom) end 2036 located opposite the upper end 2034, an example sidewall 2038 extending between the upper end 2034 and the lower end 2036, and an example central axis 2040. The upper end 2034 of the air cylinder 2002 is oriented away from the stabilization foot 1706, and the lower end 2036 of the air cylinder 2002 is oriented toward the stabilization foot 1706. The central axis 2040 of the air cylinder 2002 is parallel to and coaxially aligned with the central axis 1740 of the central portion 1732 of the housing 1704, parallel to and coaxially aligned with the central axis 1766 of the base 1758 of the stabilization foot 1706, and/or parallel to and coaxially aligned with the central axis 2020 of the compaction foot 1726. In the illustrated example of FIGS. 17-24, the sidewall 2038 of the air cylinder 2002 has a circular cross-sectional shape and/or area. In other examples, the sidewall 2038 of the air cylinder 2002 can have a different cross-sectional shape and/or area (e.g., a non-circular cross-sectional shape and/or area, a differently sized cross-sectional shape and/or area, etc.).

Referring to FIG. 21, the air cylinder 2002 can be seen to include an example opening 2112 defined by the sidewall 2038. The opening 2112 of the air cylinder 2002 extends from the upper end 2034 of the air cylinder 2002 through to the lower end 2036 of the air cylinder 2002 in a direction parallel to and coaxially aligned with the central axis 2040. The opening 2112 of the air cylinder 2002 is configured to receive one or more portion(s) of the welder 1902 and/or the ultrasonic exciter 1730, such that the received portion(s) of the welder 1902 and/or the ultrasonic exciter 1730 is/are circumscribed and/or otherwise bounded by the sidewall 2038 of the air cylinder 2002, as further described below. In the illustrated example of FIGS. 17-24, the opening 2112 of the air cylinder 2002 has a circular cross-sectional shape and/or area. In other examples, the opening 2112 of the air cylinder 2002 can have a different cross-sectional shape and/or area (e.g., a non-circular cross-sectional shape and/or area, a differently sized cross-sectional shape and/or area, etc.).

As can be seen in FIG. 20, the air cylinder 2002 further includes an example head 2042 located at and/or proximate to the upper end 2034 of the air cylinder 2002. The head 2042 of the air cylinder 2002 is located within the opening 2004 of the central portion 1732 of the housing 1704, and/or between the cap 1720 of the welding tool 1700 and the inwardly-extending flange 2006 of the central portion 1732 of the housing 1704 of the welding tool 1700. As can be seen in FIG. 20, the head 2042 of the air cylinder 2002 carries one or more example O-ring(s) 2044 that individually and/or collectively create an air-tight seal between the head 2042 of the air cylinder 2002 and the sidewall 1738 of the central portion 1732 of the housing 1704. In this regard, the head 2042 and the O-ring(s) 2044 is/are located and/or positioned between the first air pressure conduit 1722 and the second air pressure conduit 1724 of the welding tool 1700. Pressurized air supplied via the first air pressure conduit 1722 enters an upper region of the opening 2004 of the central portion 1732 of the housing 1704 located and/or positioned above the head 2042 and/or above the O-ring(s) 2044 of the air cylinder 2002, and causes the air cylinder 2002 to move toward the stabilization foot 1706. Pressurized air supplied via the second air pressure conduit 1724 enters a lower region of the opening 2004 of the central portion 1732 of the housing 1704 located and/or positioned below the head 2042 and/or below the O-ring(s) 2044 of the air cylinder 2002, and causes the air cylinder 2002 to move away from the stabilization foot 1706. In the illustrated example of FIGS. 17-24, the head 2042 of the air cylinder 2002 has a circular cross-sectional shape and/or area. In other examples, the head 2042 of the air cylinder 2002 can have a different cross-sectional shape and/or area (e.g., a non-circular cross-sectional shape and/or area, a differently sized cross-sectional shape and/or area, etc.).

As can be seen in FIG. 20, the air cylinder 2002 further includes an example neck 2046 located at and/or proximate to the lower end 2036 of the air cylinder 2002. The neck 2046 of the air cylinder 2002 is configured to be slidably received within the opening 2022 of the compaction foot 1726 such that the air cylinder 2002 is movable relative to the stabilization foot 1706 independently from the compaction foot 1726 moving relative to the stabilization foot 1706, and vice-versa. In the illustrated example of FIGS. 17-24, the neck 2046 of the air cylinder 2002 has a circular cross-sectional shape and/or area. In other examples, the neck 2046 of the air cylinder 2002 can have a different cross-sectional shape and/or area (e.g., a non-circular cross-sectional shape and/or area, a differently sized cross-sectional shape and/or area, etc.).

The welder 1902 of the welding tool 1700 is configured to weld (e.g., tack weld) a thermoplastic part to one or more other thermoplastic part(s) of a thermoplastic composite layup in conjunction with a welding operation to be performed using the welding tool 1700, during a compaction operation to be performed using the welding tool 1700, and/or during a stabilization operation to be performed using the welding tool 1700. The welder 1902 can be implemented as an ultrasonic welder that is powered, controlled and/or operated by the ultrasonic exciter 1730 and/or by a power supply operatively coupled to the ultrasonic exciter 1730. In some examples, a power supply configured to power the ultrasonic exciter 1730 and/or the welder 1902 can be mounted on the welding tool 1700. In other examples, the power supply can alternatively be located remotely from the welding tool 1700. In some examples, the power supply is adjustable such that the ultrasonic exciter 1730 and/or the welder 1902 can operate at different (e.g., adjustable) power settings depending upon material and/or specification requirements associated with the welding operation to be performed.

As can be seen in FIG. 20, the welder 1902 includes an example horn 2048, an example welding tip 2050, and an example central axis 2052. The central axis 2052 of the welder 1902 is parallel to and coaxially aligned with the central axis 1740 of the central portion 1732 of the housing 1704, parallel to and coaxially aligned with the central axis 1766 of the base 1758 of the stabilization foot 1706, parallel to and coaxially aligned with the central axis 2020 of the compaction foot 1726, and/or parallel to and coaxially aligned with the central axis 2040 of the air cylinder 2002. In the illustrated example of FIGS. 17-24, the welder 1902 has a circular cross-sectional shape and/or area. In other examples, the welder 1902 can have a different cross-sectional shape and/or area (e.g., a non-circular cross-sectional shape and/or area, a differently sized cross-sectional shape and/or area, etc.).

The horn 2048 of the welder 1902 is located and/or positioned within the opening 2112 and/or the neck 2046 of the air cylinder 2002 such that the horn 2048 and/or, more generally, the welder 1902 is rigidly and/or fixedly coupled to the air cylinder 2002. In some examples, the horn 2048 can include threads configured to mate with a threaded portion of the opening 2112 of the air cylinder 2002 to rigidly and/or fixedly couple the horn 2048 and/or, more generally, the welder 1902 to the air cylinder 2002. In other examples, the horn 2048 can additionally or alternatively include threads configured to mate with a threaded portion of the ultrasonic exciter 1730 to rigidly and/or fixedly couple the horn 2048 and/or, more generally, the welder 1902 to the ultrasonic exciter 1730. In the illustrated example of FIGS. 17-24, the horn 2048 has a circular cross-sectional shape and/or area. In other examples, the horn 2048 can have a different cross-sectional shape and/or area (e.g., a non-circular cross-sectional shape and/or area, a differently sized cross-sectional shape and/or area, etc.).

As can be seen in FIG. 19, the welding tip 2050 of the welder 1902 forms an example welding surface 1918 that is configured to weld a thermoplastic part to one or more other thermoplastic part(s) of a thermoplastic composite layup. In the illustrated example of FIGS. 17-24, the welding surface 1918 of the welding tip 2050 is substantially flat and/or planar. In other examples, the welding surface 1918 of the welding tip 2050 can alternatively be curved (e.g., non-planar), contoured, or otherwise shaped. In the illustrated example of FIGS. 17-24, the welding tip 2050 and the welding surface 1918 each have a circular cross-sectional shape and/or area. In other examples, the welding tip 2050 and/or the welding surface 1918 can have a different cross-sectional shape and/or area (e.g., a non-circular cross-sectional shape and/or area, a differently sized cross-sectional shape and/or area, etc.).

The ultrasonic exciter 1730 of the welding tool 1700 is configured to generate ultrasonic signals (e.g., via a generator and a transducer of the ultrasonic exciter 1730), and to mechanically transfer the generated ultrasonic signals to the horn 2048 of the welder 1902. Referring to FIG. 21, the ultrasonic exciter 1730 can be seen to include a first example portion 2114 located and/or positioned within the opening 2110 of the cap 1720, and a second example portion 2116 located and/or positioned within the opening 2112 of the air cylinder 2002. The ultrasonic exciter 1730 is movable along the central axis 1740 of the central portion 1732 of the housing 1704 in unison with movement of the air cylinder 2002 and/or movement of the welder 1902. In the illustrated example of FIGS. 17-24, the ultrasonic exciter 1730 has a circular cross-sectional shape and/or area. In other examples, the ultrasonic exciter 1730 can have a different cross-sectional shape and/or area (e.g., a non-circular cross-sectional shape and/or area, a differently sized cross-sectional shape and/or area, etc.).

In the illustrated example of FIGS. 17-24, the welding surface 1918 of the welder 1902, the compaction surface 1916 of the compaction foot 1726, and the stabilization surface 1904 of the stabilization foot 1706 are concentrically located and/or positioned relative to one another, with the compaction surface 1916 circumscribing the welding surface 1918, and the stabilization surface 1904 circumscribing the compaction surface 1916. When the welding tool 1700 is placed on a first thermoplastic part of a thermoplastic composite layup, the stabilization surface 1904 is configured to provide and/or impart a first pressure and/or a first force to the first thermoplastic part, over an area consistent with the geometry of the stabilization surface 1904, to stabilize the first thermoplastic part relative to one or more other thermoplastic part(s) of the thermoplastic composite layup. The compaction surface 1916 in turn is configured to provide and/or impart a second pressure and/or a second force to the first thermoplastic part, over an area consistent with the geometry of the compaction surface 1916, to compact and/or debulk the first thermoplastic part and/or one or more other thermoplastic part(s) of the thermoplastic composite layup. The welding surface 1918 in turn is configured to provide and/or impart a third pressure and/or a third force to the first thermoplastic part, over an area consistent with the geometry of the welding surface 1918, to weld (e.g., tack weld) the first thermoplastic part to one or more other thermoplastic part(s) of the thermoplastic composite layup.

The housing 1704 of the welding tool 1700 is movable along the central axis 1740 between a neutral (e.g., uncompressed) position of the housing 1704 and a compressed position of the housing 1704. Movement of the housing 1704 occurs relative to the stabilization foot 1706. For example, the housing 1704 can be moved, along the central axis 1740, from an example neutral position of the housing 1704 (e.g., a position in which the housing 1704 is separated from the stabilization foot 1706 by a first distance) associated with the first configuration 1702 of the welding tool 1700 shown in FIGS. 17-21 to an example compressed position of the housing 1704 (e.g., a position in which the housing 1704 is separated from the stabilization foot 1706 by a second distance less than the first distance associated with the neutral position of the housing 1704) associated with the second configuration 2202 of the welding tool 1700 shown in FIG. 22, the third configuration 2302 of the welding tool 1700 shown in FIG. 23, and/or the fourth configuration 2402 of the welding tool 1700 shown in FIG. 24. The first spring 1712 and/or the second spring 1714 of the welding tool 1700 has/have a first length when the housing 1704 is in the neutral position, and a second length less than the first length when the housing 1704 is in the compressed position.

The housing 1704 can be moved along the central axis 1740 from and/or into a variety of different compressed positions. In other words, the housing 1704 can have variable and/or adjustable compressed positions. For example, the compressed position of the housing 1704 can vary based on the extent and/or degree of force that may be required of the stabilization surface 1904 and/or the stabilization foot 1706 to stabilize a first thermoplastic part relative to one or more other thermoplastic part(s) of a thermoplastic composite layup. In some examples, the stabilization surface 1904 of the stabilization foot 1706 can stabilize a first thermoplastic part relative to a second thermoplastic part while the compaction surface 1916 of the compaction foot 1726 compacts and/or debulks the first thermoplastic part, and/or while the welding surface 1918 of the welder 1902 welds the first thermoplastic part to the second thermoplastic part. In such examples, once the stabilization operation is complete, the housing 1704 can retract back from the compressed position of the housing 1704 associated with the second configuration 2202 of the welding tool 1700 shown in FIG. 22, the third configuration 2302 of the welding tool 1700 shown in FIG. 23, and/or the fourth configuration 2402 of the welding tool 1700 shown in FIG. 24, to the neutral position of the housing 1704 associated with the first configuration 1702 of the welding tool 1700 shown in FIGS. 17-24.

In the illustrated example of FIGS. 17-24, the above-described movements of the housing 1704 occur and/or are performed manually by a human operator of the welding tool 1700, with the housing 1704 being forced toward the stabilization foot 1706 in response to the human operator gripping and/or grasping the first hand grip 1716 and/or the second hand grip 1718 of the welding tool 1700 and applying a downward force thereto. In this regard, movement of the housing 1704 toward the stabilization foot 1706 occurs when the operator-applied downward force is sufficiently powerful to overcome the spring force(s) generated by the first spring 1712 and/or the second spring 1714 of the welding tool 1700 that bias the housing 1704 away from the stabilization foot 1706. When the stabilization surface 1904 of the stabilization foot 1706 is placed in contact with a thermoplastic part of a thermoplastic composite layup, an increase to the operator-applied downward force produces a corresponding and/or associated increase to the force by which the stabilization surface 1904 of the stabilization foot 1706 stabilizes the thermoplastic part.

The compaction foot 1726 of the welding tool 1700 is movable (e.g., independent of movement of the welder 1902) along the central axis 2020 between a neutral (e.g. uncompressed) position of the compaction foot 1726 and a compressed position of the compaction foot 1726. In some examples, movement of the compaction foot 1726 occurs relative to the housing 1704, relative to the stabilization foot 1706, and/or relative to the welder 1902. For example, the compaction surface 1916 and/or, more generally, the compaction foot 1726 can be moved, along the central axis 2020, from an example neutral position of the compaction foot 1726 (e.g., a position in which the second outwardly-extending flange 2026 of the compaction foot 1726 is separated from the inwardly-extending flange 2006 of the central portion 1732 of the housing 1704 by a third distance) associated with the first configuration 1702 of the welding tool 1700 shown in FIGS. 17-21, and/or the second configuration 2202 of the welding tool 1700 shown in FIG. 22, to an example compressed position of the compaction foot 1726 (e.g., a position in which the second outwardly-extending flange 2026 of the compaction foot 1726 is separated from the inwardly-extending flange 2006 of the central portion 1732 of the housing 1704 by a fourth distance less than the third distance associated with the neutral position of the compaction foot 1726) associated with the third configuration 2302 of the welding tool 1700 shown in FIG. 23, and/or the fourth configuration 2402 of the welding tool 1700 shown in FIG. 24.

The compaction surface 1916 and/or, more generally, the compaction foot 1726 can be moved along the central axis 2020 from and/or into a variety of different compressed positions. In other words, the compaction surface 1916 and/or the compaction foot 1726 can have variable and/or adjustable compressed positions. For example, the compressed position of the compaction surface 1916 and/or the compaction foot 1726 can vary based on the extent and/or degree of compaction that may be required of the compaction surface 1916 and/or the compaction foot 1726 to compact and/or debulk a first thermoplastic part relative to one or more other thermoplastic part(s) of a thermoplastic composite layup. In some examples, the compaction surface 1916 of the compaction foot 1726 can compact and/or debulk a first thermoplastic part relative to a second thermoplastic part while the stabilization surface 1904 of the stabilization foot 1706 stabilizes the first thermoplastic part, and/or while the welding surface 1918 of the welder 1902 welds the first thermoplastic part to the second thermoplastic part. In such examples, once the compaction operation is complete, the compaction surface 1916 of the compaction foot 1726 can retract back from the compressed position of the compaction foot 1726 associated with the third configuration 2302 of the welding tool 1700 shown in FIG. 23, and/or the fourth configuration 2402 of the welding tool 1700 shown in FIG. 24, to the neutral (e.g., uncompressed) position of the compaction foot 1726 associated with the first configuration 1702 of the welding tool 1700 shown in FIGS. 17-21, and/or the second configuration 2202 of the welding tool 1700 shown in FIG. 22.

In the illustrated example of FIGS. 17-24, the above-described movements of the compaction surface 1916 and/or, more generally, the compaction foot 1726 occur and/or are performed manually by a human operator of the welding tool 1700, with the compaction foot 1726 being forced toward the housing 1704 in response to the human operator gripping and/or grasping the first hand grip 1716 and/or the second hand grip 1718 of the welding tool 1700 and applying a downward force thereto. In this regard, movement of the compaction foot 1726 toward the housing 1704 occurs when the operator-applied downward force is sufficiently powerful to overcome the spring force generated by the third spring 1728 of the welding tool 1700 that bias the compaction foot 1726 away from the housing 1704. When the stabilization surface 1904 of the stabilization foot 1706 is already stabilizing a thermoplastic part of a thermoplastic composite layup, an increase to the operator-applied downward force produces a corresponding and/or associated increase to the force by which the compaction surface 1916 of the compaction foot 1726 compacts and/or debulks the thermoplastic part relative to one or more other thermoplastic part(s) of the thermoplastic composite layup.

The welder 1902 of the welding tool 1700 is movable (e.g., independent of movement of the compaction foot 1726) along the central axis 2052 between a retracted position of the welder 1902 and an extended position of the welder 1902. In some examples, movement of the welder 1902 occurs relative to the housing 1704, relative to the stabilization foot 1706, and/or relative of the compaction foot 1726. For example, the welding surface 1918 and/or, more generally, the welder 1902 can be moved, along the central axis 2052, from an example retracted position of the welder 1902 (e.g., a position in which the welding surface 1918 of the welder 1902 is located above the stabilization surface 1904 of the stabilization foot 1706, and/or above the compaction surface 1916 of the compaction foot 1726) associated with the first configuration 1702 of the welding tool 1700 shown in FIGS. 17-21, the second configuration 2202 of the welding tool 1700 shown in FIG. 22, and/or the third configuration 2302 of the welding tool 1700 shown in FIG. 23, to an example extended position of the welder 1902 (e.g., a position in which the welding surface 1918 of the welder 1902 is flush with or located below the stabilization surface 1904 of the stabilization foot 1706, and/or flush with or located below the compaction surface 1916 of the compaction foot 1726) associated with the fourth configuration 2402 of the welding tool 1700 shown in FIG. 24.

The welding surface 1918 and/or, more generally, the welder 1902 can be moved along the central axis 2052 from and/or into a variety of different extended positions. In other words, the welding surface 1918 and/or the welder 1902 can have variable and/or adjustable extended positions. For example, the extended position of the welding surface 1918 and/or the welder 1902 can vary based on the extent and/or degree of extension that may be required of the welding surface 1918 and/or the welder 1902 to weld (e.g., tack weld) a first thermoplastic part to one or more other thermoplastic part(s) of a thermoplastic composite layup. In some examples, the welding surface 1918 of the welder 1902 can weld a first thermoplastic part to a second thermoplastic part while the stabilization surface 1904 of the stabilization foot 1706 stabilizes the first thermoplastic part, and/or while the compaction surface 1916 of the compaction foot 31726 compacts the first thermoplastic part. In such examples, once the welding operation is complete, the welding surface 1918 of the welder 1902 can retract back from the extended position of the welder 1902 associated with the fourth configuration 2402 of the welding tool 1700 shown in FIG. 24 to the retracted position of the welder 1902 associated with the first configuration 1702 of the welding tool 1700 shown in FIGS. 17-21, the second configuration 2202 of the welding tool 1700 shown in FIG. 22, and/or the third configuration 2302 of the welding tool 1700 shown in FIG. 23.

In the illustrated example of FIGS. 17-24, the above-described movements of the welding surface 1918 and/or, more generally, the welder 1902 occur and/or are performed in an automated manner, with the welder 1902 being driven and/or controlled by pressurized air delivered in a regulated manner to the air cylinder 2002 through the first air pressure conduit 1722 and/or the second air pressure conduit 1724. The pressure and/or the force at which the welder 1902 operates (e.g., the pressure and/or the force at which the welder 1902 welds a first thermoplastic part to a second thermoplastic part) can accordingly be controlled and/or adjusted via the regulated supply of pressurized air delivered to the air cylinder 2002. The period of time (e.g., the duration) for which the welding surface 1918 and/or, more generally, the welder 1902 remains in any particular position (e.g., any retracted position or any extended position) can also be controlled and/or adjusted via the regulated supply of pressurized air to the air cylinder 2002. In some examples, the pressure and/or the force at which the welder 1902 operates, and/or the period of time for which the welding surface 1918 and/or, more generally, the welder 1902 remains in any particular position can be automatically determined and/or implemented based on material and/or specification requirements associated with the welding operation to be performed. In some examples, the automated delivery and/or regulated supply of pressurized air to the air cylinder 2002 can be initiated in response to a human operator of the welding tool 1700 actuating a user input device (e.g., a button, a switch, a foot pedal, etc.) that is operatively coupled to the welding tool 1700 and/or operatively coupled to the supply source of the pressurized air. In other examples, the automated delivery and/or regulated supply of pressurized air to the air cylinder 2002 can alternatively be initiated in response to a human operator of the welding tool 1700 maintaining the housing 1704 in a compressed position for a predetermined time period, and/or in response to a human operator of the welding tool 1700 maintaining the compaction foot 1726 in a compressed position for a predetermined time period.

When the welding tool 1700 of FIGS. 17-24 is in the first configuration 1702 shown in FIGS. 17-21, the housing 1704 is in a neutral (e.g., uncompressed) position, the compaction foot 1726 is in a neutral (e.g., uncompressed) position, and the welder 1902 is in a retracted position. More specifically, when the welding tool 1700 is in the first configuration 1702 shown in FIGS. 17-21, the lower end 1736 of the central portion 1732 of the housing 1704 is spaced apart from the upper surface 1760 of the base 1758 of the stabilization foot 1706 by a first distance, the compaction surface 1916 of the compaction foot 1726 is located and/or positioned above the stabilization surface 1904 of the stabilization foot 1706, and the welding surface 1918 of the welder 1902 is located and/or positioned above the stabilization surface 1904 of the stabilization foot 1706 and/or above the compaction surface 1916 of the compaction foot 1726.

When the welding tool 1700 of FIGS. 17-24 is in the second configuration 2202 shown in FIG. 22, the housing 1704 is in a compressed position, the compaction foot 1726 is in a neutral (e.g., uncompressed) position, and the welder 1902 is in a retracted position. More specifically, when the welding tool 1700 is in the second configuration 2202 shown in FIG. 22, the lower end 1736 of the central portion 1732 of the housing 1704 is spaced apart from the upper surface 1760 of the base 1758 of the stabilization foot 1706 by a second distance that is less than the first distance described above in connection with the first configuration 1702 of FIGS. 17-21. When the welding tool 1700 is in the second configuration 2202 shown in FIG. 22, the compaction surface 1916 of the compaction foot 1726 is flush with or below (e.g., slightly below) the stabilization surface 1904 of the stabilization foot 1706, and the second outwardly-extending flange 2026 of the compaction foot 1726 is spaced apart from the inwardly-extending flange 2006 of the central portion 1732 of the housing 1704 by a third distance. When the welding tool 1700 is in the second configuration 2202 shown in FIG. 22, the welding surface 1918 of the welder 1902 is located and/or positioned above the stabilization surface 1904 of the stabilization foot 1706 and/or above the compaction surface 1916 of the compaction foot 1726.

When the welding tool 1700 of FIGS. 17-24 is in the third configuration 2302 shown in FIG. 23, the housing 1704 is in a compressed position, the compaction foot 1726 is in a compressed position, and the welder 1902 is in a retracted position. More specifically, when the welding tool 1700 is in the third configuration 2302 shown in FIG. 23, the lower end 1736 of the central portion 1732 of the housing 104 is spaced apart from the upper surface 1760 of the base 1758 of the stabilization foot 1706 by a fourth distance that is that is less than the second distance described above in connection with the second configuration 2202 of FIG. 22. When the welding tool 1700 is in the third configuration 2302 shown in FIG. 23, the compaction surface 1916 of the compaction foot 1726 is flush with or below (e.g., slightly below) the stabilization surface 1904 of the stabilization foot 1706, and the second outwardly-extending flange 2026 of the compaction foot 1726 is spaced apart from the inwardly-extending flange 2006 of the central portion 1732 of the housing 1704 by a fifth distance that is less than the third distance described above in connection with the second configuration 2202 of FIG. 22. When the welding tool 1700 is in the third configuration 2302 shown in FIG. 23, the welding surface 1918 of the welder 1902 is located and/or positioned above the stabilization surface 1904 of the stabilization foot 1706 and/or above the compaction surface 1916 of the compaction foot 1726.

When the welding tool 1700 of FIGS. 17-24 is in the fourth configuration 2402 shown in FIG. 24, the housing 1704 is in a compressed position, the compaction foot 1726 is in a compressed position, and the welder 1902 is in an extended position. More specifically, when the welding tool 1700 is in the fourth configuration 2402 shown in FIG. 24, the lower end 1736 of the central portion 1732 of the housing 1704 is spaced apart from the upper surface 1760 of the base 1758 of the stabilization foot 1706 by the fourth distance described above in connection with the third configuration 2302 of FIG. 23. When the welding tool 1700 is in the fourth configuration 2402 shown in FIG. 24, the compaction surface 1916 of the compaction foot 1726 is flush with or below (e.g., slightly below) the stabilization surface 1904 of the stabilization foot 1706, and the second outwardly-extending flange 2026 of the compaction foot 1726 is spaced apart from the inwardly-extending flange 2006 of the central portion 1732 of the housing 1704 by the fifth distance described above in connection with the third configuration 2302 of FIG. 23. When the welding tool 1700 is in the fourth configuration 2402 shown in FIG. 24, the welding surface 1918 of the welder 1902 is located and/or positioned flush with or below (e.g., slightly below) the stabilization surface 1904 of the stabilization foot 1706, and/or flush with or below (e.g., slightly below) the compaction surface 1916 of the compaction foot 1726.

FIGS. 25-31 illustrate example stages (e.g., a first example stage 2502, a second example stage 2602, a third example stage 2702, a fourth example stage 2802, a fifth example stage 2902, a sixth example stage 3002, and a seventh example stage 3102) of an example process 2500 to be implemented via the welding tool 1700 of FIGS. 17-24 to weld a first example thermoplastic part 2504 to a second example thermoplastic part 2506. As further described below, the process 2500 includes stabilizing the first thermoplastic part 2504 relative to the second thermoplastic part 2506, compacting and/or debulking the stabilized first and second thermoplastic parts 2504, 2506, and welding the compacted first and second thermoplastic parts 2504, 2506 to one another in the course of forming a thermoplastic composite layup including at least the first thermoplastic part 2504 and the second thermoplastic part 2506.

The first and second thermoplastic parts 2504, 2506 of FIGS. 25-31 can respectively be of any size, shape, and/or configuration (e.g., a substantially flat and/or planar shape, a tapered shape, a sloped shape, a curved shape, a contoured shape, etc.). In some examples, the first thermoplastic part, 2504, the second thermoplastic part 2506, and/or one or more other thermoplastic part(s) of an example thermoplastic composite layup 2508 including the first thermoplastic part 2504, the second thermoplastic part 2506, and/or the one or more other thermoplastic part(s) can include one or more ply drop(s) and/or one or more area(s) of significant bulk. In some examples, the first thermoplastic part 2504 and the second thermoplastic part 2506 are respectively single-ply thermoplastic parts. In other examples, the first thermoplastic part 2504 and/or the second thermoplastic part 2506 can alternatively be a multi-ply thermoplastic part, with the multiple plies of the multi-ply thermoplastic part(s) either being welded together or not yet welded together. In some examples, the thermoplastic composite layup 2508 may be located and/or positioned on an example layup table 2510 while the process 2500 of FIGS. 25-31 is being performed.

Figure 25:
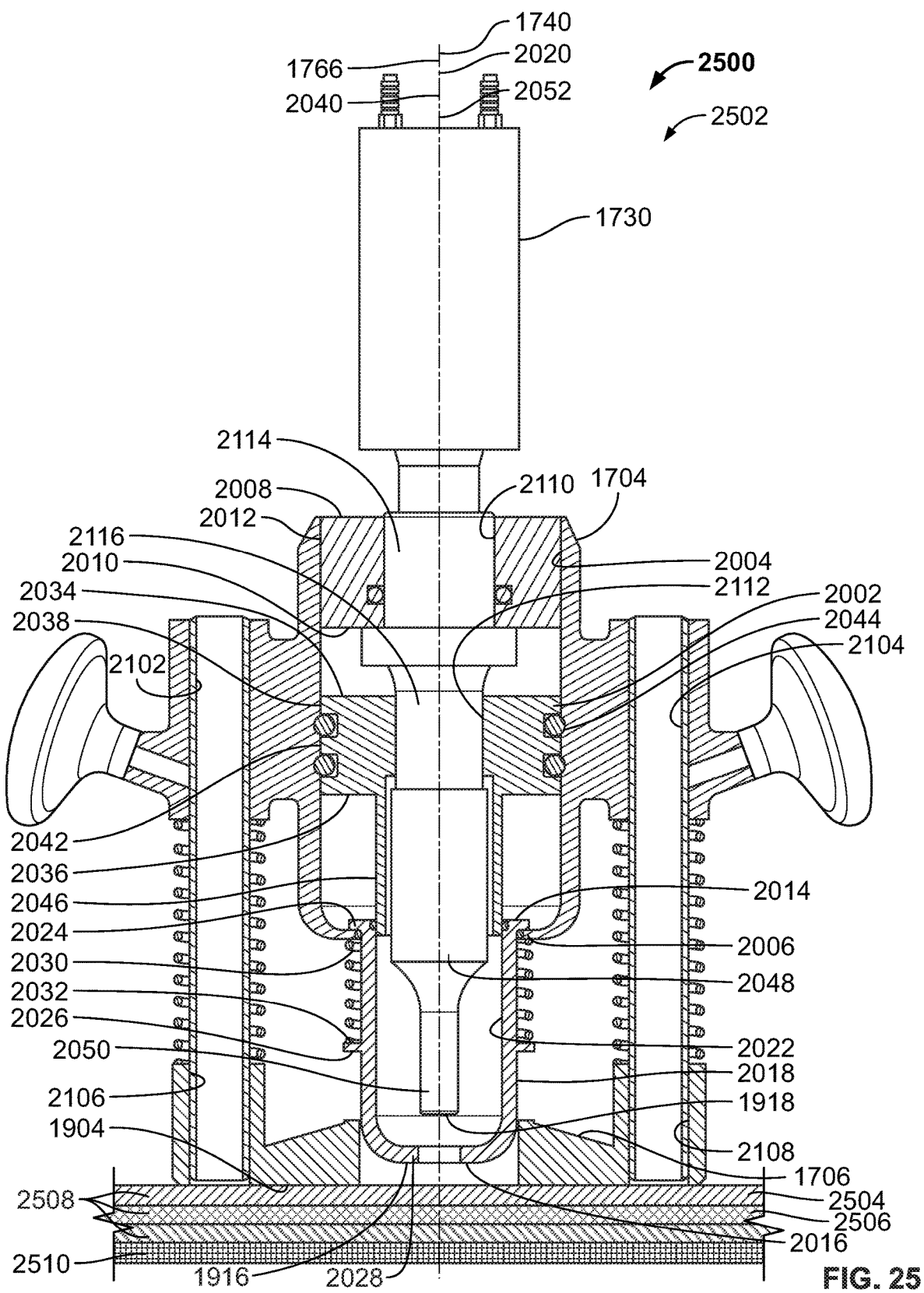
FIG. 25 illustrates a first example stage of an example process to be implemented via the welding tool of FIGS. 17-25 to weld a first example thermoplastic part to a second example thermoplastic part.

FIG. 25 illustrates the first stage 2502 of the example process 2500. During the first stage 2502, the welding tool 1700 is manually placed (e.g., by a human operator of the welding tool 1700) onto the first thermoplastic part 2504 such that the stabilization surface 1904 of the stabilization foot 1706 contacts at least a portion of the first thermoplastic part 2504. The welding tool 1700 is positioned and/or remains positioned in the first configuration 1702 of FIGS. 17-21 described above while the first stage 2502 is being performed.

Figure 26:
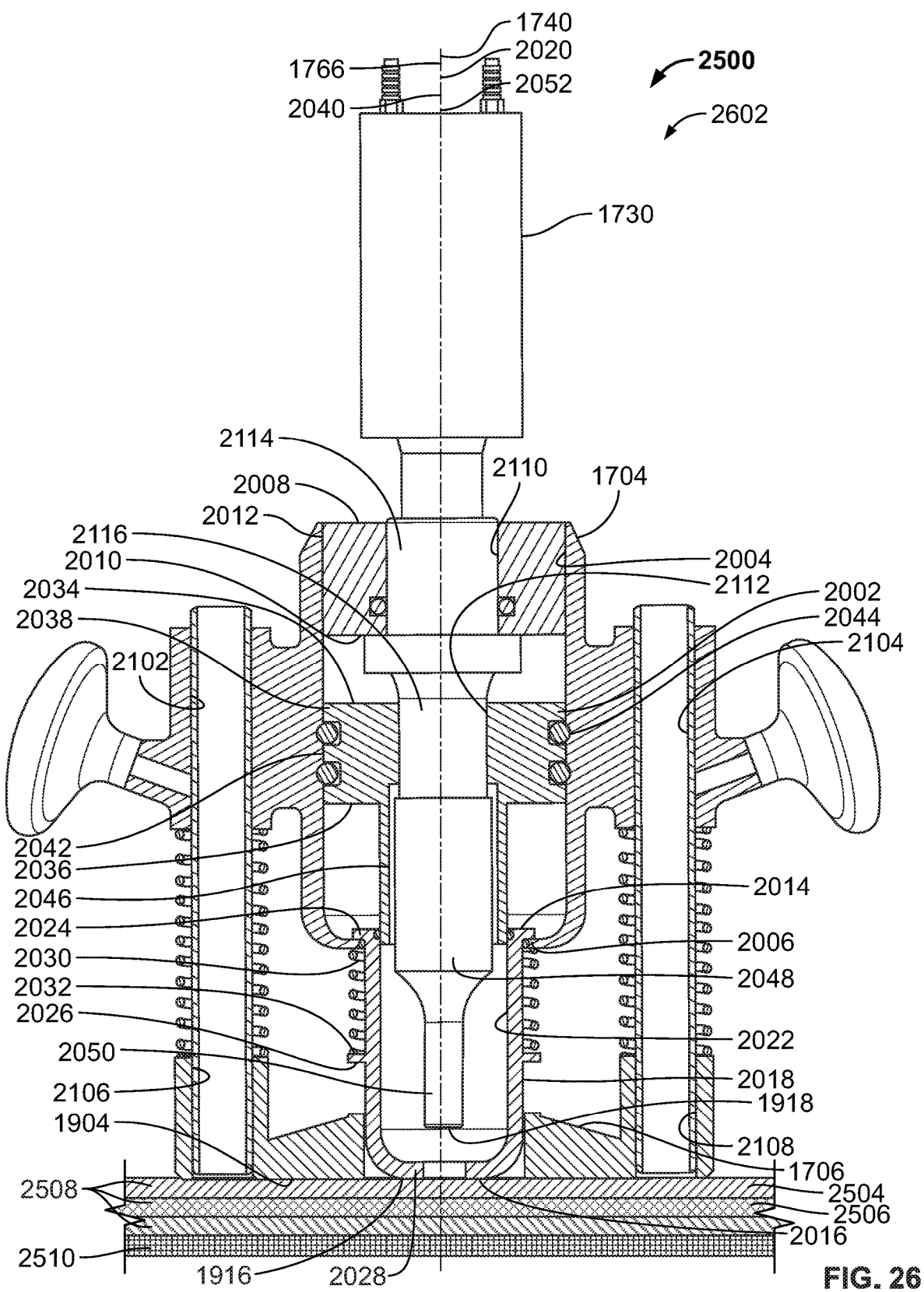
FIG. 26 illustrates a second example stage of the process of FIG. 25.

FIG. 26 illustrates the second stage 2602 of the example process 2500. During the second stage 2602, the housing 1704 is manually moved (e.g., by a human operator of the welding tool 1700) toward the stabilization foot 1706 such that the stabilization surface 1904 of the stabilization foot 1706 stabilizes the first thermoplastic part 2504 relative to the second thermoplastic part 2506. The housing 1704 is accordingly moved from a neutral (e.g., uncompressed) position to a first compressed position in connection with the second stage 2602 of the process 2500. The welding tool 1700 transitions from being positioned in the first configuration 1702 of FIGS. 17-21 described above to being positioned in the second configuration 2202 of FIG. 22 described above while the second stage 2602 is being performed.

Figure 27:
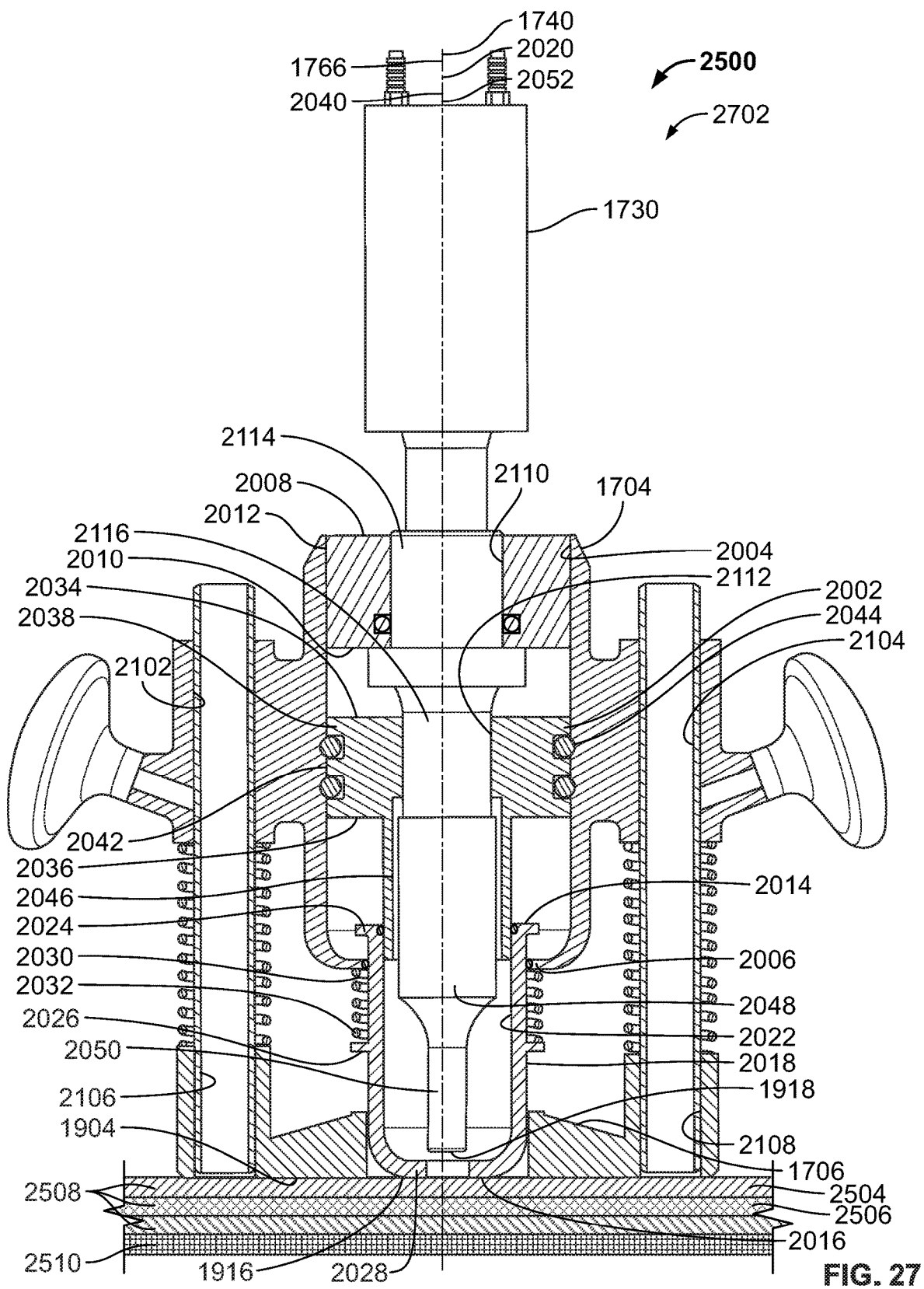
FIG. 27 illustrates a third example stage of the process of FIGS. 25 and 26.

FIG. 27 illustrates the third stage 2702 of the example process 2500. During the third stage 2702, the housing 1704 is manually moved (e.g., by a human operator of the welding tool 1700) further toward the stabilization surface 1904 of the stabilization foot 1706 from its first compressed position to a second compressed position. Also during the third stage 2702 of the process 2500 of FIGS. 25-31, the compaction foot 1726 is manually moved (e.g., by a human operator of the welding tool 1700) toward the housing 1704 from a neutral (e.g., uncompressed) position to a compressed position in which the compaction surface 1916 of the compaction foot 1726 compacts and/or debulks the first thermoplastic part 2504 and/or the second thermoplastic part 2506. The welding tool 1700 transitions from being positioned in the second configuration 2202 of FIG. 22 described above to being positioned in the third configuration 2302 of FIG. 23 described above while the third stage 2702 is being performed.

Figure 28:
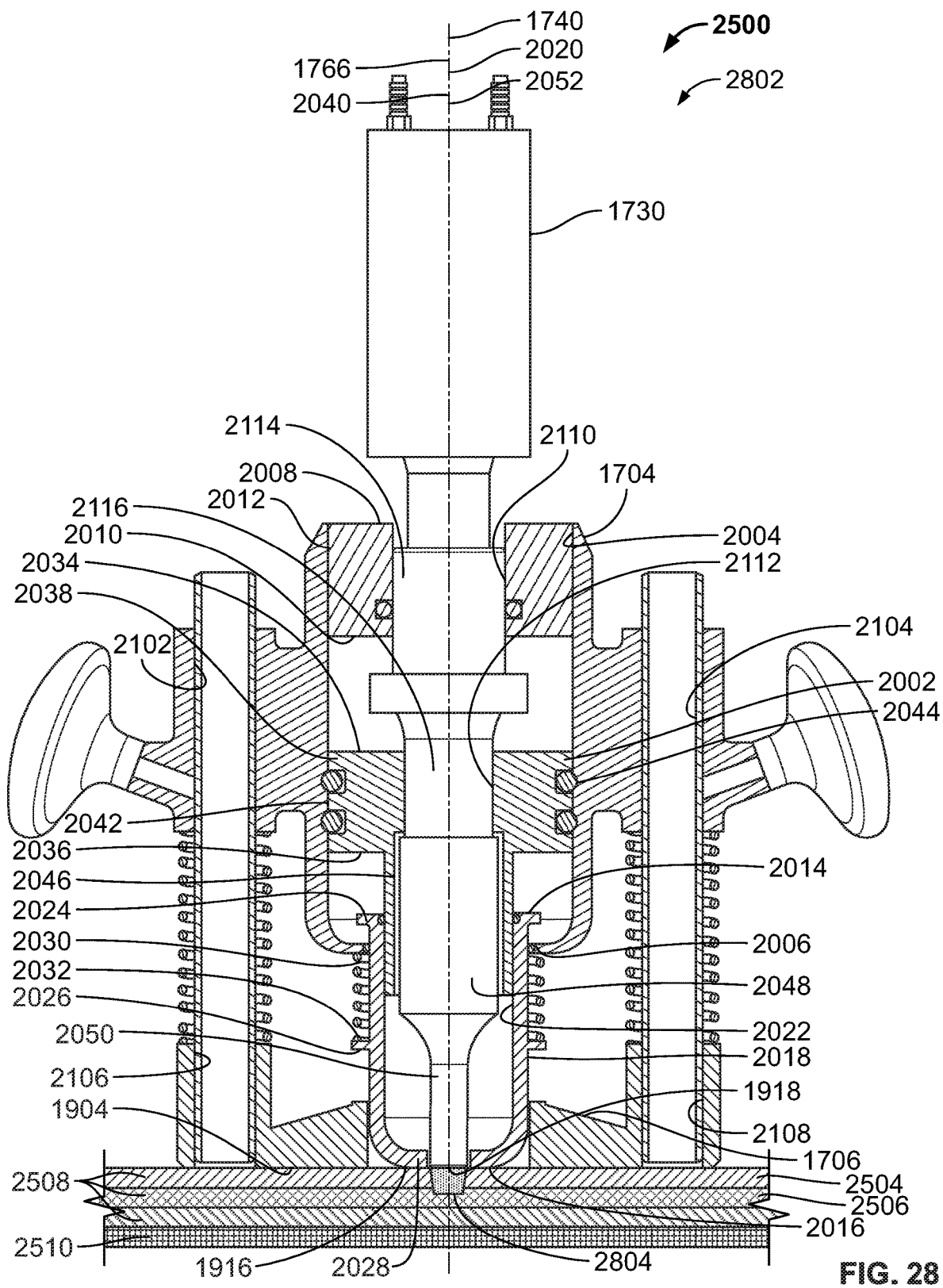
FIG. 28 illustrates a fourth example stage of the process of FIGS. 25-27.

FIG. 28 illustrates the fourth stage 2802 of the example process 2500. During the fourth stage 2802, the welder 1902 is automatically moved (e.g., by a controlled and/or regulated supply of pressurized air delivered to the air cylinder 2002 via the first air pressure conduit 1722 of the welding tool 1700) from a retracted position to an extended position in which the welding surface 1918 of the welder 1902 forms an example weld 2804 that fixedly couples the first thermoplastic part 2504 to the second thermoplastic part 2506. The welding tool 1700 transitions from being positioned in the third configuration 2302 of FIG. 23 described above to being positioned in the fourth configuration 2402 of FIG. 24 described above while the fourth stage 2802 is being performed.

Figure 29:
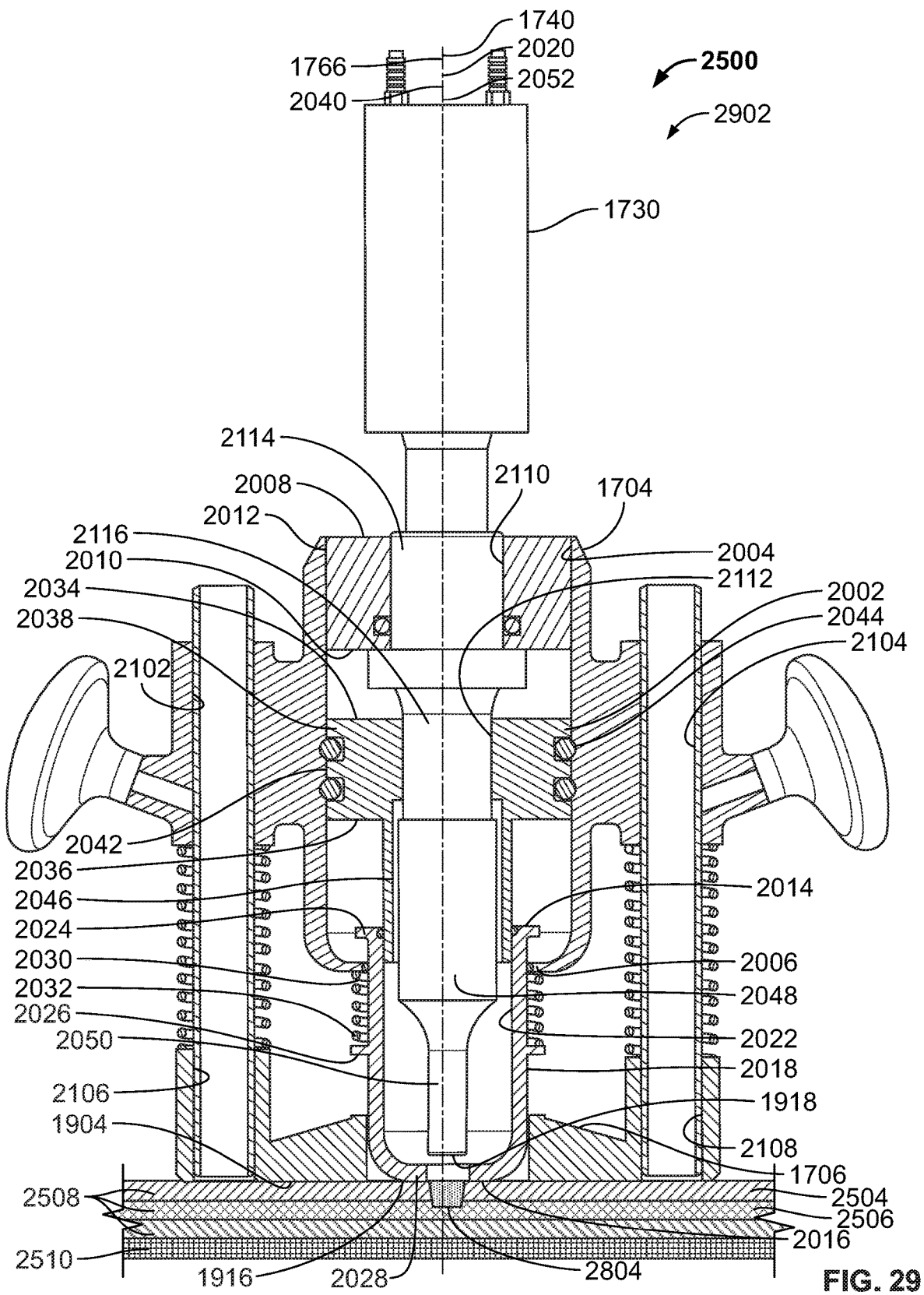
FIG. 29 illustrates a fifth example stage of the process of FIGS. 25-28.

FIG. 29 illustrates the fifth stage 2902 of the example process 2500. During the fifth stage 2902, the welder 1902 is automatically moved (e.g., by a controlled and/or regulated supply of pressurized air delivered to the air cylinder 2002 via the second air pressure conduit 1724 of the welding tool 1700) from its extended position back to its retracted position subsequent to (e.g., immediately following) the welder 1902 forming the weld 2804. The welding tool 1700 transitions from being positioned in the fourth configuration 2402 of FIG. 24 described above to being positioned in the third configuration 2302 of FIG. 23 described above while the fifth stage 2902 is being performed.

Figure 30:
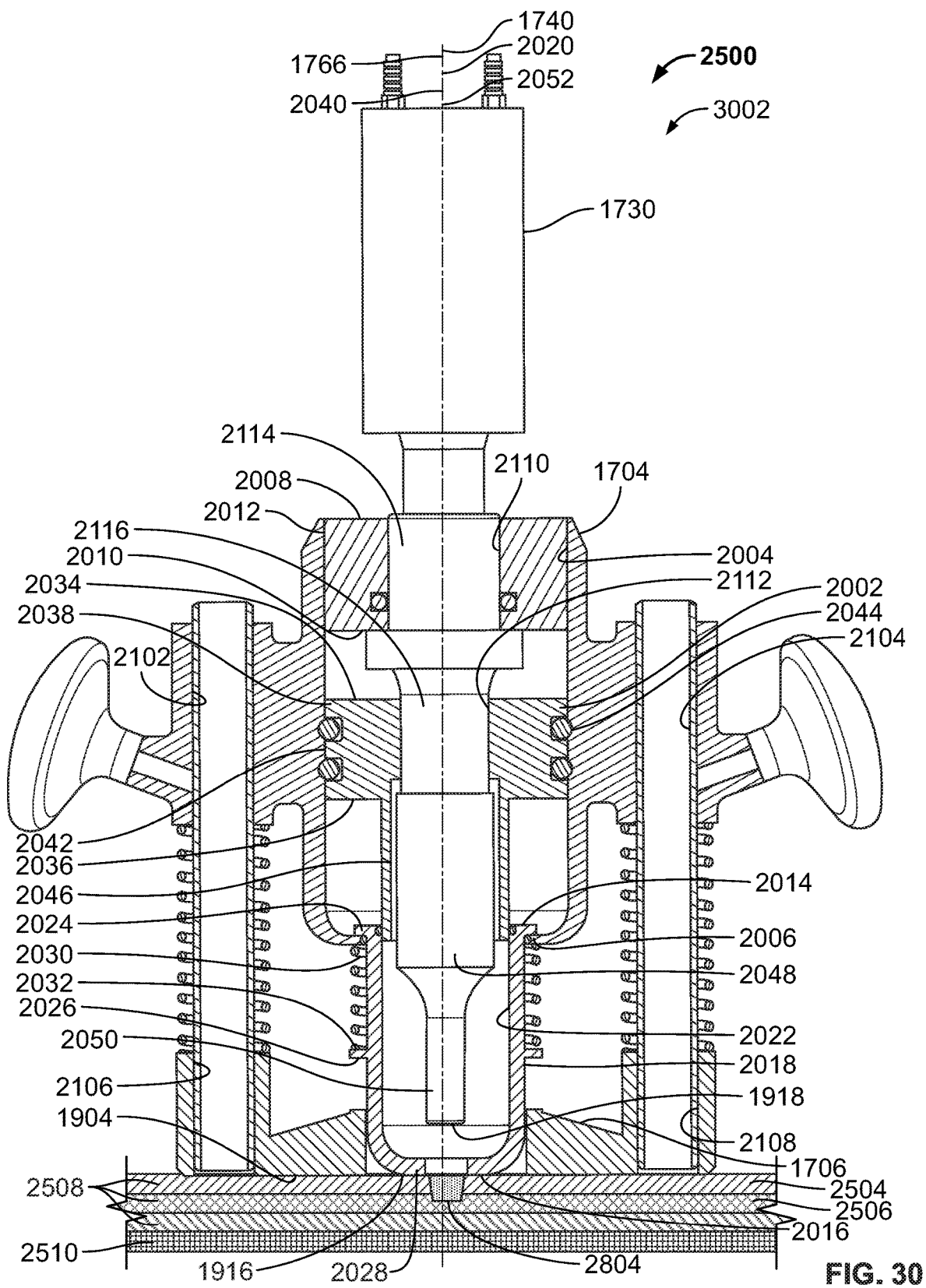
FIG. 30 illustrates a sixth example stage of the process of FIGS. 25-29.

FIG. 30 illustrates the sixth stage 3002 of the example process 2500. During the sixth stage 3002, the housing 1704 is moved (e.g., by a spring force associated with the first spring 1712 and/or the second spring 1714 of the welding tool 1700 in response to the human operator of the welding tool 1700 reducing a manually-applied force) away from the stabilization foot 1706, from its second compressed position to its first compressed position. Also during the sixth stage 3002 of the process 2500 of FIGS. 25-31, the compaction foot 1726 is moved (e.g., by a spring force associated with the third spring 1728 of the welding tool 1700 in response to the human operator of the welding tool 1700 reducing a manually-applied force) away from the housing 1704, from its compressed position to its neutral position. The welding tool 1700 transitions from being positioned in the third configuration 2302 of FIG. 23 described above to being positioned in the second configuration 2202 of FIG. 22 described above while the sixth stage 3002 is being performed.

Figure 31:
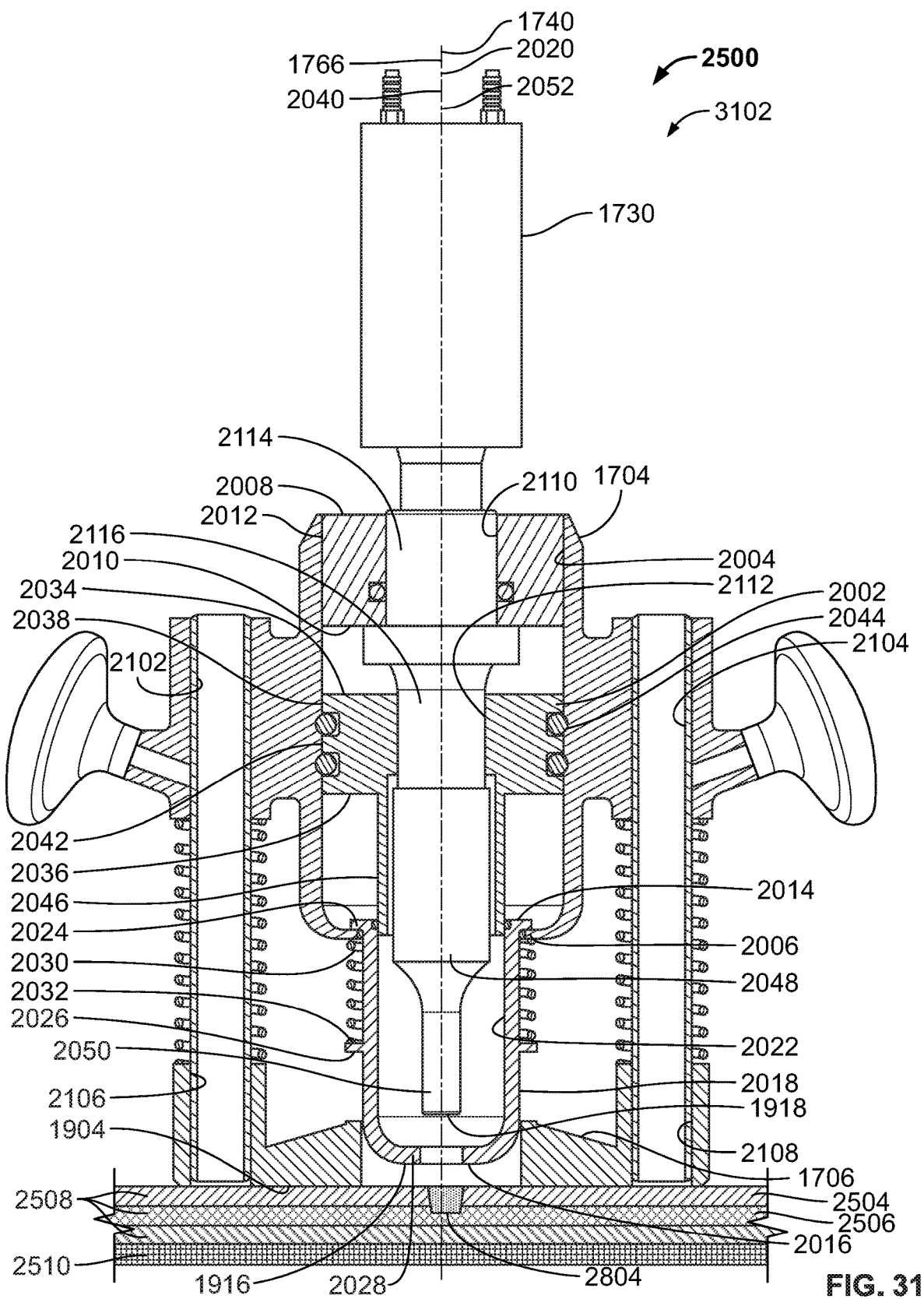
FIG. 31 illustrates a seventh example stage of the process of FIGS. 25-30.

FIG. 31 illustrates the seventh stage 3102 of the example process 2500. During the seventh stage 3102, the housing 1704 is moved (e.g., by a spring force associated with the first spring 1712 and/or the second spring 1714 of the welding tool 1700 in response to the human operator of the welding tool 1700 releasing a manually-applied force) further away from the stabilization foot 1706, from its first compressed position to its neutral position. The welding tool 1700 transitions from being positioned in the second configuration 2202 of FIG. 22 described above to being positioned in the first configuration 1702 of FIGS. 17-21 described above while the seventh stage 3102 is being performed.

Figure 32:
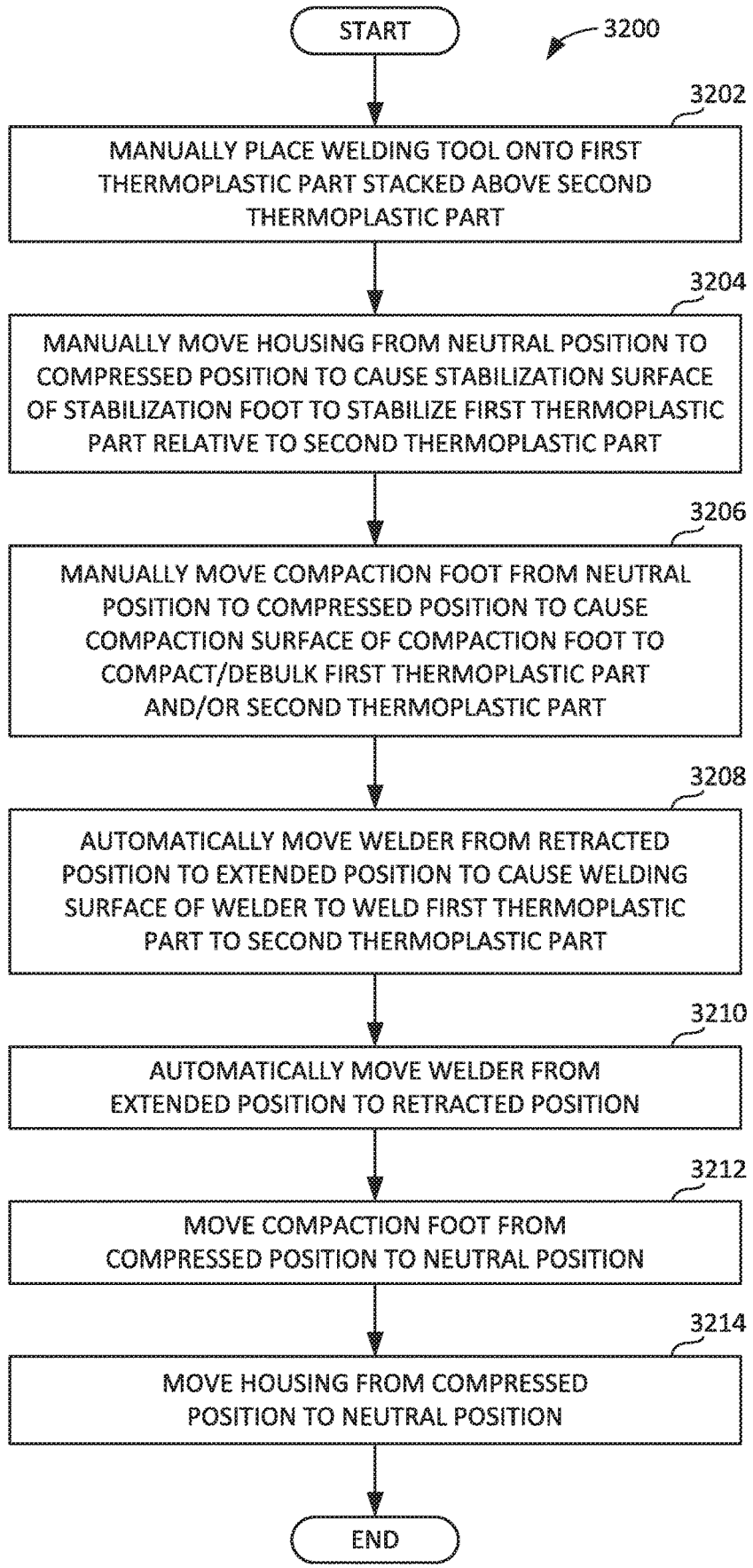
FIG. 32 is a flowchart representative of an example method for implementing the example welding tool of FIGS. 17-25 to weld a first example thermoplastic part to a second example thermoplastic part.

FIG. 32 is a flowchart representative of an example method 3200 for implementing the example welding tool 1700 of FIGS. 17-24 to weld a first example thermoplastic part to a second example thermoplastic part. In some examples, the method 3200 can be implemented in connection with the welding tool 1700 being utilized to perform the example process 2500 of FIGS. 25-31 described above. The method 3200 includes manually placing (e.g., by a human operator) the welding tool 1700 onto a first thermoplastic part (e.g., the first thermoplastic part 2504 of FIGS. 25-31) stacked above a second thermoplastic part (e.g., the second thermoplastic part 2506 of FIGS. 25-31) (block 3202). For example, the welding tool 1700 can be placed on the first thermoplastic part such that the stabilization surface 1904 of the stabilization foot 1706 contacts at least a portion of the first thermoplastic part. The welding tool 1700 is positioned and/or remains positioned in the first configuration 1702 of FIGS. 17-21 described above while block 3202 of the method 3200 is being performed. Following block 3202, the method 3200 proceeds to block 3204.

At block 3204, the method 3200 includes manually moving (e.g., by a human operator) the housing 1704 of the welding tool 1700 toward the stabilization foot 1706 of the welding tool 1700 (e.g., from a neutral position to a first compressed position) to cause the stabilization surface 1904 of the stabilization foot 1706 to stabilize the first thermoplastic part relative to the second thermoplastic part. The welding tool 1700 transitions from being positioned in the first configuration 1702 of FIGS. 17-21 described above to being positioned in the second configuration 2202 of FIG. 22 described above while block 3204 of the method 3200 is being performed. Following block 3204, the method 3200 proceeds to block 3206.

At block 3206, the method 3200 includes manually moving (e.g., by a human operator of the welding tool 1700) the housing 1704 of the welding tool 1700 further toward the stabilization surface 1904 of the stabilization foot 1706 from its first compressed position to a second compressed position, and further includes manually moving (e.g., by a human operator of the welding tool 1700) the compaction foot 1726 of the welding tool 1700 toward the housing 1704 of the welding tool 1700 from a neutral (e.g., uncompressed) position to a compressed position in which the compaction surface 1916 of the compaction foot 1726 compacts and/or debulks the first thermoplastic part and/or the second thermoplastic part. The welding tool 1700 transitions from being positioned in the second configuration 2202 of FIG. 22 described above to being positioned in the third configuration 2302 of FIG. 23 described above while block 3206 of the method 3200 is being performed. Following block 3206, the method 3200 proceeds to block 3208.

At block 3208, the method 3200 includes automatically moving (e.g., by a controlled and/or regulated supply of pressurized air delivered to the air cylinder 2002 via the first air pressure conduit 1722 of the welding tool 1700) the welder 1902 of the welding tool 1700 from a retracted position to an extended position to cause the welding surface 1918 of the welder 1902 to form a weld (e.g., the weld 2804 of FIGS. 28-31) that fixedly couples the first thermoplastic part to the second thermoplastic part. The welding tool 1700 transitions from being positioned in the third configuration 2302 of FIG. 23 described above to being positioned in the fourth configuration 2402 of FIG. 24 described above while block 3208 of the method 3200 is being performed. Following block 3208, the method 3200 proceeds to block 3210.

At block 3210, the method 3200 includes automatically moving (e.g., by a controlled and/or regulated supply of pressurized air delivered to the air cylinder 2002 via the second air pressure conduit 1724 of the welding tool 1700) the welder 1902 of the welding tool 1700 from its extended position back to its retracted position subsequent to (e.g., immediately following) the welder 1902 of the welding tool 1700 forming the weld. The welding tool 1700 transitions from being positioned in the fourth configuration 2402 of FIG. 24 described above to being positioned in the third configuration 2302 of FIG. 23 described above while block 3210 of the method 3200 is being performed. Following block 3210, the method 3200 proceeds to block 3212.

At block 3212, the method 3200 includes moving (e.g., by a spring force associated with the first spring 1712 and/or the second spring 1714 of the welding tool 1700 in response to the human operator of the welding tool 1700 reducing a manually-applied force) the housing 1704 of the welding tool 1700 away from the stabilization foot 1706 of the welding tool 1700, from its second compressed position to its first compressed position, and further includes moving (e.g., by a spring force associated with the third spring 1728 of the welding tool 1700 in response to the human operator of the welding tool 1700 reducing a manually-applied force) the compaction foot 1726 of the welding tool 1700 away from the housing 1704 of the welding tool 1700, from its compressed position to its neutral position. The welding tool 1700 transitions from being positioned in the third configuration 2302 of FIG. 23 described above to being positioned in the second configuration 2202 of FIG. 22 described above while block 3212 of the method 3200 is being performed. Following block 3212, the method 3200 proceeds to block 3214.

At block 3214, the method 3200 includes moving (e.g., by a spring force associated with the first spring 1712 and/or the second spring 1714 of the welding tool 1700 in response to the human operator of the welding tool 1700 releasing a manually-applied force) the housing 1704 of the welding tool 1700 further away from the stabilization foot 1706 of the welding tool 1700, from its first compressed position to its neutral position. The welding tool 1700 transitions from being positioned in the second configuration 2202 of FIG. 22 described above to being positioned in the first configuration 1702 of FIGS. 17-21 described above while block 3214 of the method 3200 is being performed. Following block 3214, the method 3200 ends.

From the foregoing, it will be appreciated that example methods and apparatus for semi-automated tack welding of plies of a thermoplastic composite layup are disclosed. The disclosed methods and apparatus include and/or utilize a welding tool having a stabilization foot configured to stabilize a first thermoplastic ply relative to a second thermoplastic ply, a compaction foot configured to compact and/or debulk the first thermoplastic ply relative to the second thermoplastic ply, and a welder configured to tack weld the first thermoplastic ply to the second thermoplastic ply in connection with forming a thermoplastic composite layup. In some disclosed examples, the stabilization foot of the welding tool configured to stabilize the first thermoplastic ply relative to the second thermoplastic ply in response to a housing of the welding tool being manually moved (e.g., by a human operator of the welding tool) toward the stabilization foot. In some disclosed examples, the stabilization foot of the welding tool is configured to be manually operated and/or manually controlled by a human operator of the welding tool, and the compaction foot and the welder of the welding tool are configured to be automatically operated and/or automatically controlled. In other disclosed examples, the stabilization foot and the compaction foot of the welding tool are configured to be manually operated and/or manually controlled by a human operator of the welding tool, and the welder of the welding tool is configured to be automatically operated and/or automatically controlled.

The disclosed methods and apparatus provide numerous advantages relative to conventional manual tack welding operations. For example, the disclosed methods and apparatus advantageously enable a human operator to stabilize and debulk one or more thermoplastic plies of a thermoplastic composite layup in a controlled manner as the plies are tack welded, and/or to apply the correct amount of weld pressure, for the correct time period, to facilitate tack welding the plies of the thermoplastic composite layup. The disclosed method and apparatus accordingly reduce and/or eliminate much or all of the subjectivity that is inherent in conventional manual tack welding operations. Additionally, the disclosed methods and apparatus advantageously cause the welding tip of the welder of the welding tool to be shrouded (e.g., by the compaction foot of the welding tool and/or by the stabilization foot of the welding tool) while the tack weld is formed. The disclosed method and apparatus accordingly provide a safety advantage to a human operator of the welding tool relative to the safety risks that the human operator may be inherently exposed to in connection with conventional manual tack welding operations.

The following paragraphs provide various examples of the examples disclosed herein.

Example 1 includes a welding tool. The welding tool of Example 1 comprises a stabilization foot, a housing, a compaction foot, and a welder. The stabilization foot has a stabilization surface. The housing has a central axis. The housing is movable relative to the stabilization surface along the central axis of the housing. The compaction foot has a central axis and a compaction surface. The compaction surface is movable relative to the stabilization surface and to the housing along the central axis of the compaction foot. The welder has a central axis and a welding surface. The welding surface is movable relative to the stabilization surface, to the housing, and to the compaction surface along the central axis of the welder.

Example 2 includes the welding tool of Example 1, wherein the central axis of the housing, the central axis of the compaction foot, and the central axis of the welder are parallel.

Example 3 includes the welding tool of any of Examples 1-2, wherein the central axis of the housing, the central axis of the compaction foot, and the central axis of the welder are coaxially aligned.

Example 4 includes the welding tool of any of Examples 1-3, wherein the compaction surface circumscribes the welding surface, and wherein the stabilization surface circumscribes the compaction surface.

Example 5 includes the welding tool of any of Examples 1-4, wherein the housing is movable along the central axis of the housing between a neutral position and a compressed position, and wherein the stabilization surface is configured to stabilize a first thermoplastic part relative to a second thermoplastic part when the housing is in the compressed position.

Example 6 includes the welding tool of Example 5, further comprising a spring operatively positioned between the housing and the stabilization foot, wherein the spring is configured to bias the housing into the neutral position, and wherein the housing is configured to be manually moved from the neutral position into the compressed position against a spring force generated by the spring.

Example 7 includes the welding tool of any of Examples 1-4, wherein the compaction surface is movable along the central axis of the compaction foot between a retracted position and an extended position, and wherein the compaction surface is configured to compact a first thermoplastic part relative to a second thermoplastic part when the compaction foot is in the extended position.

Example 8 includes the welding tool of Example 7, wherein the compaction surface is configured to be automatically moved from the retracted position to the extended position in response to pressurized air delivered in a controlled manner to a portion of the compaction foot located within the housing.

Example 9 includes the welding tool of any of Examples 7-8, wherein the compaction surface is positioned above the stabilization surface when the compaction surface is in the retracted position, and wherein the compaction surface is positioned flush with or below the stabilization surface when the compaction surface is in the extended position.

Example 10 includes the welding tool of any of Examples 1-4, wherein the compaction surface is movable along the central axis of the compaction foot between a neutral position and a compressed position, and wherein the compaction surface is configured to compact a first thermoplastic part relative to a second thermoplastic part when the compaction foot is in the compressed position.

Example 11 includes the welding tool of Examples 10, further comprising a spring operatively positioned between the compaction foot and the housing, wherein the spring is configured to bias the compaction foot into the neutral position, and wherein the compaction foot is configured to be manually moved from the neutral position into the compressed position against a spring force generated by the spring.

Example 12 includes the welding tool of any of Examples 10-11, wherein the compaction surface is positioned flush with or below the stabilization surface when the compaction surface is in the compressed position.

Example 13 includes the welding tool of any of Examples 1-4, wherein the welding surface is movable along the central axis of the welder between a retracted position and an extended position, and wherein the welding surface is configured to weld a first thermoplastic part to a second thermoplastic part when the welding surface is in the extended position.

Example 14 includes the welding tool of Example 13, wherein the welding surface is configured to be automatically moved from the retracted position to the extended position in response to pressurized air delivered in a controlled manner to an air cylinder located within the housing, wherein the air cylinder is movable along the central axis of the welder, and wherein the welder is fixedly coupled to the air cylinder.

Example 15 includes the welding tool of any of Examples 13-14, wherein the welding surface is positioned above the stabilization surface when the welding surface is in the retracted position, and wherein the welding surface is positioned flush with or below the stabilization surface when the welding surface is in the extended position.

Example 16 includes a method for welding a first thermoplastic part to a second thermoplastic part via a welding tool. The method of Example 16 comprises positioning a stabilization surface of a stabilization foot of the welding tool in contact with the first thermoplastic part. The method of Example 16 further comprises stabilizing the first thermoplastic part relative to the second thermoplastic part by moving a housing of the welding tool toward the stabilization surface along a central axis of the housing. The method of Example 16 further comprises compacting the first thermoplastic part relative to the second thermoplastic part by moving a compaction surface of a compaction foot of the welding tool into contact with the first thermoplastic part and relative to the stabilization foot and to the housing along a central axis of the compaction foot. The method of Example 16 further comprises welding the first thermoplastic part to the second thermoplastic part by moving a welding surface of a welder of the welding tool into contact with the first thermoplastic part and relative to the stabilization surface, to the housing, and to the compaction surface along a central axis of the welder.

Example 17 includes the method of Examples 16, wherein the central axis of the housing, the central axis of the compaction foot, and the central axis of the welder are parallel.

Example 18 includes the method of any of Examples 16-17, wherein the central axis of the housing, the central axis of the compaction foot, and the central axis of the welder are coaxially aligned.

Example 19 includes the method of any of Examples 16-18, wherein stabilizing the first thermoplastic part relative to the second thermoplastic part includes moving the housing along the central axis of the housing from a neutral position to a compressed position.

Example 20 includes the method of Example 19, wherein moving the housing from the neutral position to the compressed position includes manually moving the housing from the neutral position into the compressed position against a spring force generated by a spring of the welding tool, wherein the spring is operatively positioned between the housing and the stabilization foot, and wherein the spring biases the housing into the neutral position.

Example 21 includes the method of any of Examples 16-18, wherein compacting the first thermoplastic part relative to the second thermoplastic part includes moving the compaction surface along the central axis of the compaction foot from a retracted position to an extended position.

Example 22 includes the method of Examples 21, wherein moving the compaction surface from the retracted position to the extended position includes automatically moving the compaction surface from the retracted position into the extended position by delivering pressurized air in a controlled manner to a portion of the compaction foot located within the housing.

Example 23 includes the method of any of Examples 21-22, wherein the compaction surface is positioned above the stabilization surface when the compaction surface is in the retracted position, and wherein the compaction surface is positioned flush with or below the stabilization surface when the compaction surface is in the extended position.

Example 24 includes the method of any of Examples 16-18, wherein compacting the first thermoplastic part relative to the second thermoplastic part includes moving the compaction surface along the central axis of the compaction foot from a neutral position to a compressed position.

Example 25 includes the method of Example 24, wherein moving the compaction surface from the neutral position to the compressed position includes manually moving the compaction surface from the neutral position into the compressed position against a spring force generated by a spring of the welding tool, wherein the spring is operatively positioned between the compaction foot and the housing, and wherein the spring biases the compaction foot into the neutral position.

Example 26 includes the method of any of Examples 24-25, wherein the compaction surface is positioned flush with or below the stabilization surface when the compaction surface is in the compressed position.

Example 27 includes the method of any of Examples 16-18, wherein welding the first thermoplastic part to the second thermoplastic part includes moving the welding surface along the central axis of the welder from a retracted position to an extended position.

Example 28 includes the method of Example 27 wherein moving the welding surface from the retracted position to the extended position includes automatically moving the welding surface from the retracted position into the extended position by delivering pressurized air in a controlled manner to an air cylinder located within the housing, wherein the air cylinder is movable along the central axis of the welder, and wherein the welder is fixedly coupled to the air cylinder.

Example 29 includes the method of any of Examples 27-28, wherein the welding surface is positioned above the stabilization surface when the welding surface is in the retracted position, and wherein the welding surface is positioned flush with or below the stabilization surface when the welding surface is in the extended position Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A welding tool, comprising:
   a stabilization foot having a stabilization surface;
   a housing having a central axis, the housing being movable relative to the stabilization surface along the central axis of the housing;
   a compaction foot having a central axis and a compaction surface, the compaction surface being movable relative to the stabilization surface and to the housing along the central axis of the compaction foot; and
   a welder having a central axis and a welding surface, the welding surface being movable relative to the stabilization surface, to the housing, and to the compaction surface along the central axis of the welder.

2. The welding tool of claim 1, wherein the central axis of the housing, the central axis of the compaction foot, and the central axis of the welder are parallel.

3. The welding tool of claim 1, wherein the central axis of the housing, the central axis of the compaction foot, and the central axis of the welder are coaxially aligned.

4. The welding tool of claim 1, wherein the compaction surface circumscribes the welding surface, and wherein the stabilization surface circumscribes the compaction surface.

5. The welding tool of claim 1, wherein the housing is movable along the central axis of the housing between a neutral position and a compressed position, and wherein the stabilization surface is configured to stabilize a first thermoplastic part relative to a second thermoplastic part when the housing is in the compressed position.

6. The welding tool of claim 5, further comprising a spring operatively positioned between the housing and the stabilization foot, wherein the spring is configured to bias the housing into the neutral position, and wherein the housing is configured to be manually moved from the neutral position into the compressed position against a spring force generated by the spring.

7. The welding tool of claim 1, wherein the compaction surface is movable along the central axis of the compaction foot between a retracted position and an extended position, and wherein the compaction surface is configured to compact a first thermoplastic part relative to a second thermoplastic part when the compaction foot is in the extended position.

8. The welding tool of claim 7, wherein the compaction surface is configured to be automatically moved from the retracted position to the extended position in response to pressurized air delivered in a controlled manner to a portion of the compaction foot located within the housing.

9. The welding tool of claim 7, wherein the compaction surface is positioned above the stabilization surface when the compaction surface is in the retracted position, and wherein the compaction surface is positioned flush with or below the stabilization surface when the compaction surface is in the extended position.

10. The welding tool of claim 1, wherein the compaction surface is movable along the central axis of the compaction foot between a neutral position and a compressed position, and wherein the compaction surface is configured to compact a first thermoplastic part relative to a second thermoplastic part when the compaction foot is in the compressed position.

11. The welding tool of claim 10, further comprising a spring operatively positioned between the compaction foot and the housing, wherein the spring is configured to bias the compaction foot into the neutral position, and wherein the compaction foot is configured to be manually moved from the neutral position into the compressed position against a spring force generated by the spring.

12. The welding tool of claim 10, wherein the compaction surface is positioned flush with or below the stabilization surface when the compaction surface is in the compressed position.

13. The welding tool of claim 1, wherein the welding surface is movable along the central axis of the welder between a retracted position and an extended position, and wherein the welding surface is configured to weld a first thermoplastic part to a second thermoplastic part when the welding surface is in the extended position.

14. The welding tool of claim 13, wherein the welding surface is configured to be automatically moved from the retracted position to the extended position in response to pressurized air delivered in a controlled manner to an air cylinder located within the housing, wherein the air cylinder is movable along the central axis of the welder, and wherein the welder is fixedly coupled to the air cylinder.

15. The welding tool of claim 13, wherein the welding surface is positioned above the stabilization surface when the welding surface is in the retracted position, and wherein the welding surface is positioned flush with or below the stabilization surface when the welding surface is in the extended position.

16. A method for welding a first thermoplastic part to a second thermoplastic part via a welding tool, the method comprising:
   positioning a stabilization surface of a stabilization foot of the welding tool in contact with the first thermoplastic part;
   stabilizing the first thermoplastic part relative to the second thermoplastic part by moving a housing of the welding tool toward the stabilization surface along a central axis of the housing;
   compacting the first thermoplastic part relative to the second thermoplastic part by moving a compaction surface of a compaction foot of the welding tool into contact with the first thermoplastic part and relative to the stabilization foot and to the housing along a central axis of the compaction foot; and
   welding the first thermoplastic part to the second thermoplastic part by moving a welding surface of a welder of the welding tool into contact with the first thermoplastic part and relative to the stabilization surface, to the housing, and to the compaction surface along a central axis of the welder.

17. The method of claim 16, wherein the central axis of the housing, the central axis of the compaction foot, and the central axis of the welder are parallel.

18. The method of claim 16, wherein the central axis of the housing, the central axis of the compaction foot, and the central axis of the welder are coaxially aligned.

19. The method of claim 16, wherein stabilizing the first thermoplastic part relative to the second thermoplastic part includes moving the housing along the central axis of the housing from a neutral position to a compressed position.

20. The method of claim 19, wherein moving the housing from the neutral position to the compressed position includes manually moving the housing from the neutral position into the compressed position against a spring force generated by a spring of the welding tool, wherein the spring is operatively positioned between the housing and the stabilization foot, and wherein the spring biases the housing into the neutral position.

21. The method of claim 16, wherein compacting the first thermoplastic part relative to the second thermoplastic part includes moving the compaction surface along the central axis of the compaction foot from a retracted position to an extended position.

22. The method of claim 21, wherein moving the compaction surface from the retracted position to the extended position includes automatically moving the compaction surface from the retracted position into the extended position by delivering pressurized air in a controlled manner to a portion of the compaction foot located within the housing.

23. The method of claim 21, wherein the compaction surface is positioned above the stabilization surface when the compaction surface is in the retracted position, and wherein the compaction surface is positioned flush with or below the stabilization surface when the compaction surface is in the extended position.

24. The method of claim 16, wherein compacting the first thermoplastic part relative to the second thermoplastic part includes moving the compaction surface along the central axis of the compaction foot from a neutral position to a compressed position.

25. The method of claim 24, wherein moving the compaction surface from the neutral position to the compressed position includes manually moving the compaction surface from the neutral position into the compressed position against a spring force generated by a spring of the welding tool, wherein the spring is operatively positioned between the compaction foot and the housing, and wherein the spring biases the compaction foot into the neutral position.

26. The method of claim 24, wherein the compaction surface is positioned flush with or below the stabilization surface when the compaction surface is in the compressed position.

27. The method of claim 16, wherein welding the first thermoplastic part to the second thermoplastic part includes moving the welding surface along the central axis of the welder from a retracted position to an extended position.

28. The method of claim 27, wherein moving the welding surface from the retracted position to the extended position includes automatically moving the welding surface from the retracted position into the extended position by delivering pressurized air in a controlled manner to an air cylinder located within the housing, wherein the air cylinder is movable along the central axis of the welder, and wherein the welder is fixedly coupled to the air cylinder.

29. The method of claim 27, wherein the welding surface is positioned above the stabilization surface when the welding surface is in the retracted position, and wherein the welding surface is positioned flush with or below the stabilization surface when the welding surface is in the extended position.

* * * * *